US010377887B2

United States Patent
Wang

(10) Patent No.: US 10,377,887 B2
(45) Date of Patent: Aug. 13, 2019

(54) NUCLEATED POLYETHYLENE BLENDS AND THEIR USE IN MOLDED ARTICLES

(71) Applicant: NOVA Chemicals (International) S.A., Fribourg (CH)

(72) Inventor: XiaoChuan Wang, Calgary (CA)

(73) Assignee: NOVA Chemicals (International) S.A., Fribourg (CH)

(*) Notice: Subject to any disclaimer, the term of this patent is extended or adjusted under 35 U.S.C. 154(b) by 8 days.

(21) Appl. No.: 15/703,327

(22) Filed: Sep. 13, 2017

(65) Prior Publication Data

US 2018/0079898 A1 Mar. 22, 2018

(30) Foreign Application Priority Data

Sep. 20, 2016 (CA) ..................................... 2942493

(51) Int. Cl.
*C08L 23/06* (2006.01)
*C08L 23/08* (2006.01)

(52) U.S. Cl.
CPC .............. *C08L 23/06* (2013.01); *C08L 23/08* (2013.01); *C08F 2500/05* (2013.01); *C08F 2500/07* (2013.01); *C08F 2500/12* (2013.01); *C08L 23/0807* (2013.01); *C08L 23/0815* (2013.01); *C08L 2203/16* (2013.01); *C08L 2205/02* (2013.01); *C08L 2205/025* (2013.01); *C08L 2205/035* (2013.01); *C08L 2205/24* (2013.01); *C08L 2207/062* (2013.01)

(58) Field of Classification Search
None
See application file for complete search history.

(56) References Cited

U.S. PATENT DOCUMENTS

| | | |
|---|---|---|
| 5,292,845 A | 3/1994 | Kawasaki et al. |
| 5,342,868 A | 8/1994 | Kimura et al. |
| 5,376,439 A | 12/1994 | Hodgson et al. |
| 5,981,636 A | 11/1999 | Amos et al. |
| 6,465,551 B1 | 10/2002 | Zhao et al. |
| 6,599,971 B2 | 7/2003 | Dotson et al. |
| 8,962,755 B2 | 2/2015 | Wang et al. |
| 9,221,966 B2 | 12/2015 | Wang et al. |
| 9,371,442 B2 | 6/2016 | Wang |
| 2005/0256266 A1* | 11/2005 | Lustiger ................ B29C 41/003 525/191 |
| 2006/0047078 A1 | 3/2006 | Swabey et al. |
| 2008/0118749 A1 | 5/2008 | Aubee et al. |

(Continued)

FOREIGN PATENT DOCUMENTS

| | | |
|---|---|---|
| EP | 2 939 814 A1 | 11/2015 |
| WO | 93/03093 A1 | 2/1993 |

(Continued)

OTHER PUBLICATIONS

Wang, XiaoChuan (Alan); Deformation Measurement, Modeling and Morphology Study for HDPE Caps and Closures; ANTEC, Mar. 23-25, 2015, Orlando, Florida; pp. 1-5.

(Continued)

*Primary Examiner* — Richard A Huhn
(74) *Attorney, Agent, or Firm* — Julie L. Heinrich

(57) ABSTRACT

A polyethylene blend comprises a nucleated polyethylene homopolymer composition and an un-nucleated or nucleated bimodal polyethylene copolymer.

18 Claims, 8 Drawing Sheets

(56) References Cited

U.S. PATENT DOCUMENTS

| | | |
|---|---|---|
| 2009/0029182 A1 | 1/2009 | Aubee et al. |
| 2011/0143155 A1 | 6/2011 | Aubee et al. |
| 2013/0225743 A1 | 8/2013 | Aubee et al. |
| 2015/0203671 A1 | 7/2015 | Aubee et al. |
| 2015/0353715 A1 | 12/2015 | Wang |
| 2017/0166332 A1 | 6/2017 | Wang |
| 2017/0166333 A1 | 6/2017 | Wang |
| 2017/0166430 A1 | 6/2017 | Wang et al. |

FOREIGN PATENT DOCUMENTS

| | | |
|---|---|---|
| WO | 2005/121239 A1 | 12/2005 |
| WO | 2006/048253 A1 | 5/2006 |
| WO | 2006/048254 A1 | 5/2006 |
| WO | 2011/050042 A1 | 4/2011 |
| WO | 2015/042561 A1 | 3/2015 |
| WO | 2015/042562 A1 | 3/2015 |
| WO | 2015/042563 A1 | 3/2015 |

OTHER PUBLICATIONS

ASTM D256-10; Standard Test Methods for Determining the Izod Pendulum Impact Resistance of Plastics; Copyright ASTM International; Current edition approved May 1, 2010. Published Jun. 2010. Originally approved in 1926. Last previous edition approved in 2006 as D256-06a; pp. 1-20.

ASTM D638-14; Standard Test Method for Tensile Properties of Plastics; Copyright ASTM International; Current edition approved Dec. 14, 2014. Published Mar. 2015. Originally approved in 1941. Last previous edition approved in 2010 as D638-10.; pp. 1-16.

ASTM D648-16; Standard Test Method for Deflection Temperature of Plastics Under Flexural Load in the Edgewise Position; Copyright ASTM International; Current edition approved Apr. 1, 2016. Published Apr. 2016. Originally approved in 1941. Last previous edition approved in 2007 as D648-07, which was withdrawn Jan. 2016 and reinstated in Apr. 2016.; pp. 1-14.

ASTM D790-15; Standard Test Methods for Flexural Properties of Unreinforced and Reinforced Plastics and Electrical Insulating Materials; Copyright ASTM International; Current edition approved Dec. 1, 2015. Published Jan. 2016. Originally approved in 1970. Last previous edition approved in 2010 as D790-10.; pp. 1-12.

ASTM D792-13; Standard Test Methods for Density and Specific Gravity (Relative Density) of Plastics by Displacement; Copyright ASTM International; Current edition approved Nov. 1, 2013. Published Nov. 2013. Originally approved in 1944. Last previous edition approved in 2008 as D792-08.; pp. 1-6.

ASTM D1525-09; Standard Test Method for Vicat Softening Temperature of Plastics; Copyright ASTM International; Current edition approved Nov. 15, 2009. Published Dec. 2009. Originally approved in 1958. Last previous edition approved in 2007 as D1525-07.; pp. 1-10.

ASTM D1693-15; Standard Test Method for Environmental Stress-Cracking of Ethylene Plastics; Copyright ASTM International; Current edition approved May 1, 2015. Published Jun. 2015. Originally approved in 1959. Last previous edition approved in 2013 as D1693-13.; pp. 1-11.

ASTM D5227-13; Standard Test Method for Measurement of Hexane Extractable Content of Polyolefins; Copyright ASTM International; Current edition approved Jun. 1, 2013. Published Jul. 2013. Originally approved in 1992. Last previous edition approved in 2008 as D5227-01(2008).; pp. 1-4.

ASTM D6474-99 (Reapproved 2006); Standard Test Method for Determining Molecular Weight Distribution and Molecular Weight Averages of Polyolefins by High Temperature Gel Permeation Chromatography; Copyright ASTM International; Current edition approved Mar. 15, 2006. Published Apr. 2006. Originally approved 1999. Last previous edition approved in 1999 as D6474-99.; pp. 1-6.

ASTM D3124-98 (Reapproved 2011); Standard Test Method for Vinylidene Unsaturation in Polyethylene by Infrared Spectrophotometry; Copyright ASTM International; Current edition approved Feb. 1, 2011. Published Mar. 2011. Originally approved in 1972. Last previous edition approved in 2003 as D3124-98(2003).; pp. 1-4.

ASTM D6645-01 (Reapproved 2010); Standard Test Method for Methyl (Comonomer) Content in Polyethylene by Infrared Spectrophotometry; Copyright ASTM International; Current edition approved Jan. 1, 2010. Published Jan. 2010. Originally approved in 2001. Last previous edition approved in 20011 as D6645-01.; pp. 1-4.

ASTM D 1238-04; Standard Test Method for Melt Flow Rates of Thermoplastics by Extrusion Plastometer; Copyright ASTM International; Current edition approved Mar. 1, 2004. Published Apr. 2004. Originally approved in 1965. Last previous edition approved in 2001 as D1238-01.; pp. 1-13.

ASTM D3985-05 (Reapproved 2010); Standard Test Method for Oxygen Gas Transmission Rate Through Plastic Film and Sheeting Using a Coulometric Sensor; Copyright ASTM International; Current edition approved Oct. 1, 2010. Published Nov. 2010. Originally approved in 1981. Last previous edition approved in 2005 ad D3985-05.; pp. 1-7.

Randall, James C.; A Review of High Resolution Liquid Carbon Nuclear Magnetic Resonance Characterizations of Ethylene-Based Polymers; Copyright 1989 by Marcel Dekker, Inc.; JMX-Rev. Macromol. Chem. Phys., C29(2 & 3); pp. 201-202 & 285-286.

* cited by examiner

US 10,377,887 B2

NUCLEATED POLYETHYLENE BLENDS AND THEIR USE IN MOLDED ARTICLES

Polyethylene blends comprising a polyethylene homopolymer composition comprising a nucleating agent, and a bimodal polyethylene copolymer are presented. Such blends may be used in the formation of molded articles such as caps and closures or in the formation of films.

Polyethylene homopolymer compositions are known to have good water vapor transmission rates when they comprise a suitable nucleating agent; see U.S. Patent Application Publication Nos. US2015/0203671, US2013/0225743, US2011/0143155, US2009/0029182 and US2008/0118749.

Bimodal polyethylene copolymer compositions comprising a first ethylene copolymer and a second ethylene copolymer, where the second ethylene copolymer has a higher density and higher melt index, $I_2$ than the first ethylene copolymer, but lower comonomer content than the first ethylene copolymer have been used in the formation of molded articles such as closures for bottles; see U.S. Pat. Nos. 9,371,442, 9,221,966 and 8,962,755.

We now report polyethylene blends which comprise both a nucleated polyethylene homopolymer composition and a bimodal polyethylene copolymer.

The blends have a good balance of environmental stress crack resistance, stiffness and processability and are useful in the manufacture of molded articles.

The blends also provide good oxygen transmission rates when used to make a molded article such as a closure for bottles.

Provided in one embodiment of the disclosure is a polyethylene blend comprising from 5 to 95 weight percent of a polyethylene homopolymer composition, and from 95 to 5 weight percent of a bimodal polyethylene copolymer; wherein the polyethylene homopolymer composition comprises a nucleating agent or mixture of nucleating agents.

In an embodiment of the disclosure, the bimodal polyethylene homopolymer comprises (I) 5 to 70 weight % of a first ethylene homopolymer having a density of from 0.950 to 0.975 g/cm³; and (II) 95 to 30 weight % of a second ethylene homopolymer having a density of from 0.950 to 0.975 g/cm³, wherein the ratio of the melt index $I_2$ of the second ethylene homopolymer to the melt index $I_2$ of the first ethylene homopolymer is at least 10.

In an embodiment of the disclosure, the bimodal polyethylene copolymer comprises (III) 10 to 70 weight % of a first ethylene copolymer having a melt index, $I_2$, of less than 0.4 g/10 min and a density of from 0.925 to 0.950 g/cm³; and (IV) 90 to 30 weight % of a second ethylene copolymer having a melt index $I_2$, of from 100 to 20,000 g/10 min and a density higher than the density of the first ethylene copolymer, but less than 0.967 g/cm³;
   wherein the density of the second ethylene copolymer is less than 0.037 g/cm³ higher than the density of the first ethylene copolymer; and the ratio (SCB1/SCB2) of the number of short chain branches per thousand carbon atoms in the first ethylene copolymer (SCB1) to the number of short chain branches per thousand carbon atoms in the second ethylene copolymer (SCB2) is greater than 0.5.

In an embodiment of the disclosure, the polyethylene blend has a bimodal profile in a gel permeation chromatograph.

In an embodiment of the disclosure, the polyethylene blend has a density of from 0.951 to 0.971 g/cm³.

In an embodiment of the disclosure, the polyethylene blend has a melt index, $I_2$ of from 1.0 to 10.0 g/10 min.

In an embodiment of the disclosure, the polyethylene blend has a molecular weight distribution $M_W/M_N$ of from 3.0 to 13.0.

In an embodiment of the disclosure, the polyethylene blend comprises from 20 to 80 weight percent of the polyethylene homopolymer composition and from 80 to 20 weight percent of the bimodal polyethylene copolymer based on the weight of the polyethylene blend.

In an embodiment of the disclosure, the polyethylene blend comprises from about 10 to 60 weight percent of the polyethylene homopolymer composition and from 90 to 40 weight percent of the bimodal polyethylene copolymer based on the weight of the polyethylene blend.

In an embodiment of the disclosure, the nucleating agent, or mixture of nucleating agents comprise a salt of a dicarboxylic acid.

In an embodiment of the disclosure, the ethylene homopolymer composition comprises from 100 to 3000 ppm of the nucleating agent or the mixture or nucleating agents.

In an embodiment of the disclosure, a compression molded article comprising the polyethylene blend is provided.

In an embodiment of the disclosure, an injection molded article comprising the polyethylene blend is provided.

In an embodiment of the disclosure, a closure comprising the polyethylene blend is provided.

In an embodiment of the disclosure, a film comprising the polyethylene blend is provided.

Figure 1:
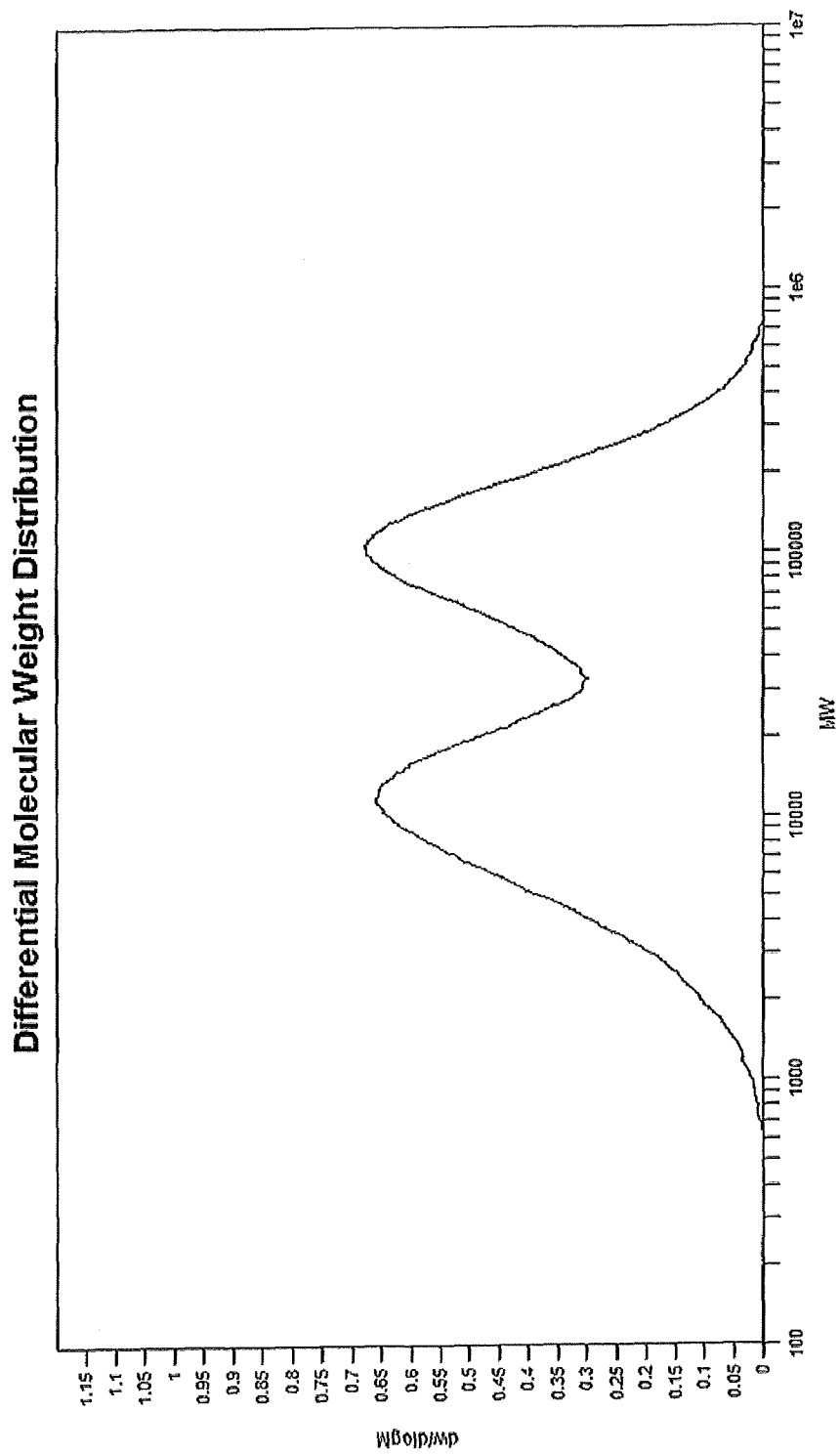
FIG. 1 shows a gel permeation chromatograph for "Blend Component A", a polyethylene homopolymer composition used in an embodiment of the present disclosure.

By the term "ethylene homopolymer" or "polyethylene homopolymer", it is meant that the product polymer is the product of a polymerization process, where only ethylene was deliberately added as a polymerizable olefin.

By the term "ethylene copolymer" or "polyethylene copolymer", it is meant that the product polymer is the product of a polymerization process, where ethylene and one or more than one comonomer were deliberately added or was deliberately present as polymerizable olefins.

The term "unimodal" is herein defined to mean there will be only one significant peak or maximum evident in a GPC-curve. A unimodal profile includes a broad unimodal profile. Alternatively, the term "unimodal" connotes the presence of a single maxima in a molecular weight distribution curve generated according to the method of ASTM D6474-99. In contrast, by the term "bimodal" it is meant that there will be a secondary peak or shoulder evident in a GPC-curve which represents a higher or lower molecular weight component (i.e. the molecular weight distribution, can be said to have two maxima in a molecular weight distribution curve). Alternatively, the term "bimodal" connotes the presence of two maxima in a molecular weight distribution curve generated according to the method of ASTM D6474-99. The term "multi-modal" denotes the presence of two or more maxima in a molecular weight distribution curve generated according to the method of ASTM D6474-99.

In an embodiment of the present disclosure, a polyethylene blend comprises A) a nucleated polyethylene homopolymer composition and B) a bimodal polyethylene copolymer.

In an embodiment of the disclosure, the polyethylene homopolymer composition comprises a nucleating agent while the bimodal polyethylene copolymer composition does not comprise a nucleating agent.

In an embodiment of the disclosure, both the polyethylene homopolymer composition and the bimodal polyethylene copolymer comprise a nucleating agent.

In an embodiment of the present disclosure, a polyethylene homopolymer composition comprises a nucleating agent or a mixture of nucleating agents.

In an embodiment of the disclosure, the polyethylene homopolymer composition comprises two components, I) a first ethylene homopolymer and II) a second ethylene homopolymer.

In an embodiment of the disclosure, the bimodal polyethylene copolymer comprises two components, III) a first ethylene copolymer and IV) a second ethylene copolymer.

I) The First Ethylene Homopolymer

In the present disclosure, the first ethylene homopolymer comprises negligible amounts of comonomer.

In an embodiment of the disclosure, the first ethylene homopolymer has a melt index, $I_2$ which is lower than the melt index, $I_2$ of the second ethylene homopolymer.

In an embodiment of the disclosure, the first ethylene homopolymer has a melt index, $I_2$ which is at least 50 percent smaller the than melt index, $I_2$ of the second ethylene homopolymer.

In an embodiment of the disclosure, the first ethylene homopolymer has a melt index, $I_2$ which is at least 10 times smaller the than melt index, $I_2$ of the second ethylene homopolymer.

In an embodiment of the disclosure, the first ethylene homopolymer has a weight average molecular weight, $M_W$ that is higher than the weight average molecular weight, $M_W$ of the second ethylene homopolymer.

As will be recognized by those skilled in the art, melt index, $I_2$, is in general inversely proportional to molecular weight. Thus, in an embodiment of the disclosure, the first ethylene homopolymer has a comparatively low melt index, $I_2$ (or, alternatively stated, a comparatively high molecular weight) in comparison to the second ethylene homopolymer.

In an embodiment of the disclosure, the first ethylene homopolymer has a density of from 0.950 to 0.975 $g/cm^3$. In another embodiment of the disclosure, the first ethylene homopolymer has a density of from 0.955 to 0.970 $g/cm^3$. In another embodiment of the disclosure, the first ethylene homopolymer has a density of from 0.955 to 0.965 $g/cm^3$.

In an embodiment of the disclosure, the first ethylene homopolymer has a melt index, $I_2$ of from about 0.1 to about 2.0 grams/10 minutes (g/10 min).

In an embodiment of the disclosure, the molecular weight distribution (Mw/Mn) of the first ethylene homopolymer is from about 1.7 to about 20.0. In further embodiments of the disclosure, the molecular weight distribution (Mw/Mn) of the first ethylene homopolymer is from about 2.0 to about 20.0, or from about 1.7 to about 4.0, or from about 2.0 to about 4.0.

In an embodiment of the disclosure, the first ethylene homopolymer may itself comprise one or more high density ethylene homopolymer subcomponents.

In an embodiment of the disclosure, the first ethylene homopolymer comprises from 5 to 70 weight percent (wt %) of the total weight of the first and second ethylene homopolymers. In an embodiment of the disclosure, the first ethylene homopolymer comprises from 5 to 60 weight percent (wt %) of the total weight of the first and second ethylene homopolymers. In an embodiment of the disclosure, the first ethylene homopolymer comprises from 10 to 70 weight percent (wt %) of the total weight of the first and second ethylene homopolymers. In an embodiment of the disclosure, the first ethylene homopolymer comprises from 15 to 70 weight percent (wt %) of the total weight of the first and second ethylene homopolymers. In an embodiment of the disclosure, the first ethylene homopolymer comprises from 20 to 70 weight percent (wt %) of the total weight of the first and second ethylene homopolymers. In an embodiment of the disclosure, the first ethylene homopolymer comprises from 25 to 70 weight percent (wt %) of the total weight of the first and second ethylene homopolymers. In an embodiment of the disclosure, the first ethylene homopolymer comprises from 30 to 70 weight percent (wt %) of the total weight of the first and second ethylene homopolymers. In an embodiment of the disclosure, the first ethylene homopolymer comprises from 35 to 65 weight percent (wt %) of the total weight of the first and second ethylene homopolymers. In an embodiment of the disclosure, the first ethylene homopolymer comprises from 40 to 60 weight percent (wt %) of the total weight of the first and second ethylene homopolymers.

II) The Second Ethylene Homopolymer

In the present disclosure, the second ethylene homopolymer comprises negligible amounts of comonomer.

In an embodiment of the disclosure, the second ethylene homopolymer has a melt index, $I_2$ which is higher than the melt index, $I_2$ of the first ethylene homopolymer.

In an embodiment of the disclosure, the second ethylene homopolymer has a melt index, $I_2$ which is at least 50 percent greater the than melt index, $I_2$ of the first ethylene homopolymer.

In an embodiment of the disclosure, the second ethylene homopolymer has a melt index, $I_2$ which is at least 10 times larger the than melt index, $I_2$ of the first ethylene homopolymer.

In an embodiment of the disclosure, the second ethylene homopolymer has a weight average molecular weight, $M_W$ that is lower than the weight average molecular weight, $M_W$ of the first ethylene homopolymer.

As will be recognized by those skilled in the art, melt index, $I_2$, is in general inversely proportional to molecular weight. Thus, in an embodiment of the disclosure, the second ethylene homopolymer has a comparatively high melt index, $I_2$ (or, alternatively stated, a comparatively low molecular weight) in comparison to the first ethylene homopolymer.

In an embodiment of the disclosure, the second ethylene homopolymer has a density of from 0.950 to 0.975 g/cm$^3$. In another embodiment of the disclosure, the second ethylene homopolymer has a density of from 0.955 to 0.970 g/cm$^3$. In another embodiment of the disclosure, the second ethylene homopolymer has a density of from 0.955 to 0.965 g/cm$^3$.

In an embodiment of the disclosure, the second ethylene homopolymer has a melt index, $I_2$ of greater than about 5.0 g/10 min. In further embodiments, the second ethylene homopolymer may have a melt index of from greater than about 5.0 to about 50 g/10 min, or from greater than 5.0 to about 40.0 g/10 min, or from greater than 5.0 to about 30 g/10 min, or from greater than 5.0 to about 20.0 g/10 min.

In an embodiment of the disclosure, the molecular weight distribution (Mw/Mn) of the second ethylene homopolymer is from about 1.7 to about 20.0. In further embodiments of the disclosure, the molecular weight distribution (Mw/Mn) of the second ethylene homopolymer is from about 2.0 to about 20.0, or from about 1.7 to about 4.0, or from about 2.0 to about 4.0.

In an embodiment of the disclosure, the second ethylene homopolymer may itself comprise one or more high density ethylene homopolymer subcomponents.

In an embodiment of the disclosure, the second ethylene homopolymer comprises from 95 to 30 weight percent (wt %) of the total weight of the first and second ethylene homopolymers. In an embodiment of the disclosure, the second ethylene homopolymer comprises from 95 to 40 weight percent (wt %) of the total weight of the first and second ethylene homopolymers. In an embodiment of the disclosure, the second ethylene homopolymer comprises from 90 to 30 weight percent (wt %) of the total weight of the first and second ethylene homopolymers. In an embodiment of the disclosure, the second ethylene homopolymer comprises from 85 to 30 weight percent (wt %) of the total weight of the first and second ethylene homopolymers. In an embodiment of the disclosure, the second ethylene homopolymer comprises from 80 to 30 weight percent (wt %) of the total weight of the first and second ethylene homopolymers. In an embodiment of the disclosure, the second ethylene homopolymer comprises from 75 to 30 weight percent (wt %) of the total weight of the first and second ethylene homopolymers. In an embodiment of the disclosure, the second ethylene homopolymer comprises from 70 to 30 weight percent (wt %) of the total weight of the first and second ethylene homopolymers. In an embodiment of the disclosure, the first ethylene homopolymer comprises from 65 to 35 weight percent (wt %) of the total weight of the first and second ethylene homopolymers. In an embodiment of the disclosure, the first ethylene homopolymer comprises from 60 to 40 weight percent (wt %) of the total weight of the first and second ethylene homopolymers.

The Polyethylene Homopolymer Composition

In an embodiment of the disclosure, the polyethylene homopolymer composition minimally comprises a I) first ethylene homopolymer; and a II) second ethylene homopolymer.

In an embodiment of the disclosure, the polyethylene homopolymer composition has a bimodal profile in a gel permeation chromatograph.

In an embodiment of the disclosure, the polyethylene homopolymer composition has a multimodal profile in a gel permeation chromatograph.

In an embodiment of the disclosure, the polyethylene homopolymer composition comprises one or more than one nucleating agent.

In an embodiment of the disclosure, the polyethylene homopolymer composition has a density of a least 0.950 grams per cubic centimeter, g/cm$^3$. In another embodiment of the disclosure, the polyethylene homopolymer composition has a density of a least 0.955 grams per cubic centimeter, g/cm$^3$.

In embodiments of the invention, the polyethylene homopolymer composition has a density of from 0.952 to 0.973 g/cm, or from 0.955 to 0.970 g/cm$^3$.

In an embodiment of the disclosure, the polyethylene homopolymer composition has a melt index, $I_2$ of from 0.5 to 10 g/10 min. In another embodiment of the disclosure, the polyethylene homopolymer composition has a melt index, $I_2$ of from 0.8 to 8 g/10 min.

In an embodiment of the disclosure, the polyethylene homopolymer composition has a molecular weight distribution (Mw/Mn) of from about 3.0 to about 20.0.

The polyethylene homopolymer composition may be made by any blending process, such as: 1) physical blending of particulate resins; 2) co-feed of different resins to a common extruder; 3) melt mixing (in any conventional polymer mixing apparatus); 4) solution blending; or 5) a polymerization process which employs 2 or more reactors.

In an embodiment of the disclosure, the polyethylene homopolymer composition is prepared by a solution polymerization process using two reactors that operate under different polymerization conditions. This provides a uniform, in-situ blend of the first and second ethylene homopolymer components. An example of this process is described in published U.S. Patent Application Publication No. 2006/0047078, the disclosure of which is incorporated herein by reference.

In an embodiment of the disclosure, the polyethylene homopolymer composition is prepared by melt blending a first and second ethylene homopolymer in an extruder.

In an embodiment of the disclosure, the polyethylene homopolymer composition is prepared by melt blending the following two blend components in an extruder:
from 90 to 70 weight % of I) a first ethylene homopolymer which is a conventional high density polyethylene (HDPE) having a melt index, $I_2$, of from about 0.8 to about 2.0 grams/10 minutes and a density of from 0.955 to 0.965 g/cm$^3$, with from 10 to 30 weight % of II) a second ethylene homopolymer which is a conventional high density polyethylene (HDPE) having a melt index, $I_2$, of from about 15 to about 30 grams/10 minutes and a density of from 0.950 to 0.960 g/cm$^3$.

Examples of commercially available HDPE resins which are suitable for use as the first ethylene homopolymer include (with typical melt index and density values shown in brackets): SCLAIR® 19G, available from NOVA Chemicals ($I_2$=1.2 g/10 min, density=0.962 g/cm$^3$); MARFLEX® 9659, available from Chevron Phillips ($I_2$=1 g/10 min, density=0.962 g/cm$^3$); and ALATHON® L 5885, available from Equistar ($I_2$=0.9 g/10 min, density=0.958 g/cm$^3$).

An example of a commercially available HDPE resin which is suitable for use as the second ethylene homopolymer is sold under the trademark SCLAIR 79F, which is an HDPE resin that is prepared by the homopolymerization of ethylene with a conventional Ziegler-Natta catalyst. It has a typical melt index, $I_2$ of 18 g/10 min, a typical density of 0.963 g/cm$^3$ and a typical molecular weight distribution of about 2.7.

In an embodiment of the disclosure, the polyethylene homopolymer composition is prepared by a solution polymerization process using two reactors that operate under different polymerization conditions. This provides a uniform, in situ blend of the first and second ethylene homopolymer components. Such a blend can, for example, be made according to US Pat. Application Publication No. US2013/0225743 or US2008/0118749.

Nucleating Agents

The term "nucleating agent", as used herein, is meant to convey its conventional meaning to those skilled in the art of preparing nucleated polyolefin compositions, namely an additive that changes the crystallization behavior of a polymer as the polymer melt is cooled.

A review of nucleating agents is provided in U.S. Pat. Nos. 5,981,636, 6,465,551 and 6,599,971, the disclosures of which are incorporated herein by reference.

Nucleating agents which are commercially available and which may be added to the polyethylene homopolymer composition are dibenzylidene sorbital esters (such as the products sold under the trademark MILLAD® 3988 by Milliken Chemical and IRGACLEAR® by Ciba Specialty Chemicals). Further examples of nucleating agents which may be added to the polyethylene homopolymer composition include the cyclic organic structures disclosed in U.S. Pat. No. 5,981,636 (and salts thereof, such as disodium bicyclo [2.2.1] heptene dicarboxylate); the saturated versions of the structures disclosed in U.S. Pat. No. 5,981,636 (as disclosed in U.S. Pat. No. 6,465,551; Zhao et al., to Milliken); the salts of certain cyclic dicarboxylic acids having a hexahydrophthalic acid structure (or "HHPA" structure) as disclosed in U.S. Pat. No. 6,599,971 (Dotson et al., to Milliken); and phosphate esters, such as those disclosed in U.S. Pat. No. 5,342,868 and those sold under the trade names NA-11 and NA-21 by Asahi Denka Kogyo, cyclic dicarboxylates and the salts thereof, such as the divalent metal or metalloid salts, (particularly, calcium salts) of the HHPA structures disclosed in U.S. Pat. No. 6,599,971. For clarity, the HHPA structure comprises a ring structure with six carbon atoms in the ring and two carboxylic acid groups which are substituents on adjacent atoms of the ring structure. The other four carbon atoms in the ring may be substituted, as disclosed in U.S. Pat. No. 6,599,971. An example is 1,2-cyclohexanedicarboxylicacid, calcium salt (CAS registry number 491589-22-1). Still further examples of nucleating agents which may be added to the polyethylene homopolymer composition include those disclosed in WO2015042561, WO2015042563, WO2015042562 and WO2011050042.

Many of the above described nucleating agents may be difficult to mix with the polyethylene homopolymer composition that is being nucleated and it is known to use dispersion aids, such as for example, zinc stearate, to mitigate this problem.

In an embodiment of the disclosure, the nucleating agents are well dispersed in the polyethylene homopolymer composition.

In an embodiment of the disclosure, the amount of nucleating agent used is comparatively small—from 100 to 3000 parts by million per weight (based on the weight of the polyethylene composition) so it will be appreciated by those skilled in the art that some care should be taken to ensure that the nucleating agent is well dispersed. In an embodiment of the disclosure, the nucleating agent is added in finely divided form (less than 50 microns, especially less than 10 microns) to the polyethylene homopolymer composition to facilitate mixing. This type of "physical blend" (i.e. a mixture of the nucleating agent and the resin in solid form) is in some embodiments preferable to the use of a "masterbatch" of the nucleator (where the term "masterbatch" refers to the practice of first melt mixing the additive—the nucleator, in this case—with a small amount of the polyethylene homopolymer composition—then melt mixing the "masterbatch" with the remaining bulk of the polyethylene homopolymer composition).

In an embodiment of the disclosure, an additive such as nucleating agent may be added to the polyethylene homopolymer composition by way of a "masterbatch", where the term "masterbatch" refers to the practice of first melt mixing the additive (e.g. a nucleator) with a small amount of the polyethylene homopolymer composition, followed by melt mixing the "masterbatch" with the remaining bulk of the polyethylene homopolymer composition.

In an embodiment of the disclosure, the polyethylene homopolymer composition comprises a nucleating agent or a mixture of nucleating agents.

Other Additives

The polyethylene homopolymer composition may also contain other conventional additives, especially (1) primary antioxidants (such as hindered phenols, including vitamin E); (2) secondary antioxidants (especially phosphites and phosphonites); and (3) process aids (especially fluoroelastomer and/or polyethylene glycol bound process aid).

The Bimodal Polyethylene Copolymer

Minimally, the bimodal polyethylene copolymer will contain III) a first ethylene copolymer and IV) a second ethylene copolymer (as defined above) which are of different weight average molecular weight ($M_w$) and/or melt index, $I_2$.

III) The First Ethylene Copolymer

In an embodiment of the disclosure, the first ethylene copolymer of the bimodal polyethylene copolymer has a density of from about 0.920 g/cm$^3$ to about 0.955 g/cm$^3$; a melt index, $I_2$, of less than about 0.4 g/10 min; a molecular weight distribution, $M_w/M_n$, of below about 3.0 and a weight average molecular weight, $M_w$, that is greater than the $M_w$ of the second ethylene copolymer. In an embodiment of the disclosure, the weight average molecular weight, $M_w$, of the first ethylene copolymer is at least 110,000.

In an embodiment of the disclosure, the first ethylene copolymer of the bimodal polyethylene copolymer has a density of from about 0.920 g/cm$^3$ to about 0.955 g/cm$^3$; a melt index, $I_2$, of less than about 0.4 g/10 min; a molecular weight distribution, $M_w/M_n$, of below about 2.7 and a weight average molecular weight, $M_w$, that is greater than the $M_w$ of the second ethylene copolymer.

In an embodiment of the disclosure, the first ethylene copolymer is a homogeneously branched copolymer.

In an embodiment of the disclosure, the first ethylene copolymer is made with a single site catalyst, such as for example a phosphinimine catalyst.

In an embodiment of the disclosure, the comonomer (i.e., alpha-olefin) content in the first ethylene copolymer can be from about 0.05 to about 3.0 mol %. The comonomer content of the first ethylene polymer is determined by mathematical deconvolution methods applied to a bimodal polyethylene copolymer (see the Examples section).

In embodiments of the disclosure, the comonomer in the first ethylene copolymer is one or more olefin such as but not limited to 1-butene, 1-hexene, 1-octene and the like.

In an embodiment of the disclosure, the first ethylene copolymer is a copolymer of ethylene and 1-octene.

In an embodiment of the disclosure, the short chain branching in the first ethylene copolymer can be from about 0.25 to about 15 short chain branches per thousand carbon atoms (SCB1/1000 Cs). In further embodiments of the disclosure, the short chain branching in the first ethylene copolymer can be from 0.5 to 15, or from 0.5 to 12, or from 0.5 to 10, or from 0.75 to 15, or from 0.75 to 12, or from 0.75 to 10, or from 1.0 to 10, or from 1.0 to 8.0, or from 1.0 to 5, or from 1.0 to 3 branches per thousand carbon atoms (SCB1/1000 Cs). The short chain branching is the branching due to the presence of alpha-olefin comonomer in the ethylene copolymer and will for example have two carbon atoms for a 1-butene comonomer, or four carbon atoms for a 1-hexene comonomer, or six carbon atoms for a 1-octene comonomer, etc. The number of short chain branches in the first ethylene copolymer is determined by mathematical deconvolution methods applied to a bimodal polyethylene copolymer (see the Examples section).

In an embodiment of the disclosure, the comonomer content in the first ethylene copolymer is substantially similar or approximately equal (e.g. within about ±0.01 mol %) to the comonomer content of the second ethylene copolymer (as reported for example in mol %).

In an embodiment of the disclosure, the comonomer content in the first ethylene copolymer is greater than comonomer content of the second ethylene copolymer (as reported for example in mol %).

In an embodiment of the disclosure, the amount of short chain branching in the first ethylene copolymer is substantially similar or approximately equal (e.g. within about ±0.05 SCB/1000 Cs) to the amount of short chain branching in the second ethylene copolymer (as reported in short chain branches, SCB per thousand carbons in the polymer backbone, 1000 Cs).

In an embodiment of the disclosure, the amount of short chain branching in the first ethylene copolymer is greater than the amount of short chain branching in the second ethylene copolymer (as reported in short chain branches, SCB per thousand carbons in the polymer backbone, 1000 Cs).

In an embodiment of the disclosure, the melt index, $I_2$ of the first ethylene copolymer is less than 0.4 g/10 min. The melt index of the first ethylene copolymer can in an embodiment of the disclosure be above 0.01, but below 0.4 g/10 min. In further embodiments of the disclosure, the melt index, $I_2$ of the first ethylene copolymer will be from 0.01 to 0.40 g/10 min, or from 0.01 to 0.30 g/10 min, or from 0.01 to 0.25 g/10 min, or from 0.01 to 0.20 g/10 min, or from 0.01 to 0.10 g/10 min.

In an embodiment of the disclosure, the first ethylene copolymer has a weight average molecular weight $M_w$ of from about 110,000 to about 300,000 (g/mol). In another embodiment of the disclosure, the first ethylene copolymer has a weight average molecular weight $M_w$ of from about 110,000 to about 275,000 or from about 110,000 to about 250,000. In another embodiment of the disclosure, the first ethylene copolymer has a weight average molecular weight $M_w$ of greater than about 110,000 to less than about 250,000. In further embodiments of the disclosure, the first ethylene copolymer has a weight average molecular weight $M_w$ of from about 125,000 to about 225,000, or from about 135,000 to about 200,000. In embodiments of the disclosure, the first ethylene copolymer has a weight average molecular weight $M_w$ of from about 125,000 to about 275,000, or from about 125,000 to about 250,000, or from about 150,000 to about 275,000, or from about 150,000 to about 250,000, or from about 175,000 to about 250,000. In embodiments of the disclosure, the first ethylene copolymer has a $M_w$ of greater than 110,000, or greater than 125,000, or greater than 150,000, or greater than 175,000. In embodiments of the disclosure the first ethylene copolymer has a $M_w$ of greater than 110,000, or greater than 125,000, or greater than 150,000, or greater than 175,000 while at the same time being lower than 275,000, or 250,000.

In embodiments of the disclosure, the first ethylene copolymer has a weight average molecular weight $M_w$ of from about 125,000 to about 275,000, or from about 125,000 to about 250,000, or from about 125,000 to about 230,000, or from about 150,000 to about 275,000, or from about 150,000 to about 250,000, or from about 175,000 to about 250,000, or from about 180,000 to about 230,000. In embodiments of the disclosure, the first ethylene copolymer has a $M_w$ of greater than 150,000, or greater than 175,000, or greater than 180,000, or greater than 190,000, or greater than 200,000. In embodiments of the disclosure the first ethylene copolymer has a $M_w$ of greater than 150,000, or greater than 175,000, or greater than 180,000, or greater than 190,000, or greater than 200,000 while at the same time being lower than 275,000, or 250,000.

In embodiments of the disclosure, the density of the first ethylene copolymer is from 0.920 to 0.955 g/cm³ or can be a narrower range within this range. For example, in further embodiments of the disclosure, the density of the first ethylene copolymer can be from 0.925 to 0.955 g/cm³, or from 0.925 to 0.950 g/cm³, or from 0.925 to 0.945 g/cm³, or from 0.925 to 0.940 g/cm³, or from 0.925 to 0.935 g/cm³, or from 0.923 to 0.945 g/cm³, or from 0.923 to 0.940 g/cm³, or from 0.923 to 0.935 g/cm³, or from 0.927 to 0.945 g/cm³, or from 0.927 to 0.940 g/cm³, or from 0.927 to 0.935 g/cm³, or from 0.920 to 0.940 g/cm³, or from 0.922 to 0.948 g/cm³, or from 0.925 to 0.935 g/cm³.

In an embodiments of the disclosure, the first ethylene copolymer has a molecular weight distribution $M_w/M_n$ of <3.0, or ≤2.7, or <2.7, or ≤2.5, or <2.5, or ≤2.3, or from 1.8 to 2.3.

The $M_w/M_n$ value of the first ethylene copolymer can, in an embodiment of the disclosure, be estimated by a de-convolution of a GPC profile obtained for a bimodal polyethylene copolymer of which the first ethylene copolymer is a component.

The density and the melt index, $I_2$, of the first ethylene copolymer can be estimated from GPC (gel permeation chromatography) and GPC-FTIR (gel permeation chromatography with Fourier transform infra-red detection) experiments and deconvolutions carried out on the bimodal polyethylene copolymer (see the Examples section).

In an embodiment of the disclosure, the first ethylene copolymer of the bimodal polyethylene copolymer is a homogeneously branched ethylene copolymer having a weight average molecular weight, $M_w$, of at least 110,000; a molecular weight distribution, $M_w/M_n$, of less than 2.7 and a density of from 0.920 to 0.948 g/cm³.

In an embodiment of the disclosure, the first ethylene copolymer of the bimodal polyethylene copolymer is a homogeneously branched ethylene copolymer having a weight average molecular weight, $M_w$, of at least 175,000; a molecular weight distribution, $M_w/M_n$, of less than 2.7 and a density of from 0.922 to 0.948 g/cm³.

In an embodiment of the present disclosure, the first ethylene copolymer is homogeneously branched ethylene copolymer and has a $CDBI_{50}$ of greater than about 50%, or greater than about 55% by weight. In further embodiments of the disclosure, the first ethylene copolymer has a $CDBI_{50}$ of greater than about 60%, or greater than about 65%, or greater than about 70%, or greater than about 75%, or greater than about 80% by weight.

In an embodiment of the disclosure, the first ethylene copolymer can comprise from 10 to 70 weight percent (wt %) of the total weight of the first and second ethylene copolymers. In an embodiment of the disclosure, the first ethylene copolymer comprises from 20 to 60 weight percent (wt %) of the total weight of the first and second ethylene copolymers. In an embodiment of the disclosure, the first ethylene copolymer comprises from 30 to 60 weight percent (wt %) of the total weight of the first and second ethylene copolymers. In an embodiment of the disclosure, the first ethylene copolymer comprises from 40 to 50 weight percent (wt %) of the total weight of the first and second ethylene copolymers.

(IV) The Second Ethylene Copolymer

In an embodiment of the disclosure, the second ethylene copolymer of the bimodal polyethylene copolymer has a density below 0.967 g/cm$^3$ but which is higher than the density of the first ethylene copolymer; a melt index, $I_2$, of from about 100 to 10,000 g/10 min; a molecular weight distribution, $M_w/M_n$, of below about 3.0 and a weight average molecular weight $M_w$ that is less than the $M_w$ of the first ethylene copolymer. In an embodiment of the disclosure, the weight average molecular weight, $M_w$ of the second ethylene copolymer will be below 45,000.

In an embodiment of the disclosure, the second ethylene copolymer of the bimodal polyethylene copolymer has a density below 0.967 g/cm$^3$ but which is higher than the density of the first ethylene copolymer; a melt index, $I_2$, of from about 500 to about 20,000 g/10 min; a molecular weight distribution, $M_w/M_n$, of below about 2.7, and a weight average molecular weight $M_w$ that is less than the $M_w$ of the first ethylene copolymer.

In an embodiment of the disclosure, the second ethylene copolymer of the bimodal polyethylene copolymer has a density below 0.965 g/cm$^3$ but which is higher than the density of the first ethylene copolymer; a melt index, $I_2$, of from about 250 to 20,000 g/10 min; a molecular weight distribution, $M_w/M_n$, of below about 2.7 and a weight average molecular weight $M_w$ that is less than the $M_w$ of the first ethylene copolymer.

In an embodiment of the disclosure, the second ethylene copolymer is homogeneously branched copolymer.

In an embodiment of the disclosure, the second ethylene copolymer is made with a single site catalyst, such as for example a phosphinimine catalyst.

In an embodiment of the disclosure, the comonomer content in the second ethylene copolymer can be from about 0.05 to about 3 mol % as measured by $^{13}$C NMR, or FTIR or GPC-FTIR methods. The comonomer content of the second ethylene polymer can also be determined by mathematical deconvolution methods applied to a bimodal polyethylene copolymer (see the Examples section).

In an embodiment of the disclosure, the comonomer content in the second ethylene copolymer can be from about 0.01 to about 3 mol %, or from about 0.03 to about 3 mol % as measured by $^{13}$C NMR, or FTIR or GPC-FTIR methods. The comonomer content of the second ethylene polymer can also be determined by mathematical deconvolution methods applied to a bimodal polyethylene copolymer (see the Examples section).

In an embodiment of the disclosure, the comonomer content in the second ethylene copolymer can be from about 0.01 to about 3 mol % or from about 0.03 to about 3 mol %, or from about 0.05 to about 3 mol % as measured by $^{13}$C NMR, or FTIR or GPC-FTIR methods. The comonomer content of the second ethylene polymer may be determined by mathematical deconvolution methods applied to a bimodal polyethylene copolymer (see the Examples section).

In an embodiment of the disclosure, the comonomer in the second ethylene copolymer is one or more alpha olefin such as but not limited to 1-butene, 1-hexene, 1-octene and the like.

In an embodiment of the disclosure, the second ethylene copolymer is a copolymer of ethylene and 1-octene.

In an embodiment of the disclosure, the short chain branching in the second ethylene copolymer can be from about 0.25 to about 15 short chain branches per thousand carbon atoms (SCB2/1000Cs). In further embodiments of the disclosure, the short chain branching in the second ethylene copolymer can be from 0.25 to 12, or from 0.25 to 8, or from 0.25 to 5, or from 0.25 to 3, or from 0.25 to 2 branches per thousand carbon atoms (SCB2/1000Cs). The short chain branching is the branching due to the presence of alpha-olefin comonomer in the ethylene copolymer and will for example have two carbon atoms for a 1-butene comonomer, or four carbon atoms for a 1-hexene comonomer, or six carbon atoms for a 1-octene comonomer, etc. The number of short chain branches in the second ethylene copolymer can be measured by $^{13}$C NMR, or FTIR or GPC-FTIR methods. Alternatively, the number of short chain branches in the second ethylene copolymer can be determined by mathematical deconvolution methods applied to a bimodal polyethylene copolymer (see the Examples section).

In an embodiment of the disclosure, the short chain branching in the second ethylene copolymer can be from about 0.05 to about 12 short chain branches per thousand carbon atoms (SCB1/1000Cs). In further embodiments of the disclosure, the short chain branching in the second ethylene copolymer can be from 0.05 to 10, or from 0.05 to 7.5, or from 0.05 to 5.0, or from 0.05 to 2.5, or from 0.05 to 1.5, or from 0.1 to 12, or from 0.1 to 10, or from 0.1 to 7.5, or from 0.1 to 5.0, or from 0.1 to 2.5, or from 0.1 to 2.0, or from 0.1 to 1.0 branches per thousand carbon atoms (SCB1/1000Cs).

In an embodiment of the disclosure, the short chain branching in the second ethylene copolymer can be from about 0.15 to about 15 short chain branches per thousand carbon atoms (SCB2/1000Cs). In further embodiments of the disclosure, the short chain branching in the second ethylene copolymer can be from 0.15 to 12, or from 0.15 to 8, or from 0.15 to 5, or from 0.15 to 3, or from 0.15 to 2 branches per thousand carbon atoms (SCB2/1000Cs). The short chain branching is the branching due to the presence of alpha-olefin comonomer in the ethylene copolymer and will for example have two carbon atoms for a 1-butene comonomer, or four carbon atoms for a 1-hexene comonomer, or six carbon atoms for a 1-octene comonomer, etc.

The number of short chain branches in the second ethylene copolymer may be determined by mathematical deconvolution methods applied to a bimodal polyethylene copolymer (see the Examples section).

In an embodiment of the disclosure, the comonomer content in the second ethylene copolymer is substantially similar or approximately equal (e.g., within about ±0.01 mol %) to the comonomer content of the first ethylene copolymer (as reported for example in mol %).

In an embodiment of the disclosure, the comonomer content in the second ethylene copolymer is less than the comonomer content of the first ethylene copolymer (as reported for example in mol %).

In an embodiment of the disclosure, the amount of short chain branching in the second ethylene copolymer is substantially similar or approximately equal (e.g., within about ±0.05 SCB/1000C) to the amount of short chain branching in the first ethylene copolymer (as reported in short chain branches, SCB per thousand carbons in the polymer backbone, 1000Cs).

In an embodiment of the disclosure, the amount of short chain branching in the second ethylene copolymer is less than the amount of short chain branching in the first ethylene copolymer (as reported in short chain branches, SCB per thousand carbons in the polymer backbone, 1000Cs).

In an embodiment of the present disclosure, the density of the second ethylene copolymer is less than 0.967 g/cm$^3$. The density of the second ethylene copolymer in another embodiment of the disclosure is less than 0.966 g/cm$^3$. In another embodiment of the disclosure, the density of the second ethylene copolymer is less than 0.965 g/cm$^3$. In another embodiment of the disclosure, the density of the second ethylene copolymer is less than 0.964 g/cm$^3$. In another embodiment of the disclosure, the density of the second ethylene copolymer is less than 0.963 g/cm$^3$. In another embodiment of the disclosure, the density of the second ethylene copolymer is less than 0.962 g/cm$^3$.

In an embodiment of the present disclosure, the density of the second ethylene copolymer is higher than the density of the first ethylene copolymer, but is less than 0.967 g/cm$^3$. The density of the second ethylene copolymer in another embodiment of the disclosure is higher than the density of the first ethylene copolymer, but is less than 0.966 g/cm$^3$. In another embodiment of the disclosure, the density of the second ethylene copolymer is higher than the density of the first ethylene copolymer, but is less than 0.965 g/cm$^3$. In another embodiment of the disclosure, the density of the second ethylene copolymer is higher than the density of the first ethylene copolymer, but is less than 0.964 g/cm$^3$. In another embodiment of the disclosure, the density of the second ethylene copolymer is higher than the density of the first ethylene copolymer, but is less than 0.963 g/cm$^3$. In another embodiment of the disclosure, the density of the second ethylene copolymer is higher than the density of the first ethylene copolymer, but is less than 0.962 g/cm$^3$.

In an embodiment of the disclosure, the density of the second ethylene copolymer is from 0.952 to 0.967 g/cm$^3$ or can be a narrower range within this range. For example, the density of the second ethylene copolymer may in embodiments of the disclosure be from 0.952 to 0.966 g/cm$^3$, 0.952 to 0.965 g/cm$^3$, or from 0.952 to 0.964 g/cm$^3$, or from 0.952 to 0.963 g/cm$^3$, or from 0.954 to 0.963 g/cm$^3$, or from 0.954 to 0.964 g/cm$^3$, or from 0.956 to 0.964 g/cm$^3$, or from 0.956 to 0.963 g/cm$^3$, or from 0.952 to less than 0.965 g/cm$^3$, or from 0.954 to less than 0.965 g/cm$^3$.

In an embodiment of the disclosure, the second ethylene copolymer has a weight average molecular weight $M_w$ of less than 25,000. In another embodiment of the disclosure, the second ethylene copolymer has a weight average molecular weight $M_w$ of from about 7,500 to about 23,000. In further embodiments of the disclosure, the second ethylene copolymer has a weight average molecular weight $M_w$ of from about 9,000 to about 22,000, or from about 10,000 to about 17,500, or from about 7,500 to about 17,500. In still further embodiments of the disclosure, the second ethylene copolymer has a weight average molecular weight $M_w$ of from about 3,500 to about 25,000, or from about 5,000 to about 20,000, or from about 7,500 to about 17,500, or from about 5,000 to about 15,000, or from about 5,000 to about 17,500, or from about 7,500 to about 15,000 or from about 7,500 to about 12,500. In further embodiments of the disclosure, the second ethylene copolymer has a weight average molecular weight $M_w$ of from about 9,000 to about 22,000, or from about 10,000 to about 17,500, or from about 7,500 to 17,500.

In embodiments of the disclosure, the second ethylene copolymer has a weight average molecular weight $M_w$ of less than about 45,000, or less than about 40,000 or less than about 35,000. In another embodiment of the disclosure, the second ethylene copolymer has a weight average molecular weight $M_w$ of from about 7,500 to about 35,000. In further embodiments of the disclosure, the second ethylene copolymer has a weight average molecular weight $M_w$ of from about 9,000 to about 35,000, or from about 10,000 to about 35,000, or from about 12,500 to about 30,000, or from about 10,000 to about 25,000, or from about 10,000 to about 20,000.

In embodiments of the disclosure, the second ethylene copolymer has a molecular weight distribution, $M_w/M_n$ of <3.0, or ≤2.7, or <2.7, or ≤2.5, or <2.5, or ≤2.3, or from 1.8 to 2.3.

The Mw/Mn value of the second ethylene copolymer can in an embodiment of the disclosure be estimated by a de-convolution of a GPC profile obtained for a bimodal polyethylene copolymer of which the first ethylene copolymer is a component.

In an embodiment of the disclosure, the melt index $I_2$ of the second ethylene copolymer can be from 20 to 10,000 g/10 min. In another embodiment of the disclosure, the melt index $I_2$ of the second ethylene copolymer can be from 100 to 10,000 g/10 min. In yet another embodiment of the disclosure, the melt index $I_2$ of the second ethylene copolymer can be from 1,000 to 7,000 g/10 min. In yet another embodiment of the disclosure, the melt index $I_2$ of the second ethylene copolymer can be from 1,200 to 10,000 g/10 min. In yet another embodiment of the disclosure, the melt index $I_2$ of the second ethylene copolymer can be from 1,500 to 10,000 g/10 min. In yet another embodiment of the disclosure, the melt index $I_2$ of the second ethylene copolymer can be greater than 1,500, but less than 7,000 g/10 min.

In an embodiment of the disclosure, the melt index $I_2$ of the second ethylene copolymer can be from 250 to 20,000 g/10 min. In another embodiment of the disclosure, the melt index $I_2$ of the second ethylene copolymer can be from 500 to 20,000 g/10 min. In another embodiment of the disclosure, the melt index $I_2$ of the second ethylene copolymer can be from greater than 750 to 20,000 g/10 min. In further embodiments of the disclosure, the melt index $I_2$ of the second ethylene copolymer can be from 1,000 to 20,000 g/10 min, or from 1,500 to 20,000 g/10 min, or from 250 to 15,000 g/10 min, or from 250 to 10,000 g/10 min or from 500 to 17,500 g/10 min, or from 500 to 15,000 g/10 min, or from 1,500 to 15,000 g/10 min. In yet another embodiment of the disclosure, the melt index $I_2$ of the second ethylene copolymer can be from 1,200 to 10,000 g/10 min. In yet another embodiment of the disclosure, the melt index $I_2$ of the second ethylene copolymer can be from 1,500 to 10,000 g/10 min. In yet another embodiment of the disclosure, the melt index $I_2$ of the second ethylene copolymer can be greater than 1500, but less than 7,000 g/10 min.

In an embodiment of the disclosure, the melt index $I_2$ of the second ethylene copolymer can be from 50 to 20,000 g/10 min. In another embodiment of the disclosure, the melt index $I_2$ of the second ethylene copolymer can be from 250 to 20,000 g/10 min.

In another embodiment of the disclosure, the melt index $I_2$ of the second ethylene copolymer can be from 500 to 20,000 g/10 min. In another embodiment of the disclosure, the melt index $I_2$ of the second ethylene copolymer can be from 1,000 to 20,000 g/10 min. In yet another embodiment of the disclosure, the melt index $I_2$ of the second ethylene copolymer can be from 1,500 to 20,000 g/10 min. In yet another embodiment of the disclosure, the melt index $I_2$ of the second ethylene copolymer can be from 1,500 to 10,000 g/10 min. In yet another embodiment of the disclosure, the melt index $I_2$ of the second ethylene copolymer can be from 1,500 to 7,000 g/10 min. In yet another embodiment of the disclosure, the melt index $I_2$ of the second ethylene copolymer can be greater than 1,500, but less than 7,000 g/10 min. In yet another embodiment of the disclosure, the melt index $I_2$ of the second ethylene copolymer can be greater than 1,500, but less than 5,000 g/10 min. In yet another embodiment of the disclosure, the melt index $I_2$ of the second ethylene copolymer can be greater than 1,000, but less than 3,500 g/10 min.

In an embodiment of the disclosure, the melt index $I_2$ of the second ethylene copolymer is greater than 200 g/10 min. In an embodiment of the disclosure, the melt index $I_2$ of the second ethylene copolymer is greater than 250 g/10 min. In an embodiment of the disclosure, the melt index $I_2$ of the second ethylene copolymer is greater than 500 g/10 min. In an embodiment of the disclosure, the melt index $I_2$ of the second ethylene copolymer is greater than 650 g/10 min. In an embodiment of the disclosure, the melt index $I_2$ of the second ethylene copolymer is greater than 1,000 g/10 min. In an embodiment of the disclosure, the melt index $I_2$ of the second ethylene copolymer is greater than 1,200 g/10 min. In an embodiment of the disclosure, the melt index $I_2$ of the second ethylene copolymer is greater than 1,500 g/10 min. In an embodiment of the disclosure, the melt index $I_2$ of the second ethylene copolymer is greater than 1,750 g/10 min.

The density and the melt index, $I_2$, of the second ethylene copolymer can be estimated from GPC and GPC-FTIR experiments and deconvolutions carried out on a bimodal polyethylene copolymer (see the below Examples section).

In an embodiment of the disclosure, the second ethylene copolymer of the bimodal polyethylene copolymer is a homogeneous ethylene copolymer having a weight average molecular weight, $M_w$, of at most 45,000; a molecular weight distribution, $M_w/M_n$, of less than 2.7 and a density higher than the density of the first ethylene copolymer, but less than 0.967 g/cm³.

In an embodiment of the disclosure, the second ethylene copolymer of the bimodal polyethylene copolymer is a homogeneous ethylene copolymer having a weight average molecular weight, $M_w$, of at most 45,000; a molecular weight distribution, $M_w/M_n$, of less than 2.7 and a density higher than the density of the first ethylene copolymer, but less than 0.965 g/cm³.

In an embodiment of the present disclosure, the second ethylene copolymer is homogeneously branched ethylene copolymer and has a $CDBI_{50}$ of greater than about 50 weight %, or for example of greater than about 55 weight %. In further embodiments of the disclosure, the second ethylene copolymer has a $CDBI_{50}$ of greater than about 60 weight %, or greater than about 65 weight %, or greater than about 70 weight %, or greater than about 75 weight %, or greater than about 80 weight %.

In an embodiment of the disclosure, the second ethylene copolymer can comprise from 90 to 30 weight % (wt %) of the total weight of the first and second ethylene copolymers. In an embodiment of the disclosure, the second ethylene copolymer comprises from 80 to 40 wt % of the total weight of the first and second ethylene copolymers. In an embodiment of the disclosure, the second ethylene copolymer comprises from 70 to 40 wt % of the total weight of the first and second ethylene copolymers. In an embodiment of the disclosure, the second ethylene copolymer comprises from 60 to 50 wt % of the total weight of the first and second ethylene copolymers.

In the present disclosure, the second ethylene copolymer has a density which is higher than the density of the first ethylene copolymer, but less than about 0.037 g/cm³ higher than the density of the first ethylene copolymer. In an embodiment of the disclosure, the second ethylene copolymer has a density which is higher than the density of the first ethylene copolymer, but less than about 0.036 g/cm³ higher than the density of the first ethylene copolymer. In an embodiment of the disclosure, the second ethylene copolymer has a density which is higher than the density of the first ethylene copolymer, but less than about 0.035 g/cm³ higher than the density of the first ethylene copolymer. In an embodiment of the disclosure, the second ethylene copolymer has a density which is higher than the density of the first ethylene copolymer, but less than about 0.034 g/cm³ higher than the density of the first ethylene copolymer. In an embodiment of the disclosure, the second ethylene copolymer has a density which is higher than the density of the first ethylene copolymer, but less than about 0.033 g/cm³ higher than the density of the first ethylene copolymer. In an embodiment of the disclosure, the second ethylene copolymer has a density which is higher than the density of the first ethylene copolymer, but less than about 0.032 g/cm³ higher than the density of the first ethylene copolymer. In another embodiment of the disclosure, the second ethylene copolymer has a density which is higher than the density of the first ethylene copolymer, but less than about 0.031 g/cm³ higher than the density of the first ethylene copolymer. In still another embodiment of the disclosure, the second ethylene copolymer has a density which is higher than the density of the first ethylene copolymer, but less than about 0.030 g/cm³ higher than the density of the first ethylene copolymer.

In embodiments of the disclosure, the I2 of the second ethylene copolymer is at least 100 times, or at least 1000 times, or at least 10,000, or at least 50,000 times the I2 of the first ethylene copolymer.

The Bimodal Polyethylene Copolymer

In an embodiment of the disclosure, the bimodal polyethylene copolymer does not contain a nucleating agent.

In an embodiment of the disclosure, the bimodal polyethylene copolymer comprises a nucleating agent or a mixture of nucleating agents.

In embodiments of the disclosure, the bimodal polyethylene copolymer has a broad unimodal, bimodal or multimodal molecular weight distribution.

In an embodiment of the disclosure, the bimodal polyethylene copolymer will minimally comprise a first ethylene copolymer and a second ethylene copolymer (as defined above) and the ratio (SCB1/SCB2) of the number of short chain branches per thousand carbon atoms in the first ethylene copolymer (i.e., SCB1) to the number of short chain branches per thousand carbon atoms in the second ethylene copolymer (i.e., SCB2) will be greater than 0.5 (i.e., SCB1/SCB2>0.5).

In an embodiment of the disclosure, the ratio of the short chain branching in the first ethylene copolymer (SCB1) to the short chain branching in the second ethylene copolymer (SCB2) is at least 0.60. In an embodiment of the disclosure, the ratio of the short chain branching in the first ethylene copolymer (SCB1) to the short chain branching in the second ethylene copolymer (SCB2) is at least 0.75. In another embodiment of the disclosure, the ratio of the short chain branching in the first ethylene copolymer (SCB1) to the short chain branching in the second ethylene copolymer (SCB2) is at least 1.0. In another embodiment of the disclosure, the ratio of the short chain branching in the first ethylene copolymer (SCB1) to the short chain branching in the second ethylene copolymer (SCB2) is greater than 1.0. In yet another embodiment of the disclosure, the ratio of the short chain branching in the first ethylene copolymer (SCB1) to the short chain branching in the second ethylene copolymer (SCB2) is at least 1.25. In still further embodiments of the disclosure, the ratio of the short chain branching in the first ethylene copolymer (SCB1) to the short chain branching in the second ethylene copolymer (SCB2) is at least 1.5, or at least 1.75, or at least 2.0, or at least 2.5, or at least 3.0, or at least 3.5, or at least 4.0 or at least 4.5.

In an embodiment of the disclosure, the ratio of the short chain branching in the first ethylene copolymer (SCB1) to the short chain branching in the second ethylene copolymer (SCB2) will be greater than 0.5, but less than 1.0.

In embodiments of the disclosure, the ratio (SCB1/SCB2) of the short chain branching in the first ethylene copolymer (SCB1) to the short chain branching in the second ethylene copolymer (SCB2) will be from 1.0 to 12.0, or from 1.0 to 10, or from 1.0 to 7.0, or from 1.0 to 5.0, or from 1.0 to 3.0.

In embodiments of the disclosure, the ratio (SCB1/SCB2) of the short chain branching in the first ethylene copolymer (SCB1) to the short chain branching in the second ethylene copolymer (SCB2) will be from 1.0 to 15.0, or from 2.0 to 12.0, or from 2.5 to 12.0, or from 3.0 to 12.0, or from 3.5 to 12.0.

In an embodiment of the disclosure, the ratio of the short chain branching in the first ethylene copolymer (SCB1) to the short chain branching in the second ethylene copolymer (SCB2) will be from greater than 1.0 to about 5.0, or from greater than 1.0 to about 4.0, or from greater than 1.0 to about 3.5.

In an embodiment of the disclosure, the bimodal polyethylene copolymer has a bimodal molecular weight distribution.

In an embodiment of the disclosure, the bimodal polyethylene copolymer has a density of greater than or equal to 0.949 g/cm$^3$, as measured according to ASTM D792; a melt index, $I_2$, of from about 0.4 to about 5.0 g/10 min, as measured according to ASTM D1238 (when conducted at 190° C., using a 2.16 kg weight); a molecular weight distribution, $M_w/M_n$, of from about 3 to about 11, a Z-average molecular weight, $M_z$ of less than 400,000, a stress exponent of less than 1.50 and an ESCR Condition B at 10% of at least 20 hours.

In an embodiment of the disclosure, the bimodal polyethylene copolymer of the current disclosure has a density of greater than or equal to 0.949 g/cm$^3$, as measured according to ASTM D792; a melt index, $I_2$, of from about 0.2 to about 5.0 g/10 min, as measured according to ASTM D1238 (when conducted at 190° C., using a 2.16 kg weight); a molecular weight distribution, $M_w/M_n$, of from about 6 to about 13, a Z-average molecular weight, $M_z$ of less than 450,000, a stress exponent of less than 1.50 and an ESCR Condition B at 10% of at least 200 hours.

In an embodiment of the disclosure, the bimodal polyethylene copolymer has a density of greater than or equal to 0.949 g/cm$^3$, as measured according to ASTM D792; a melt index, $I_2$, of from about 0.3 to about 4.0 g/10 min, as measured according to ASTM D1238 (when conducted at 190° C., using a 2.16 kg weight); a molecular weight distribution, $M_w/M_n$, of from about 5.0 to about 13.0, a Z-average molecular weight, $M_z$ of from 400,000 to 520,000, a stress exponent of less than 1.53 and an environmental stress crack resistance, ESCR Condition B at 10% of at least 120 hours.

In embodiments of the disclosure, the bimodal polyethylene copolymer has a comonomer content of less than 0.75 mol %, or less than 0.70 mol %, or less than 0.65 mol %, or less than 0.60 mol %, or less than 0.55 mol % as measured by FTIR or $^{13}$C NMR methods, with $^{13}$C NMR being preferred, where the comonomer is one or more suitable alpha olefins such as but not limited to 1-butene, 1-hexene, 1-octene and the like. In an embodiment of the disclosure, the bimodal polyethylene copolymer has a comonomer content of from 0.1 to 0.75 mol %, or from 0.20 to 0.55 mol %, or from 0.25 to 0.50 mol %.

In the present disclosure, the bimodal polyethylene copolymer has a density of at least 0.949 g/cm$^3$. In further embodiments of the disclosure, the bimodal polyethylene copolymer has a density of >0.949 g/cm$^3$, or ≥0.950 g/cm$^3$, or >0.950 g/cm$^3$.

In an embodiment of the current disclosure, the bimodal polyethylene copolymer has a density in the range of from 0.949 to 0.960 g/cm$^3$.

In an embodiment of the current disclosure, the bimodal polyethylene copolymer has a density in the range of from 0.949 to 0.959 g/cm$^3$.

In an embodiment of the current disclosure, the bimodal polyethylene copolymer has a density in the range of from 0.949 to 0.958 g/cm$^3$.

In an embodiment of the current disclosure, the bimodal polyethylene copolymer has a density in the range of from 0.949 to 0.957 g/cm$^3$.

In an embodiment of the current disclosure, the bimodal polyethylene copolymer has a density in the range of from 0.949 to 0.956 g/cm$^3$.

In an embodiment of the current disclosure, the bimodal polyethylene copolymer has a density in the range of from 0.949 to 0.955 g/cm$^3$.

In an embodiment of the current disclosure, the bimodal polyethylene copolymer has a density in the range of from 0.950 to 0.955 g/cm$^3$.

In an embodiment of the current disclosure, the bimodal polyethylene copolymer has a density in the range of from 0.951 to 0.957 g/cm$^3$.

In an embodiment of the current disclosure, the bimodal polyethylene copolymer has a density in the range of from 0.951 to 0.955 g/cm$^3$.

In an embodiment of the disclosure, the bimodal polyethylene copolymer has a melt index, $I_2$, of between 0.4 and 5.0 g/10 min according to ASTM D1238 (when conducted at 190° C., using a 2.16 kg weight) and including narrower ranges within this range. For example, in further embodiments of the disclosure, the bimodal polyethylene copolymer has a melt index, $I_2$, of from 0.5 to 5.0 g/10 min, or from 0.4 to 3.5 g/10 min, or from 0.4 to 3.0 g/10 min, or from 0.4 to 2.5 g/10 min, or from 0.4 to 2.0 g/10 min, or from 0.5 to 3.5 g/10 min, or from 0.5 to 3.0 g/10 min, or from 1.0 to 3.0 g/10 min, or from about 1.0 to about 2.0 g/10 min, or from more than 0.5 to less than 2.0 g/10 min.

In an embodiment of the disclosure, the bimodal polyethylene copolymer has a melt index, $I_2$, of between 0.1 and 5.0 g/10 min according to ASTM D1238 (when conducted at 190° C., using a 2.16 kg weight) and including narrower ranges within this range. For example, in further embodiments of the disclosure, the bimodal polyethylene copolymer has a melt index, $I_2$, of from 0.2 to 5.0 g/10 min, or from 0.3 to 4.0 g/10 min, or from 0.3 to 3.5 g/10 min, or from 0.3 to 3.0 g/10 min, or from 0.2 to 3.5 g/10 min, or from 0.2 to 3.0 g/10 min, or from 0.1 to 2.5 g/10 min, or from 0.1 to 2.0 g/10 min.

In an embodiment of the disclosure, the bimodal polyethylene copolymer has a melt index, $I_2$, of from 0.1 to 5.0 g/10 min according to ASTM D1238 (when conducted at 190° C., using a 2.16 kg weight) including narrower ranges within this range and all the numbers within this range. For example, in further embodiments of the disclosure, the bimodal polyethylene copolymer has a melt index, $I_2$, of from 0.3 to 4.0 g/10 min, or from 0.4 to 3.5 g/10 min, or from 0.4 to 3.0 g/10 min, or from 0.3 to 3.5 g/10 min, or from 0.3 to 3.0 g/10 min, or from 0.3 to 2.5 g/10 min, or from 0.1 to 4.0 g/10 min, or from 0.1 to 3.5 g/10 min, or from 0.1 to 3.0 g/10 min, or from 0.1 to 2.5 g/10 min, or from 0.1 to 2.0 g/10 min, or from 0.1 to 1.5 g/10 min, or from 0.25 to 1.5 g/10 min, or from 0.3 to 2.0 g/10 min, or from 0.3 to 1.5 g/10 min, or less than 1.0 g/10 min, or from greater than 0.1 to less than 1.0 g/10 min, or from greater than 0.2 to less than 1.0 g/10 min, or from greater than 0.3 to less than 1.0 g/10 min.

In an embodiment of the disclosure, the bimodal polyethylene copolymer has a melt index $I_5$ of at least 1.0 g/10 min according to ASTM D1238 (when conducted at 190° C., using a 5 kg weight). In another embodiment of the disclosure, the bimodal polyethylene copolymer has a melt index, $I_5$, of greater than about 1.1 g/10 min, as measured according to ASTM D1238 (when conducted at 190° C., using a 5 kg weight). In still further embodiments of the disclosure, the bimodal polyethylene copolymer has a melt index 15 of from about 1.0 to about 10.0 g/10 min, or from about 2.0 to about 8.0 g/10 min, or from about 1.0 to about 5.0 g/10 min, or from about 1.5 to about 6.5 g/10 min, or from about 4.0 to about 7.0 g/10 min, or from about 3.0 to about 6.5 g/10 min. In yet still further embodiments of the disclosure, the bimodal polyethylene copolymer has a melt index $I_5$ of from about 1.0 to about 5.0 g/10 min, or from about 1.5 to about 5.0 g/10 min, or from about 2.0 to about 5.0 g/10 min, or from about 2.0 to about 4.5 g/10 min.

In an embodiment of the disclosure, the bimodal polyethylene copolymer has a high load melt index, $I_{21}$ of at least 25 g/10 min according to ASTM D1238 (when conducted at 190° C., using a 21 kg weight). In another embodiment of the disclosure, the bimodal polyethylene copolymer has a high load melt index, $I_{21}$, of greater than about 30 g/10 min. In yet another embodiment of the disclosure, the bimodal polyethylene copolymer has a high load melt index, $I_{21}$, of greater than about 35 g/10 min. In still another embodiment of the disclosure, the bimodal polyethylene copolymer has a high load melt index, $I_{21}$, of greater than about 40 g/10 min. In still another embodiment of the disclosure, the bimodal polyethylene copolymer has a high load melt index, $I_{21}$, of greater than about 50 g/10 min. In still another embodiment of the disclosure, the bimodal polyethylene copolymer has a high load melt index, $I_{21}$, of greater than about 60 g/10 min. In yet another embodiment of the disclosure, the bimodal polyethylene copolymer has a high load melt index, $I_{21}$, of greater than about 65 g/10 min. In still another embodiment of the disclosure, the bimodal polyethylene copolymer has a high load melt index, $I_{21}$, of greater than about 75 g/10 min.

In an embodiment of the disclosure, the ratio of the melt index, $I_2$, of the second ethylene copolymer to the melt index, $I_5$, of the bimodal polyethylene copolymer is from 200 to 1,500. In another embodiment of the disclosure, the ratio of the melt index, $I_2$, of the second ethylene copolymer to the melt index, $I_5$, of the bimodal polyethylene copolymer is from 200 to 2,000. In another embodiment of the disclosure, the ratio of the melt index, $I_2$, of the second ethylene copolymer to the melt index, $I_5$, of the bimodal polyethylene copolymer is from 400 to 1,300. In yet another embodiment of the disclosure, the ratio of the melt index, $I_2$, of the second ethylene copolymer to the melt index, $I_5$, of the bimodal polyethylene copolymer is from 600 to 1,200.

In an embodiment of the disclosure, the ratio of the melt index, $I_2$, of the second ethylene copolymer to the melt index, $I_5$, of the bimodal polyethylene copolymer is from 500 to 5,000. In another embodiment of the disclosure, the ratio of the melt index, $I_2$, of the second ethylene copolymer to the melt index, $I_5$, of the bimodal polyethylene copolymer is from 750 to 4,500. In yet another embodiment of the disclosure, the ratio of the melt index, $I_2$, of the second ethylene copolymer to the melt index, $I_5$, of the bimodal polyethylene copolymer is from 1,000 to 4,000.

In an embodiment of the disclosure, the bimodal polyethylene copolymer has a complex viscosity, $\eta^*$ at a shear stress ($G^*$) anywhere between from about 1 to about 10 kPa which is between 1,000 to 25,000 Pa·s. In an embodiment of the disclosure, the bimodal polyethylene copolymer has a complex viscosity, $\eta^*$ at a shear stress ($G^*$) anywhere from about 1 to about 10 kPa which is between 1,000 to 10,000 Pa·s.

In an embodiment of the disclosure, the bimodal polyethylene copolymer has a complex viscosity, $\eta^*$ at a shear stress ($G^*$) anywhere between from about 1 to about 10 kPa which is between 1,000 to 25,000 Pa·s. In an embodiment of the disclosure, the bimodal polyethylene copolymer has a complex viscosity, $\eta^*$ at a shear stress ($G^*$) anywhere from about 1 to about 10 kPa which is from 1,000 to 10,000 Pa·s, or from 1,000 to 15,000 Pa·s, or from 3,000 to 12,500 Pa·s, or from 1,000 to 15,000, or from 5000 to 15,000 Pa·s.

In an embodiment of the disclosure, the bimodal polyethylene copolymer has a number average molecular weight, $M_n$, of below about 30,000. In another embodiment of the disclosure, the bimodal polyethylene copolymer has a number average molecular weight, $M_n$, of below about 20,000 or below about 17,500. In further embodiments of the disclosure, the bimodal polyethylene copolymer has a number average molecular weight, $M_n$, of from about 5,000 to 25,000, or from about 5,000 to 20,000, or from about 7,000 to about 15,000. In further embodiments of the disclosure, the bimodal polyethylene copolymer has a number average molecular weight, $M_n$, of from about 9,000 to 28,000, or from about 10,000 to 25,000, or from about 10,000 to about 20,000.

In embodiments of the disclosure, the bimodal polyethylene copolymer has a weight average molecular weight, $M_w$, of from about 60,000 to about 200,000 including narrower ranges within this range and the numbers within this range. For example, in further embodiments of the disclosure, the bimodal polyethylene copolymer has a weight average molecular weight, $M_w$, of from about 65,000 to 175,000, or from about 65,000 to about 150,000, or from about 65,000 to about 140,000.

In embodiments of the disclosure, the bimodal polyethylene copolymer has a weight average molecular weight, $M_w$, of from about 65,000 to about 210,000 including narrower ranges within this range and the numbers within this range. For example, in further embodiments of the disclosure, the bimodal polyethylene copolymer has a weight average molecular weight, $M_w$, of from about 75,000 to about 175,000, or from about 90,000 to about 150,000, or from about 100,000 to about 140,000.

In an embodiment of the disclosure, the bimodal polyethylene copolymer has a z-average molecular weight, $M_z$, of less than 450,000.

In embodiments of the disclosure, the bimodal polyethylene copolymer has a z-average molecular weight, $M_z$ of from 250,000 to 450,000 including narrower ranges within this range and the numbers within this range. For example, in further embodiments of the disclosure, the bimodal polyethylene copolymer has a z-average molecular weight, $M_w$, of from 250,000 to 425,000, or from 275,000 to 425,000, or from 250,000 to below 450,000, or from 250,000 to 410,000.

In embodiments of the disclosure, the bimodal polyethylene copolymer has a z-average molecular weight, $M_z$, of from 400,000 to 520,000 including narrower ranges within this range and the numbers within this range. For example, in further embodiments of the disclosure, the bimodal polyethylene copolymer has a z-average molecular weight, $M_z$, of from 400,000 to 510,000, or from 400,000 to 500,000, or from 400,000 to 490,000, or from 410,000 to 480,000.

In embodiments of the disclosure, the bimodal polyethylene copolymer has a z-average molecular weight, $M_z$ which satisfies: $400,000 < M_z < 500,000$ or $400,000 \leq M_z \leq 475,000$.

In embodiments of the present disclosure, the bimodal polyethylene copolymer has a molecular weight distribution Mw/Mn of from 3 to 11 or a narrower range within this range. For example, in further embodiments of the disclosure, the bimodal polyethylene copolymer has a $M_w/M_n$ of from 4.0 to 10.0, or from 4.0 to 9.0 or from 5.0 to 10.0, or from 5.0 to 9.0, or from 4.5 to 10.0, or from 4.5 to 9.5, or from 4.5 to 9.0, or from 4.5 to 8.5, or from 5.0 to 8.5.

In embodiments of the present disclosure, the bimodal polyethylene copolymer has a molecular weight distribution Mw/Mn of from 6 to 13 or a narrower range within this range. For example, in further embodiments of the disclosure, the bimodal polyethylene copolymer has a $M_w/M_n$ of from 7.0 to 12.0, or from 8.0 to 12.0, or from 8.5 to 12.0, or from 9.0 to 12.0, or from 9.0, to 12.5 or from 8.5 to 12.5.

In embodiments of the present disclosure, the bimodal polyethylene copolymer has a molecular weight distribution Mw/Mn of from 3.0 to 13.0, including narrower ranges within this range and all the numbers within this range. For example, in further embodiments of the disclosure, the bimodal polyethylene copolymer has a $M_w/M_n$ of from 5.0 to 13.0, or from 4.0 to 12.0, or from 5.0 to 12.0 or from 6.0 to 12.0, or from 6.0 to 11.0, or from 5.0 to 12.0, or from 5.0 to 10.0, or from 6.0 to 10.0, or from 6.0 to 11.0, or from 7.0 to 11.0, or from greater than 7.0 to 11.0, or from 7.0 to 10.0, or from greater than 7.0 to 12.0.

In embodiments of the disclosure, the bimodal polyethylene copolymer has a ratio of Z-average molecular weight to weight average molecular weight ($M_z/M_W$) of from 2.0 to 5.0, or from 2.25 to 5.0, or from 2.75 to 5.0, or from 2.75 to 4.25, or from 3.0 to 4.0, or from 2.25 to 4.75, or from 2.25 to 4.5, or from 2.5 to 4.5, or from 2.5 to 4.25, or from 2.75 to 4.0, or from 2.75 to 3.75, or between 3.0 and 4.0.

In embodiments of the disclosure, the bimodal polyethylene copolymer has a ratio of Z-average molecular weight to weight average molecular weight ($M_z/M_W$) of less than 5.0, or less than 4.5, or less than 4.0, or less than 3.5.

In an embodiment of the disclosure, the bimodal polyethylene copolymer has a broadness factor defined as $(M_w/M_n)/(M_z/M_w)$ of at least 2.70, or at least 2.75, or at least 2.8, or at least 2.85, or at least 2.90, or at least 2.95, or at least 3.00, or at least 3.05.

In an embodiment of the disclosure, the bimodal polyethylene copolymer has a broadness factor defined as $(M_w/M_n)/(M_z/M_w)$ of less than 3.00, or less than 2.95, or less than 2.90, or less than 2.85, or less than 2.80, or less than 2.75, or less than 2.70, or less than 2.65, or less than 2.60, or less than 2.55, or less than 2.50, or less than 2.45, or less than 2.40, or less than 2.35, or $\leq 2.75$, or $\leq 2.70$, or $\leq 2.65$, or $\leq 2.60$, or $\leq 2.55$, or $\leq 2.50$, or $\leq 2.45$, or $\leq 2.40$, or $\leq 2.35$.

In embodiments of the disclosure, the bimodal polyethylene copolymer has a melt flow ratio defined as $I_{21}/I_2$ of $>40$, or $\geq 45$, or $\geq 50$, or $\geq 60$, or $\geq 65$. In a further embodiment of the disclosure, the bimodal polyethylene copolymer has a melt flow ratio $I_{21}/I_2$ of from about 40 to about 100, and including narrower ranges within this range. For example, the bimodal polyethylene copolymer may have a melt flow ratio $I_{21}/I_2$ of from about 45 to about 90, or from about 45 to about 80, or from about 45 to about 75, or from about 45 to about 70, or from about 50 to about 90, or from about 50 to about 80, or from about 50 to about 75, or from about 50 to about 70.

In embodiments of the disclosure, the bimodal polyethylene copolymer has a melt flow ratio defined as $I_{21}/I_2$ of $>40$, or $\geq 45$, or $\geq 50$, or $\geq 55$, or $\geq 60$, or $\geq 65$, or $\geq 70$. In a further embodiment of the disclosure, the bimodal polyethylene copolymer has a melt flow ratio $I_{21}/I_2$ of from about 40 to about 120, including narrower ranges within this range and all the numbers within this range. For example, the bimodal polyethylene copolymer may have a melt flow ratio $I_{21}/I_2$ of from about 50 to about 120, or from about 40 to about 110, or from about 45 to about 100, or from about 50 to about 110, or from about 55 to about 95.

In an embodiment of the disclosure, the bimodal polyethylene copolymer has a melt flow rate defined as $I_{21}/I_5$ of less than 35. In an embodiment of the disclosure, the bimodal polyethylene copolymer has a melt flow rate defined as $I_{21}/I_5$ of less than 30. In another embodiment of the disclosure, the bimodal polyethylene copolymer has a melt flow rate defined as $I_{21}/I_5$ of less than 25. In another embodiment of the disclosure, the bimodal polyethylene copolymer has a melt flow rate defined as $I_{21}/I_5$ of less than 20.

In an embodiment of the disclosure, the bimodal polyethylene copolymer has a shear viscosity at about $10^5$ s$^{-1}$ (240° C.) of less than about 10 (Pa·s). In further embodiments of the disclosure, the bimodal polyethylene copolymer has a shear viscosity at about $10^5$ s$^{-1}$ (240° C.) of less than 7.5 Pa·s, or less than 6.0 Pa·s. In further embodiments of the disclosure, the bimodal polyethylene copolymer has a shear viscosity at about $10^5$ s$^{-1}$ (240° C.) of less than 7.0 Pa·s, or less than 6.5 Pa·s.

In an embodiment of the disclosure, the bimodal polyethylene copolymer has a hexane extractables level of below 0.55 wt %.

In an embodiment of the disclosure, the bimodal polyethylene copolymer has at least one type of alpha-olefin that has at least 4 carbon atoms and its content is less than 0.75 mol % as determined by $^{13}$C NMR. In an embodiment of the disclosure, the bimodal polyethylene copolymer has at least one type of alpha-olefin that has at least 4 carbon atoms and its content is less than 0.65 mol % as determined by $^{13}$C NMR. In an embodiment of the disclosure, the bimodal polyethylene copolymer has at least one type of alpha-olefin that has at least 4 carbon atoms and its content is less than 0.55 mol % as determined by $^{13}$C NMR.

In an embodiment of the disclosure, the shear viscosity ratio, $SVR_{(10,1000)}$ at 240° C. of the bimodal polyethylene copolymer can be from about 4.0 to 25, or from 4.0 to 20, or from 4.0 to 17. The shear viscosity ratio $SVR_{(10,1000)}$ is determined by taking the ratio of shear viscosity at shear rate of 10 s$^{-1}$ and shear viscosity at shear rate of 1000 s$^{-1}$ as measured with a capillary rheometer at constant temperature (e.g. 240° C.), and a die with L/D ratio of 20 and diameter of 0.06". Without wishing to be bound by theory, the higher the value for the shear viscosity ratio, the easier the bimodal polyethylene copolymer can be processed on converting equipment for caps and closures.

In an embodiment of the disclosure, the shear viscosity ratio, $SVR_{(10,1000)}$ at 240° C. of the bimodal polyethylene copolymer can be from about 10 to 30, or from 12 to 27, or from 12.5 to 25, or from 15 to 25, or from 17.5 to 23.0. The shear viscosity ratio $SVR_{(10,1000)}$ is determined by taking the ratio of shear viscosity at shear rate of 10 s$^{-1}$ and shear viscosity at shear rate of 1000 s$^{-1}$ as measured with a capillary rheometer at a constant temperature (e.g., 240° C.), and a die with L/D ratio of 20 and diameter of 0.06". Without wishing to be bound by theory, the higher the value for the shear viscosity ratio, the easier the bimodal polyethylene copolymer can be processed on converting equipment for caps and closures. The "shear viscosity ratio" is used herein as a means to describe the relative processability of a bimodal polyethylene copolymer.

In embodiments of the disclosure, the bimodal polyethylene copolymer has a shear viscosity ratio ($\eta_{10}/\eta_{1000}$ at 240° C.) of $\geq 12.0$, $\geq 12.5$, or $\geq 13.0$, or $\geq 13.5$, or $\geq 14.0$, or $\geq 14.5$, or $\geq 15.0$, or $\geq 17.5$, or $\geq 20.0$. The "shear viscosity ratio" is used herein as a means to describe the relative processability of a bimodal polyethylene copolymer.

In further embodiments of the disclosure, the shear viscosity ratio, $SVR_{(10,1000)}$ at 240° C. of the bimodal polyethylene copolymer is from 10.0 to 30, or from 12.0 to 30, or from 12.0 to 27.5, or from 12.0 to 25, or from 12.5 to 30, or from 12.5 to 27.5, or from 12.5 to 25.

In an embodiment of the disclosure, the shear thinning index, $SHI_{(1,100)}$ of the bimodal polyethylene copolymer is less than about 10; in another embodiment the $SHI_{(1,100)}$ will be less than about 7. The shear thinning index (SHI), was calculated using dynamic mechanical analysis (DMA) frequency sweep methods as disclosed in PCT applications WO 2006/048253 and WO 2006/048254. The SHI value is obtained by calculating the complex viscosities $\eta^*(1)$ and $\eta^*(100)$ at a constant shear stress of 1 kPa (G*) and 100 kPa (G*), respectively.

In an embodiment of the disclosure, the $SHI_{(1,100)}$ of the bimodal polyethylene copolymer satisfies the equation: $SHI_{(1,100)} < -10.58$ (log $I_2$ of bimodal polyethylene copolymer in g/10 min)/(g/10 min)+12.94. In another embodiment of the disclosure, the $SHI_{(1,100)}$ of the bimodal polyethylene copolymer satisfies the equation:

$$SHI_{(1,100)} < -5.5(\log I_2 \text{ of the bimodal polyethylene copolymer in g/10 min})/(g/10 \text{ min})+9.66.$$

In an embodiment of the disclosure, the bimodal polyethylene copolymer has a Rosand melt strength in centiNewtons (cN) of at least 2.0, or at least 2.25, or at least 2.5, or at least 2.75, or at least 3.0, or at least 3.25, or at least 3.5, or at least 3.75, or from 2.5 to 6.0, or from 2.75 to 6.0, or from 2.75 to 5.5, or from 3.0 to 6.0, or from 3.0 to 5.5, or from 3.25 to 6.0, or from 3.5 to 6.0, or from 3.25 to 5.5.

In an embodiment of the disclosure, the bimodal polyethylene copolymer or a molded article (or plaque) made from the bimodal polyethylene copolymer, has an environment stress crack resistance ESCR Condition B at 10% of at least 20 hours, or at least 50 hours, or at least 60 hours, or at least 80 hours, or at least 120 hours, or at least 150 hours, or from 60 to 400 hours, or from 100 to 250 hours, or from 60 to 250 hours as measured according to ASTM D1693 (at 10% Igepal and 50° C. under condition B).

In an embodiment of the disclosure, the bimodal polyethylene copolymer or a molded article (or plaque) made from the bimodal polyethylene copolymer, has an environment stress crack resistance ESCR Condition B at 10% of at least 100 hrs, as measured according to ASTM D1693 (at 10% IGEPAL® and 50° C. under condition B).

In an embodiment of the disclosure, the bimodal polyethylene copolymer or a molded article (or plaque) made from the bimodal polyethylene copolymer, has an environment stress crack resistance ESCR Condition B at 10% of at least 150 hrs, as measured according to ASTM D1693 (at 10% Igepal and 50° C. under condition B).

In an embodiment of the disclosure, the bimodal polyethylene copolymer or a molded article (or plaque) made from the bimodal polyethylene copolymer, has an environment stress crack resistance ESCR Condition B at 10% of at least 200 hours, as measured according to ASTM D1693 (at 10% Igepal and 50° C. under condition B).

In an embodiment of the disclosure, the bimodal polyethylene copolymer or a molded article (or plaque) made from the bimodal polyethylene copolymer, has an environment stress crack resistance ESCR Condition B at 10% of at least 250 hours, as measured according to ASTM D1693 (at 10% Igepal and 50° C. under condition B).

In an embodiment of the disclosure, the bimodal polyethylene copolymer or a molded article (or plaque) made from the bimodal polyethylene copolymer, has an environment stress crack resistance ESCR Condition B at 10% of at least 300 hours, as measured according to ASTM D1693 (at 10% Igepal and 50° C. under condition B).

In an embodiment of the disclosure, the bimodal polyethylene copolymer or a molded article (or plaque) made from the bimodal polyethylene copolymer, has an environment stress crack resistance ESCR Condition B at 10% of at least 350 hours, as measured according to ASTM D1693 (at 10% Igepal and 50° C. under condition B).

In an embodiment of the disclosure, the bimodal polyethylene copolymer or a molded article (or plaque) made from the bimodal polyethylene copolymer, has an environment stress crack resistance ESCR Condition B at 10% of at least 400 hours, as measured according to ASTM D1693 (at 10% Igepal and 50° C. under condition B).

In an embodiment of the disclosure, the bimodal polyethylene copolymer or a molded article (or plaque) made from the bimodal polyethylene copolymer, has an environment stress crack resistance ESCR Condition B at 10% of at least 500 hours, as measured according to ASTM D1693 (at 10% Igepal and 50° C. under condition B).

In an embodiment of the disclosure, the bimodal polyethylene copolymer or a molded article (or plaque) made from the bimodal polyethylene copolymer, has an environment stress crack resistance ESCR Condition B at 10% of from 200 to 1500 hours, as measured according to ASTM D1693 (at 10% Igepal and 50° C. under condition B).

In an embodiment of the disclosure, the bimodal polyethylene copolymer or a molded article (or plaque) made from the bimodal polyethylene copolymer, has an environment stress crack resistance ESCR Condition B at 10% of from 200 to 1250 hours, as measured according to ASTM D1693 (at 10% Igepal and 50° C. under condition B).

In an embodiment of the disclosure, the bimodal polyethylene copolymer or a molded article (or plaque) made from the bimodal polyethylene copolymer, has an environment stress crack resistance ESCR Condition B at 10% of from 300 to 1500 hours, as measured according to ASTM D1693 (at 10% IGEPAL and 50° C. under condition B).

In an embodiment of the disclosure, the bimodal polyethylene copolymer or a molded article (or plaque) made from the bimodal polyethylene copolymer, has an environment stress crack resistance ESCR Condition B at 10% of from 50 to 600 hrs, as measured according to ASTM D1693 (at 10% Igepal and 50° C. under condition B).

In an embodiment of the disclosure, the bimodal polyethylene copolymer or a molded article (or plaque) made from the bimodal polyethylene copolymer, has an environment stress crack resistance ESCR Condition B at 10% of from 100 to 500 hrs, as measured according to ASTM D1693 (at 10% IGEPAL and 50° C. under condition B).

In an embodiment of the disclosure, the bimodal polyethylene copolymer or a molded article (or plaque) made from the bimodal polyethylene copolymer, has an environment stress crack resistance ESCR Condition B at 10% of from 150 to 500 hrs, as measured according to ASTM D1693 (at 10% IGEPAL and 50° C. under condition B).

In an embodiment of the disclosure, the bimodal polyethylene copolymer or a molded article (or plaque) made from the bimodal polyethylene copolymer has a notched Izod impact strength of at least 60 J/m, or at least 70 J/m, or at least 80 J/m, or at least 90 J/m, or at least 100 J/m as measured according to ASTM D256.

In an embodiment of the disclosure the bimodal polyethylene copolymer of the current disclosure has a density of from 0.949 to 0.956 g/cm$^3$; a melt index, $I_2$, of from 0.5 to 3.0 g/10 min; a molecular weight distribution of from 4.0 to 10.0; a number average molecular weight, $M_n$, of below 30,000; a shear viscosity at $10^5$ s$^{-1}$ (240° C.) of less than 10 (Pa·s), a hexane extractables of less than 0.55%, a notched Izod impact strength of more than 60 J/m, and an ESCR B at 10% of at least 20 hours.

In an embodiment of the disclosure, the bimodal polyethylene copolymer of the current disclosure has a density of from 0.949 to 0.956 g/cm$^3$; a melt index, $I_2$, of from 0.5 to 3.0 g/10 min; a molecular weight distribution of from 4.5 to 9.5; a number average molecular weight, $M_n$, of below 30,000; a shear viscosity at $10^5$ s$^{-1}$ (240° C.) of less than 7 (Pa·s), a hexane extractables of less than 0.55%, a notched Izod impact strength of more than 60 J/m and an ESCR B at 10% of at least 80 hours.

In an embodiment of the disclosure, the bimodal polyethylene copolymer of the current disclosure has a density of from 0.949 to 0.956 g/cm$^3$; a melt index, $I_2$, of from 0.2 to 3.0 g/10 min; a molecular weight distribution of from 6.0 to 13.0; a number average molecular weight, $M_n$, of below 30,000; a shear viscosity at $10^5$ s$^{-1}$ (240° C.) of less than 10 (Pa·s), a hexane extractables of less than 0.55%, a notched Izod impact strength of more than 60 J/m, and an ESCR B at 10% of at least 200 hours.

In an embodiment of the disclosure, the bimodal polyethylene copolymer of the current disclosure has a density of from 0.949 to 0.957 g/cm$^3$; a melt index, $I_2$, of from 0.3 to 2.0 g/10 min; a molecular weight distribution of from 6.0 to 12.0; a number average molecular weight, $M_n$, of below 30,000; a shear viscosity at $10^5$ s$^{-1}$ (240° C.) of less than 10 (Pa·s), a hexane extractables of less than 0.55%, a notched Izod impact strength of more than 60 J/m, and an ESCR B at 10% of at least 150 hrs.

In embodiments of the disclosure, the bimodal polyethylene copolymer has a 2% secant flexural modulus in megapascals (MPa) of greater than about 750, or greater than about 850, or greater than about 1000, or from about 750 to about 1,600, or from about 750 to about 1,250, or from about 850 to about 1,150. In some embodiments the bimodal polyethylene copolymer further comprises a nucleating agent which increases the 2% secant flexural modulus in megapascals (MPa) to above these ranges to for example from more than about 1,000 and up to about 1,600. Without wishing to be bound by theory, the 2% secant flexural modulus is a measure of polymer stiffness. The higher the 2% secant flexural modulus, the higher the polymer stiffness.

In an embodiment of the disclosure, the bimodal polyethylene copolymer of the current disclosure has a density of from 0.949 to 0.956 g/cm$^3$; a melt index, $I_2$, of from 0.2 to 3.0 g/10 min; a molecular weight distribution of from 7.0 to 12.0; a number average molecular weight, $M_n$, of below 30,000; a shear viscosity at $10^5$ s$^{-1}$ (240° C.) of less than 7 (Pa·s), a hexane extractables of less than 0.55%, a notched Izod impact strength of more than 60 J/m and an ESCR B at 10% of at least 200 hours.

In an embodiment of the disclosure, the bimodal polyethylene copolymer has a stress exponent, defined as $Log_{10}[I_6/I_2]/Log_{10}[6.48/2.16]$, which is ≤1.53. In an embodiment of the disclosure, the bimodal polyethylene copolymer has a stress exponent, defined as $Log_{10}[I_6/I_2]/Log_{10}[6.48/2.16]$, which is ≤1.50. In further embodiments of the disclosure the bimodal polyethylene copolymer has a stress exponent, $Log_{10}[I_6/I_2]/Log_{10}[6.48/2.16]$ of less than 1.50, or less than 1.48, or less than 1.45, or less than 1.43, or less than 1.40.

In an embodiment of the disclosure, the bimodal polyethylene copolymer has a composition distribution breadth index (CDBI$_{50}$), as determined by temperature elution fractionation (TREF), of ≥60 weight %. In further embodiments of the disclosure, the bimodal polyethylene copolymer will have a CDBI$_{50}$ of greater than 65 weight %, or greater than 70 weight %, or greater than 75 weight %, or greater than 80 weight %.

In an embodiment of the disclosure, the bimodal polyethylene copolymer has a composition distribution breadth index (CDBI$_{25}$), as determined by temperature elution fractionation (TREF), of ≥50 weight %. In further embodiments of the disclosure, the bimodal polyethylene copolymer will have a CDBI$_{25}$ of greater than 55 weight %, or greater than 60 weight %, or greater than 65 weight %, or greater than 70 weight %.

Optionally, additives can be added to the bimodal polyethylene copolymer. Additives can be added to the bimodal polyethylene copolymer during an extrusion or compounding step, but other suitable known methods will be apparent to a person skilled in the art. The additives can be added as is or as part of a separate polymer component (i.e., not the first or second ethylene copolymers described above) or added as part of a masterbatch (optionally during an extrusion or compounding step). Suitable additives are known in the art and include but are not-limited to antioxidants, phosphites and phosphonites, nitrones, antacids, UV light stabilizers, UV absorbers, metal deactivators, dyes, fillers and reinforcing agents, nano-scale organic or inorganic materials, antistatic agents, lubricating agents such as calcium stearates, slip additives such as erucamide or behenamide, and nucleating agents (including nucleators, pigments or any other chemicals which may provide a nucleating effect to the bimodal polyethylene copolymer). The additives that can be optionally added are may be added in amount of up to 20 weight percent (wt %).

One or more nucleating agent(s) may be introduced into the bimodal polyethylene copolymer by kneading a mixture of the polymer, usually in powder or pellet form, with the nucleating agent, which may be utilized alone or in the form of a concentrate containing further additives such as stabilizers, pigments, antistatics, UV stabilizers and fillers. It should be a material which is wetted or absorbed by the polymer, which is insoluble in the polymer and of melting point higher than that of the polymer, and it should be homogeneously dispersible in the polymer melt in as fine a form as possible (1 to 10 μm). Compounds known to have a nucleating capacity for polyolefins include salts of aliphatic monobasic or dibasic acids or arylalkyl acids, such as sodium succinate, or aluminum phenylacetate; and alkali metal or aluminum salts of aromatic or alicyclic carboxylic acids such as sodium β-naphthoate, or sodium benzoate.

Examples of nucleating agents which are commercially available and which may be added to the bimodal polyethylene copolymer are dibenzylidene sorbital esters (such as the products sold under the trademark MILLAD 3988 by Milliken Chemical and IRGACLEAR by Ciba Specialty Chemicals). Further examples of nucleating agents which may be added to the bimodal polyethylene copolymer include the cyclic organic structures disclosed in U.S. Pat. No. 5,981,636 (and salts thereof, such as disodium bicyclo [2.2.1] heptene dicarboxylate); the saturated versions of the structures disclosed in U.S. Pat. No. 5,981,636 (as disclosed in U.S. Pat. No. 6,465,551; Zhao et al., to Milliken); the salts of certain cyclic dicarboxylic acids having a hexahydrophthalic acid structure (or "HHPA" structure) as disclosed in U.S. Pat. No. 6,599,971 (Dotson et al., to Milliken); and phosphate esters, such as those disclosed in U.S. Pat. No. 5,342,868 and those sold under the trade names NA-11 and NA-21 by Asahi Denka Kogyo, cyclic dicarboxylates and the salts thereof, such as the divalent metal or metalloid salts, (particularly, calcium salts) of the HHPA structures disclosed in U.S. Pat. No. 6,599,971. For clarity, the HHPA structure generally comprises a ring structure with six carbon atoms in the ring and two carboxylic acid groups which are substituents on adjacent atoms of the ring structure. The other four carbon atoms in the ring may be substituted, as disclosed in U.S. Pat. No. 6,599,971. An example is 1,2-cyclohexanedicarboxylicacid, calcium salt (CAS registry number 491589-22-1). Still further examples of nucleating agents which may be added to the bimodal polyethylene copolymer include those disclosed in WO2015042561, WO2015042563, WO2015042562 and WO2011050042.

Many of the above described nucleating agents may be difficult to mix with the bimodal polyethylene copolymer that is being nucleated and it is known to use dispersion aids, such as for example, zinc stearate, to mitigate this problem.

In an embodiment of the disclosure, the nucleating agents are well dispersed in the bimodal polyethylene copolymer.

In an embodiment of the disclosure, the amount of nucleating agent used is comparatively small—from 100 to 3,000 parts by million per weight (based on the weight of the bimodal polyethylene copolymer) so it will be appreciated by those skilled in the art that some care should be taken to ensure that the nucleating agent is well dispersed. In an embodiment of the disclosure, the nucleating agent is added in finely divided form (less than 50 microns, especially less than 10 microns) to the bimodal polyethylene copolymer to facilitate mixing. This type of "physical blend" (i.e., a mixture of the nucleating agent and the resin in solid form) is in some embodiments preferable to the use of a "masterbatch" of the nucleator (where the term "masterbatch" refers to the practice of first melt mixing the additive—the nucleator, in this case—with a small amount of the bimodal polyethylene copolymer resin—then melt mixing the "masterbatch" with the remaining bulk of the bimodal polyethylene copolymer resin).

In an embodiment of the disclosure, an additive such as nucleating agent may be added to the bimodal polyethylene copolymer by way of a "masterbatch", where the term "masterbatch" refers to the practice of first melt mixing the additive (e.g., a nucleator) with a small amount of the bimodal polyethylene copolymer, followed by melt mixing the "masterbatch" with the remaining bulk of the bimodal polyethylene copolymer.

In an embodiment of the disclosure, the bimodal polyethylene copolymer further comprises a nucleating agent.

The Polyethylene Blend

In an embodiment of the disclosure, the polyethylene blend of the present disclosure comprises a nucleated polyethylene homopolymer composition and a non-nucleated bimodal polyethylene copolymer.

In an embodiment of the disclosure, the polyethylene blend of the present disclosure comprises a nucleated polyethylene homopolymer composition and a nucleated bimodal polyethylene copolymer.

In an embodiment of the disclosure, the polyethylene blend comprises from 1 to 99 weight percent (wt %) of a polyethylene homopolymer composition and from 99 to 1 weight percent (wt %) of a bimodal polyethylene copolymer; wherein the polyethylene homopolymer composition comprises a nucleating agent.

In an embodiment of the disclosure, the polyethylene blend comprises from 10 to 90 weight percent (wt %) of a polyethylene homopolymer composition and from 90 to 10 weight percent (wt %) of a bimodal polyethylene copolymer; wherein the polyethylene homopolymer composition comprises a nucleating agent.

In an embodiment of the disclosure, the polyethylene blend comprises from 20 to 80 weight percent (wt %) of a polyethylene homopolymer composition and from 80 to 20 weight percent (wt %) of a bimodal polyethylene copolymer; wherein the polyethylene homopolymer composition comprises a nucleating agent.

In an embodiment of the disclosure, the polyethylene blend comprises from 25 to 75 weight percent (wt %) of a polyethylene homopolymer composition and from 75 to 25 weight percent (wt %) of a bimodal polyethylene copolymer; wherein the polyethylene homopolymer composition comprises a nucleating agent.

In an embodiment of the disclosure, the polyethylene blend comprises from 30 to 70 weight percent (wt %) of a polyethylene homopolymer composition and from 70 to 30 weight percent (wt %) of a bimodal polyethylene copolymer; wherein the polyethylene homopolymer composition comprises a nucleating agent.

In an embodiment of the disclosure, the polyethylene blend comprises from 35 to 65 weight percent (wt %) of a polyethylene homopolymer composition and from 65 to 35 weight percent (wt %) of a bimodal polyethylene copolymer; wherein the polyethylene homopolymer composition comprises a nucleating agent.

In an embodiment of the disclosure, the polyethylene blend comprises from 40 to 60 weight percent (wt %) of a polyethylene homopolymer composition and from 60 to 40 weight percent (wt %) of a bimodal polyethylene copolymer; wherein the polyethylene homopolymer composition comprises a nucleating agent.

In an embodiment of the disclosure, the polyethylene blend comprises from 45 to 55 weight percent (wt %) of a polyethylene homopolymer composition and from 55 to 45 weight percent (wt %) of a bimodal polyethylene copolymer; wherein the polyethylene homopolymer composition comprises a nucleating agent.

In an embodiment of the disclosure, the polyethylene blend comprises from 1 to 99 weight percent (wt %) of a polyethylene homopolymer composition and from 99 to 1 weight percent (wt %) of a bimodal polyethylene copolymer; wherein both the polyethylene homopolymer composition and the bimodal polyethylene copolymer comprise a nucleating agent.

In an embodiment of the disclosure, the polyethylene blend comprises from 10 to 90 weight percent (wt %) of a polyethylene homopolymer composition and from 90 to 10 weight percent (wt %) of a bimodal polyethylene copolymer; wherein both polyethylene homopolymer composition and the bimodal polyethylene copolymer comprise a nucleating agent.

In an embodiment of the disclosure, the polyethylene blend comprises from 20 to 80 weight percent (wt %) of a polyethylene homopolymer composition and from 80 to 20 weight percent (wt %) of a bimodal polyethylene copolymer; wherein both polyethylene homopolymer composition and the polyethylene copolymer comprise a nucleating agent.

In an embodiment of the disclosure, the polyethylene blend comprises from 25 to 75 weight percent (wt %) of a polyethylene homopolymer composition and from 75 to 25 weight percent (wt %) of a bimodal polyethylene copolymer; wherein both polyethylene homopolymer composition and the bimodal polyethylene copolymer comprise a nucleating agent.

In an embodiment of the disclosure, the polyethylene blend comprises from 30 to 70 weight percent (wt %) of a polyethylene homopolymer composition and from 70 to 30 weight percent (wt %) of a bimodal polyethylene copolymer; wherein both polyethylene homopolymer composition and the bimodal polyethylene copolymer comprise a nucleating agent.

In an embodiment of the disclosure, the polyethylene blend comprises from 35 to 65 weight percent (wt %) of a polyethylene homopolymer composition and from 65 to 35 weight percent (wt %) of a bimodal polyethylene copolymer; wherein both polyethylene homopolymer composition and the bimodal polyethylene copolymer comprise a nucleating agent.

In an embodiment of the disclosure, the polyethylene blend comprises from 40 to 60 weight percent (wt %) of a polyethylene homopolymer composition and from 60 to 40 weight percent (wt %) of a bimodal polyethylene copolymer; wherein both polyethylene homopolymer composition and the bimodal polyethylene copolymer comprise a nucleating agent.

In an embodiment of the disclosure, the polyethylene blend comprises from 45 to 55 weight percent (wt %) of a polyethylene homopolymer composition and from 55 to 45 weight percent (wt %) of a bimodal polyethylene copolymer; wherein both polyethylene homopolymer composition and the bimodal polyethylene copolymer comprise a nucleating agent.

In an embodiment of the disclosure, the polyethylene blend has a density of from about 0.951 to about 0.975 g/cm$^3$. In further embodiments of the disclosure the polyethylene blend has a density of from about 0.951 to about 0.971 g/cm$^3$, or from about 0.952 to about 0.970 g/cm$^3$, or from about 0.952 to about 0.969 g/cm$^3$, or from about 0.953 to about 0.970 g/cm$^3$, or from about 0.953 to about 0.969 g/cm$^3$, or from about 0.951 to about 0.970 g/cm$^3$, or from about 0.951 to about 0.969 g/cm$^3$.

In an embodiment of the disclosure, the polyethylene blend has a melt index ($I_2$) of from about 0.1 to about 10.0 g/10 min. In further embodiments of the disclosure the polyethylene blend has a melt index ($I_2$) of from about 0.5 to about 10 g/10 min, or from about 1.0 to about 10.0 g/10 min, or from about 1.0 to about 8.0 g/10 min, or from about 1.5 to about 8.0 g/10 min, or from about 1.0 to about 7.0 g/10 min, or from about 1.5 to about 7.0 g/10 min, or from about 1.0 to about 6.0 g/10 min, or from about 1.5 to about 6.0 g/10 min, or from about 1.0 to about 5.0 g/10 min, or from about 1.5 to about 5.0 g/10 min.

In embodiments of the disclosure, the polyethylene blend has a number average molecular weight ($M_n$) of from about 5,000 to about 20,000, or from about 7,500 to about 17,500, or from about 7,500 to about 15,000.

In embodiments of the disclosure, the polyethylene blend has a weight average molecular weight ($M_W$) of from about 40,000 to about 175,000, or from 40,000 to about 140,000, or from about 40,000 to about 120,000, or from about 50,000 to about 120,000, or from about 50,000 to about 110,000.

In embodiments of the disclosure, the polyethylene blend has a Z-average molecular weight ($M_Z$) of less than about 350,000 or less than about 325,000 or less than about 300,000.

In embodiments of the disclosure, the polyethylene blend has a Z-average molecular weight ($M_Z$) of from about 130,000 to about 350,000, or from about 140,000 to about 325,000, or from about 140,000 to about 300,000, or from about 150,000 to about 325,000, or from 150,000 to about 300,000.

In an embodiment of the disclosure, the polyethylene blend has a molecular weight distribution ($M_W/M_n$) of from about 3.0 to about 13.0. In further embodiments of the disclosure, the polyethylene blend has molecular weight distribution ($M_W/M_n$) of from about 3.5 to about 12.5, or from about 4.0 to about 12.0, or from about 4.5 to about 11.0, or from about 4.0 to about 10.0, or from about 4.5 to about 9.5, or from about 4.0 to about 9.0, or from about 4.0 to about 8.5, or from about 4.0 to about 8.0.

In an embodiment of the disclosure, the polyethylene blend has a Z-average molecular weight distribution ($M_Z/M_w$) of from about 2.0 to about 5.0, or from about 2.0 to about 4.5, or from about 2.0 to about 4.0.

In an embodiment of the disclosure, the polyethylene blend has a bimodal GPC profile in a gel permeation chromatograph.

In an embodiment of the disclosure, the polyethylene blend has a multimodal GPC profile in a gel permeation chromatograph.

In an embodiment of the disclosure, the polyethylene blend has a shear viscosity ratio, Shear Viscosity Ratio $\eta(100\ s^{-1})/\eta(100000\ s^{-1})$ at 240° C. of at least 75, or at least 90, or at least 100, or from 80 to 200, or from 100 to 180.

In an embodiment of the disclosure, the polyethylene blend has an ESCR Condition B at 10% Igepal at 50° C. of at least 10 hours, or at least 25 hours, or at least 50 hours, or from 5 to 100 hours, or from 5 to 75 hours.

In an embodiment of the disclosure, the polyethylene blend has an 2 percent Flexural Modulus of at least 1,200 MPa, or at least 1,400 MPa, or at least 1,600 MPa, or from 1,000 to 2,000 MPa, or from 1,200 to 1,800 MPa.

In an embodiment of the disclosure, the polyethylene blend is used in the formation of molded articles. Such articles may be formed by compression molding, continuous compression molding, injection molding or blow molding.

Such articles include, for example, caps, screw caps, and closures for bottles, containers or pouches, including hinged versions thereof, pill bottles or pharmaceutical bottles or pill bottle closures or pharmaceutical bottle closures, including hinged versions thereof.

In an embodiment of the disclosure, the polyethylene blend is used in the formation of films, such as, for example, blown film, cast film, and lamination or extrusion film. Processes to make such films from a polyethylene blend are well known to persons skilled in the art.

In an embodiment of the disclosure, the polyethylene blend is used in the formation of rotomolded articles.

In an embodiment of the disclosure, the polyethylene blend is used in the formation of any closure, of any suitable design and dimensions for use in any hot filling process for filling any suitable bottle, container or the like.

In an embodiment of the disclosure, the polyethylene blend is used in the formation of a closure for bottles, containers, pouches and the like. For example, closures for bottles formed by continuous compression molding, or injection molding are contemplated. Such closures include, for example, caps, hinged caps, screw caps, hinged screw caps, snap-top caps, hinged snap-top caps, and optionally hinged closures for bottles, containers, pouches and the like.

In an embodiment of the disclosure, the polyethylene blend is used in the formation of molded articles. For example, articles formed by continuous compression molding and injection molding are contemplated. Such articles include, for example, caps, screw caps, and closures for bottles.

Closures

The terms "cap" and "closure" are used interchangeably in the current disclosure, and both connote any suitably shaped molded article for enclosing, sealing, closing or covering, etc., a suitably shaped opening, a suitably molded aperture, an open necked structure or the like used in combination with a container, a bottle, a jar, a pouch and the like.

Closures include one piece closures or closures comprising more than one piece.

In an embodiment of the disclosure, the polyethylene blends described above are used in the formation of a closure.

In an embodiment of the disclosure, the polyethylene blends described above are used in the formation of a closure for bottles, containers and pouches and the like. For example, closures for bottles formed by compression molding or injection molding are contemplated. Such closures include, for example, hinged caps, hinged screw caps, hinged snap-top caps, and hinged closures for bottles, containers, pouches and the like.

In an embodiment of the disclosure, a closure (or cap) is a screw cap for a bottle, container, pouch and the like.

In an embodiment of the disclosure, a closure (or cap) is a snap closure for a bottle, container, pouch and the like.

In an embodiment of the disclosure, a closure (or cap) comprises a hinge made of the same material as the rest of the closure (or cap).

In an embodiment of the disclosure, a closure (or cap) is hinged closure.

In an embodiment of the disclosure, a closure (or cap) is a hinged closure for bottles, containers, pouches and the like.

In an embodiment of the disclosure, a closure (or cap) is for retort, hot fill, aseptic fill and cold fill applications.

In an embodiment of the disclosure, a closure (or cap) is a flip-top hinge closure, such as a flip-top hinge closure for use on a plastic ketchup bottle or similar containers containing foodstuffs.

When a closure is a hinged closure, it comprises a hinged component and generally consists of at least two bodies which are connected by a thinner section that acts as a hinge allowing the at least two bodies to bend from an initially molded position. The thinner section may be continuous or web-like, wide or narrow.

A useful closure (for bottles, containers and the like) is a hinged closure and may consist of two bodies joined to each other by at least one thinner bendable portion (e.g., the two bodies can be joined by a single bridging portion, or more than one bridging portion, or by a webbed portion, etc.). A first body may contain a dispensing hole and which may snap onto or screw onto a container to cover a container opening (e.g., a bottle opening) while a second body may serve as a snap on lid which may mate with the first body.

The caps and closures, of which hinged caps and closures and screw caps are a subset, can be made according to any known method, including, for example, injection molding and compression molding techniques that are well known to persons skilled in the art. Hence, in an embodiment of the disclosure a closure (or cap) comprising the polyethylene blend (defined above) is prepared with a process comprising at least one compression molding step and/or at least one injection molding step.

In one embodiment, the caps and closures (including single piece or multi-piece variants and hinged variants) comprise the polyethylene blend described above which have good stiffness, and processability, as well as good ESCR values. Hence the closures and caps of this embodiment are well suited for sealing bottles, containers and the like, for examples bottles that may contain drinkable water, and other foodstuffs, including but not limited to liquids that are under an appropriate pressure (i.e., carbonated beverages or appropriately pressurized drinkable liquids).

The closures and caps may also be used for sealing bottles containing drinkable water or non-carbonated beverages (e.g., juice). Other applications, include caps and closures for bottles, containers and pouches containing foodstuffs, such as for example ketchup bottles and the like.

The closures and caps may be one-piece closures or two piece closures comprising a closure and a liner.

The closures and caps may also be of multilayer design, wherein the closure of cap comprises at least two layers at least one of which is made of the polyethylene blends described herein.

In an embodiment of the disclosure, the closure is made by continuous compression molding.

In an embodiment of the disclosure, the closure is made by injection molding.

A closure as described in the present disclosure may be a closure suitable for use in a container sealing process comprising one of more steps in which the closure comes into contact with a liquid at elevated temperatures, such as hot fill processes, and in some cases aseptic fill processes. Such closures and processes are described in, for example, Canadian Patent Application Nos 2,914,353; 2,914,354; and 2,914,315.

Without wishing to be bound by theory, the instantaneous compressive deformation of an "as-is" closure is a function of both instantaneous force (e.g., stress) and time in a non-linear relationship at a given temperature and modeling is required to elucidate the underlying structure-property relationships. The instantaneous compressive deformation model employed in the current disclosure is a compressive strain model represented by the following equation:

$$\varepsilon = A \times \sigma^n \times t^m$$

where $\varepsilon$ is the compressive strain; $\sigma$ is the stress in N/cm² and t is the loading time in seconds. A is the model coefficient; parameter n is termed the "deformation stress exponent" and m is termed the "time exponent". Any software capable of performing non-linear regressions can be used to estimate the model parameters. Such a compressive deformation model was recently disclosed at an ANTEC meeting as "*Deformation Measurement, Modeling and Morphology Study for HDPE Caps and Closures*", XiaoChuan (Alan) Wang, Mar. 23-25, 2015, Orlando, Fla., USA.

In an embodiment of the disclosure, the closure made is a PCO 1881 CSD closure, having a weight of about 2.15 grams and having the following dimensions: Closure height (not including Tamper Ring)=about 10.7 mm; Closure height with Tamper Ring=about 15.4 mm; Outside diameter @ 4 mm=about 29.6 mm; Thread diameter=about 25.5 mm; Bump seal diameter=about 24.5 mm; Bump seal thickness=about 0.7 mm; Bump seal height to center of olive=about 1.5 mm; Bore seal diameter=about 22.5 mm; Bore seal thickness=about 0.9 mm; Bore height to center of olive=about 1.6 mm; Top panel thickness=about 1.2 mm; Tamper band undercut diameter=about 26.3 mm; Thread depth=about 1.1 mm; Thread pitch=about 2.5 mm; Thread Root @ 4 mm=27.4 mm.

In an embodiment of the disclosure, the closure is made using an injection molding process to prepare a PCO 1881 CSD closure, having a weight of about 2.15 grams and having the following dimensions: Closure height (not including Tamper Ring)=about 10.7 mm; Closure height with Tamper Ring=about 15.4 mm; Outside diameter @ 4 mm=about 29.6 mm; Thread diameter=about 25.5 mm; Bump seal diameter=about 24.5 mm; Bump seal thickness=about 0.7 mm; Bump seal height to center of olive=about 1.5 mm; Bore seal diameter=about 22.5 mm; Bore seal thickness=about 0.9 mm; Bore height to center of olive=about 1.6 mm; Top panel thickness=about 1.2 mm; Tamper band undercut diameter=about 26.3 mm; Thread depth=about 1.1 mm; Thread pitch=about 2.5 mm; Thread Root @ 4 mm=27.4 mm.

In an embodiment of the disclosure, the closure is made using a continuous compression molding process to prepare a PCO 1881 CSD closure, having a weight of about 2.15 grams and having the following dimensions: Closure height (not including Tamper Ring)=about 10.7 mm; Closure height with Tamper Ring=about 15.4 mm; Outside diameter @ 4 mm=about 29.6 mm; Thread diameter=about 25.5 mm; Bump seal diameter=about 24.5 mm; Bump seal thickness=about 0.7 mm; Bump seal height to center of olive=about 1.5 mm; Bore seal diameter=about 22.5 mm; Bore seal thickness=about 0.9 mm; Bore height to center of olive=about 1.6 mm; Top panel thickness=about 1.2 mm; Tamper band undercut diameter=about 26.3 mm; Thread depth=about 1.1 mm; Thread pitch=about 2.5 mm; Thread Root @ 4 mm=27.4 mm.

In an embodiment of the present disclosure, a closure has a time exponent, m of 0.075 or less where m is determined using a compressive strain model represented by the equation:

$$\varepsilon = A \times \sigma^n \times t^m$$

where $\varepsilon$ is the compressive strain; $\sigma$ is the stress in N/cm², t is the loading time in seconds, A is the model coefficient, n is the deformation stress exponent and m is the time exponent.

In further embodiments of the present disclosure, a closure has a time exponent, m of 0.0750 or less, or ≤0.0725, or ≤0.0700, or ≤0.0675, or ≤0.0650 where m is determined using a compressive strain model represented by the equation:

$$\varepsilon = A \times \sigma^n \times t^m$$

where $\varepsilon$ is the compressive strain; $\sigma$ is the stress in N/cm², t is the loading time in seconds, A is the model coefficient, n is the deformation stress exponent and m is the time exponent.

Further non-limiting details of the disclosure are provided in the following examples. The examples are presented for the purpose of illustrating selected embodiments of this disclosure, it being understood that the examples presented do not limit the claims presented.

EXAMPLES

General Polymer Characterization Methods

Melt indexes, $I_2$, $I_5$, $I_6$ and $I_{21}$ for the bimodal polyethylene composition were measured according to ASTM D1238 (when conducted at 190° C., using a 2.16 kg, a 5 Kg, a 6.48 kg and a 21 kg weight respectively).

$M_n$, $M_w$, and $M_z$ (g/mol) were determined by high temperature Gel Permeation Chromatography (GPC) with differential refractive index (DRI) detection using universal calibration (e.g. ASTM-D6474-99). GPC data was obtained using an instrument sold under the trade name "Waters 150c", with 1,2,4-trichlorobenzene as the mobile phase at 140° C. The samples were prepared by dissolving the polymer in this solvent and were run without filtration. Molecular weights are expressed as polyethylene equivalents with a relative standard deviation of 2.9% for the number average molecular weight ("Mn") and 5.0% for the weight average molecular weight ("Mw"). The molecular weight distribution ("MWD") is the weight average molecular weight divided by the number average molecular weight, $M_w/M_n$. The z-average molecular weight distribution is $M_z/M_n$. Polymer sample solutions (1 to 2 mg/mL) were prepared by heating the polymer in 1,2,4-trichlorobenzene (TCB) and rotating on a wheel for 4 hours at 150° C. in an oven. The antioxidant 2,6-di-tert-butyl-4-methylphenol (BHT) was added to the mixture in order to stabilize the polymer against oxidative degradation. The BHT concentration was 250 ppm. Sample solutions were chromatographed at 140° C. on a PL 220 high-temperature chromatography unit equipped with four Shodex columns (HT803, HT804, HT805 and HT806) using TCB as the mobile phase with a flow rate of 1.0 mL/minute, with a differential refractive index (DRI) as the concentration detector. BHT was added to the mobile phase at a concentration of 250 ppm to protect the columns from oxidative degradation. The sample injection volume was 200 mL. The raw data were processed with Cirrus GPC software. The columns were calibrated with narrow distribution polystyrene standards. The polystyrene molecular weights were converted to polyethylene molecular weights using the Mark-Houwink equation, as described in the ASTM standard test method D6474.

Primary melting peak (° C.), heat of fusion (J/g) and crystallinity (%) was determined using differential scanning calorimetry (DSC) as follows: the instrument was first calibrated with indium; after the calibration, a polymer specimen is equilibrated at 0° C. and then the temperature was increased to 200° C. at a heating rate of 10° C./min; the melt was then kept isothermally at 200° C. for five minutes; the melt was then cooled to 0° C. at a cooling rate of 10° C./min and kept at 0° C. for five minutes; the specimen was then heated to 200° C. at a heating rate of 10° C./min. The DSC Tm, heat of fusion and crystallinity are reported from the $2^{nd}$ heating cycle.

The short chain branch frequency (SCB per 1000 carbon atoms) of the high density bimodal polyethylene composition was determined by Fourier Transform Infrared Spectroscopy (FTIR) as per the ASTM D6645-01 method. A Thermo-Nicolet 750 Magna-IR Spectrophotometer equipped with OMNIC version 7.2a software was used for the measurements. Unsaturations in the high density bimodal polyethylene composition were also determined by Fourier Transform Infrared Spectroscopy (FTIR) as per ASTM D3124-98. Comonomer content can also be measured using $^{13}C$ NMR techniques as discussed in Randall, Rev. Macromol. Chem. Phys., C29 (2&3), p 285; U.S. Pat. No. 5,292,845 and WO 2005/121239.

Polyethylene composition density (g/cm$^3$) was measured according to ASTM D792.

Hexane extractables were determined according to ASTM D5227.

Shear viscosity was measured by using a Kayeness WinKARS Capillary Rheometer (model # D5052M-115). For the shear viscosity at lower shear rates, a die having a die diameter of 0.06 inch and L/D ratio of 20 and an entrance angle of 180 degrees was used. For the shear viscosity at higher shear rates, a die having a die diameter of 0.012 inch and L/D ratio of 20 was used.

The Shear Viscosity Ratio as the term is used in the present disclosure is defined as: $\eta_{10}/\eta_{1000}$ at 240° C. The $\eta_{10}$ is the melt shear viscosity at the shear rate of 10 s$^{-1}$ and the $\eta_{1000}$ is the melt shear viscosity at the shear rate of 1000 s$^{-1}$ measured at 240° C.

To determine CDBI$_{50}$, a solubility distribution curve is first generated for the polyethylene composition. This is accomplished using data acquired from the TREF technique. This solubility distribution curve is a plot of the weight fraction of the copolymer that is solubilized as a function of temperature. This is converted to a cumulative distribution curve of weight fraction versus comonomer content, from which the CDBI$_{50}$ is determined by establishing the weight percentage of a copolymer sample that has a comonomer content within 50% of the median comonomer content on each side of the median (see WO 93/03093 and U.S. Pat. No. 5,376,439). The CDBI$_{25}$ is determined by establishing the weight percentage of a copolymer sample that has a comonomer content within 25% of the median comonomer content on each side of the median.

The specific temperature rising elution fractionation (TREF) method used herein was as follows. Polymer samples (50 to 150 mg) were introduced into the reactor vessel of a crystallization-TREF unit (Polymer Char). The reactor vessel was filled with 20 to 40 ml 1,2,4-trichlorobenzene (TCB), and heated to the desired dissolution temperature (e.g., 150° C.) for 1 to 3 hours. The solution (0.5 to 1.5 ml) was then loaded into the TREF column filled with stainless steel beads. After equilibration at a given stabilization temperature (e.g., 110° C.) for 30 to 45 minutes, the polymer solution was allowed to crystallize with a temperature drop from the stabilization temperature to 30° C. (0.1 or 0.2° C./minute). After equilibrating at 30° C. for 30 minutes, the crystallized sample was eluted with TCB (0.5 or 0.75 mL/minute) with a temperature ramp from 30° C. to the stabilization temperature (0.25 or 1.0° C./min). The TREF column was cleaned at the end of the run for 30 minutes at the dissolution temperature. The data were processed using Polymer Char software, Excel spreadsheet and TREF software developed in-house.

Plaques molded from the polyethylene compositions were tested according to the following ASTM methods: Bent Strip Environmental Stress Crack Resistance (ESCR) at Condition B at 10% IGEPAL at 50° C., ASTM D1693; notched Izod impact properties, ASTM D256; Flexural Properties, ASTM D 790; Tensile properties, ASTM D 638; Vicat softening point, ASTM D 1525; Heat deflection temperature, ASTM D 648.

Dynamic mechanical analyses were carried out with a rheometer, namely Rheometrics Dynamic Spectrometer (RDS-II) or Rheometrics SR5 or ATS Stresstech, on compression molded samples under nitrogen atmosphere at 190° C., using 25 mm diameter cone and plate geometry. The oscillatory shear experiments were done within the linear viscoelastic range of strain (10% strain) at frequencies from 0.05 to 100 rad/s. The values of storage modulus (G'), loss modulus (G''), complex modulus (G*) and complex viscosity ($\eta^*$) were obtained as a function of frequency. The same rheological data can also be obtained by using a 25 mm diameter parallel plate geometry at 190° C. under nitrogen atmosphere. The SHI(1,100) value is calculated according to the methods described in WO 2006/048253 and WO 2006/048254.

A bimodal polyethylene copolymer was prepared in dual reactor solution polymerization process using a phosphinimine catalyst, in a manner outlined in U.S. Pat. No. 8,962,755. The melt index, I$_2$ and density of the first and second ethylene copolymers were estimated by GPC and GPC-FTIR deconvolutions as discussed further below.

High temperature GPC equipped with an online FTIR detector (GPC-FTIR) was used to measure the comonomer content as the function of molecular weight. Mathematical deconvolutions are performed to determine the relative amount of polymer, molecular weight and comonomer content of the component made in each reactor, by assuming that each polymer component follows a Flory's molecular weight distribution function and it has a homogeneous comonomer distribution across the whole molecular weight range.

For these single site catalyzed resins, the GPC data from GPC chromatographs was fit based on Flory's molecular weight distribution function.

To improve the deconvolution accuracy and consistency, as a constraint, the melt index, I$_2$, of the targeted resin was set and the following relationship was satisfied during the deconvolution:

$$\text{Log}_{10}(I_2)=22.326528+0.003467*[\text{Log}_{10}(M_n)]^3-4.322582*\text{Log}_{10}(M_w)-0.180061*[\text{Log}_{10}(M_z)]^2+0.026478*[\text{Log}_{10}(M_z)]^3$$

where the experimentally measured overall melt index, I$_2$, was used on the left side of the equation, while M$_n$ of each component (M$_w$=2×M$_n$ and M$_z$=1.5×M$_w$ for each component) was adjusted to change the calculated overall M$_n$, M$_w$ and M$_z$ of the composition until the fitting criteria were met. During the deconvolution, the overall M$_n$, M$_w$ and M$_z$ are calculated with the following relationships: M$_n$=1/Sum(w$_i$/M$_n$(i)), M$_w$=Sum(w$_i$×M$_w$(i)), M$_z$=Sum(w$_i$×M$_z$(i)$^2$), where i represents the i-th component and w$_i$ represents the relative weight fraction of the i-th component in the composition.

The uniform comonomer distribution (which results from the use of a single site catalyst) of the resin components (i.e., the first and second ethylene copolymers) allowed the estimation of the short chain branching content (SCB) from the GPC-FTIR data, in branches per 1000 carbon atoms and calculation of comonomer content (in mol %) and density (in g/cm$^3$) for the first and second ethylene copolymers, based on the de-convoluted relative amounts of first and second ethylene copolymer components in the polyethylene composition, and their estimated resin molecular weight parameters from the above procedure.

A component (or composition) density model and a component (or composition) melt index, $I_2$, model was used according to the following equations to calculate the density and melt index $I_2$ of the first and second ethylene polymers:

density=0.979863−0.00594808*(FTIR SCB/1000C)$^{0.65}$−0.000383133*[Log$_{10}$($M_n$)]$^3$0.00000577986*($M_w/M_n$)$^3$+0.00557395*($M_z/M_w$)$^{0.25}$;

Log$_{10}$(melt index,$I_2$)=22.326528+0.003467*[Log$_{10}$($M_n$)]$^3$−4.322582*Log$_{10}$($M_w$)−0.180061*[Log$_{10}$($M_z$)]$^2$+0.026478*[Log$_{10}$($M_z$)]$^3$ where the $M_n$, $M_w$ and $M_z$ were the deconvoluted values of the individual ethylene polymer components, as obtained from the results of the above GPC deconvolutions. Hence, these two models were used to estimate the melt indexes ($I_2$) and the densities of the components (i.e., the first and second ethylene copolymers).

A polyethylene homopolymer composition was prepared in a dual reactor solution polymerization process using a phosphinimine catalyst, in a manner outlined in U.S. Patent Application Publication Nos. US2008/0118749 and US2015/0203671, both of which are incorporated herein in their entirety. As noted above, melt index ($I_2$) is generally inversely proportional to molecular weight for polyethylene resins. This was confirmed for homopolymer HDPE resins having a narrow molecular weight distribution (of less than 3) by preparing a plot of log($I_2$) versus log(weight average molecular weight, Mw). In order to prepare this plot, the melt index ($I_2$) and weight average molecular Mw) of more than 15 different homopolymer HDPE resins was measured. These homopolymer HDPE resins had a narrow molecular weight distribution (less than 3) but had different Mw-ranging from about 30,000 to 150,000. (As will be appreciated by those skilled in the art, it is difficult to obtain reproducible $I_2$ values for polyethylene resins having a molecular weight which is outside of this range.) A log/log plot of these $I_2$ and Mw values was used to calculate the following relation between $I_2$ and Mw for such homopolymer HDPE resins: $I_2=(1.774\times10^{-19})\times(Mw^{-3.86})$. Extrapolation (based on the above relation) was used to estimate the $I_2$ values of the I) first ethylene homopolymer component and the II) second ethylene homopolymer component present in the polyethylene homopolymer composition. That is, the molecular weight of component I and component II was measured and the Mw values were used to estimate the $I_2$ values.

Polyethylene blends having differing amounts of a nucleated polyethylene homopolymer composition and bimodal polyethylene copolymer were prepared by using a twin-screw extruder. They were first tumble blended and subsequently melt compounded under nitrogen purge using a LEISTRITZ® twin screw extruder at 65 rpm with a melt temperature of 200° C.

The polyethylene homopolymer composition, "Blend Component A" used in the blend had a density of 0.968 g/cm$^3$, a melt index ($I_2$) of 6 g/10 min, a molecular weight distribution ($M_w/M_n$) of 5.5, and was nucleated with 1,200 ppm (parts per million by weight) of HPN-20E which is commercially available from Milliken. To nucleate the ethylene homopolymer composition, it was melt compounded with a HPN-20E masterbatch. Further polymer and plaque details for the nucleated ethylene homopolymer composition are shown in Table 1. A GPC profile is shown in FIG. 1.

Figure 2:
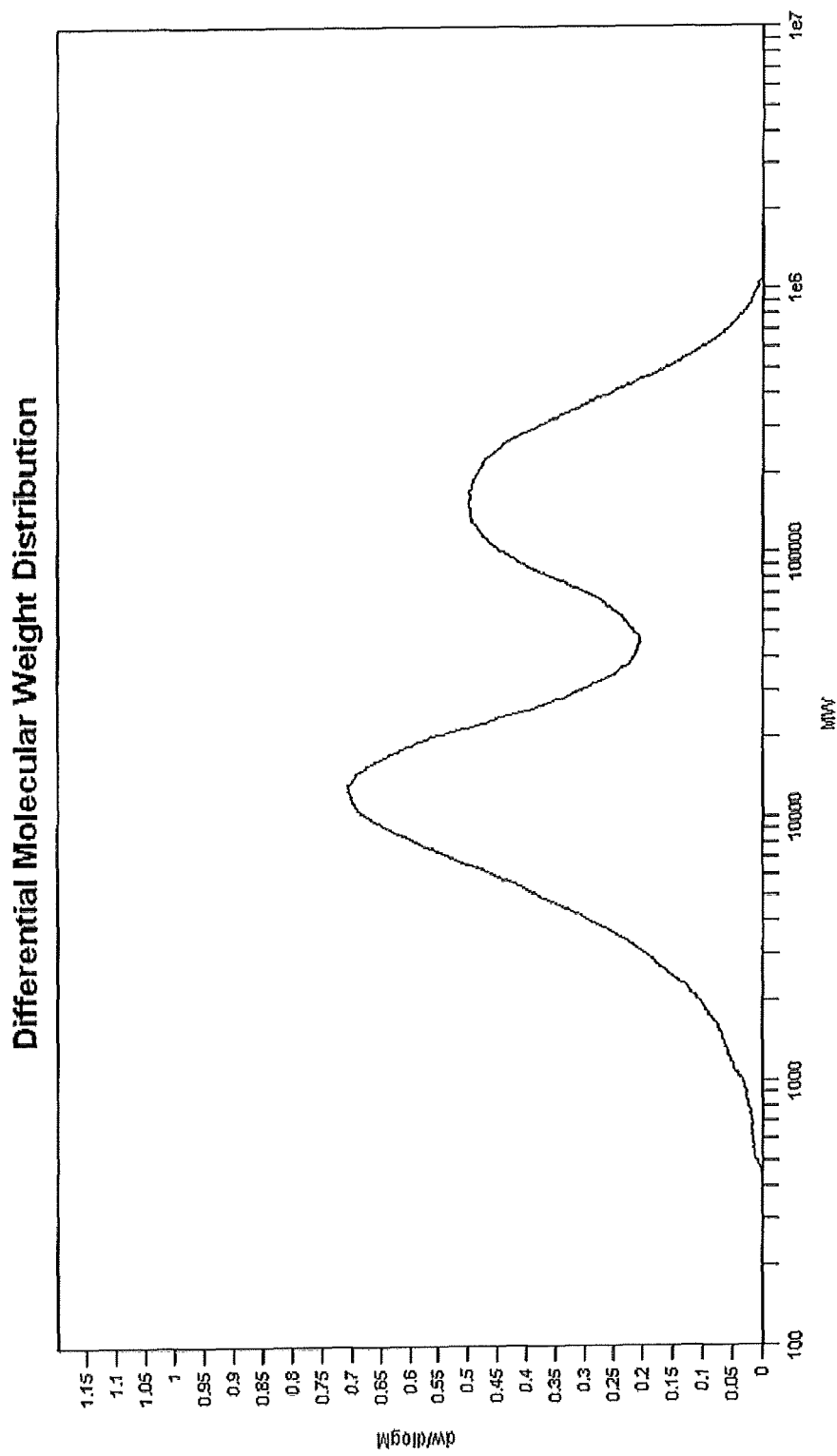
FIG. 2 shows a gel permeation chromatograph for "Blend Component B", a bimodal polyethylene copolymer used in an embodiment of the present disclosure.

The bimodal polyethylene copolymer, "Blend Component B" used in the polyethylene blend had a density of 0.953 g/cm$^3$, a melt index ($I_2$) of 1.5 g/10 min, and a molecular weight distribution ($M_w/M_n$) of 8.5. Further polymer and plaque details for the bimodal polyethylene copolymer are shown in Table 1. A GPC profile is shown in FIG. 2.

Figure 3:
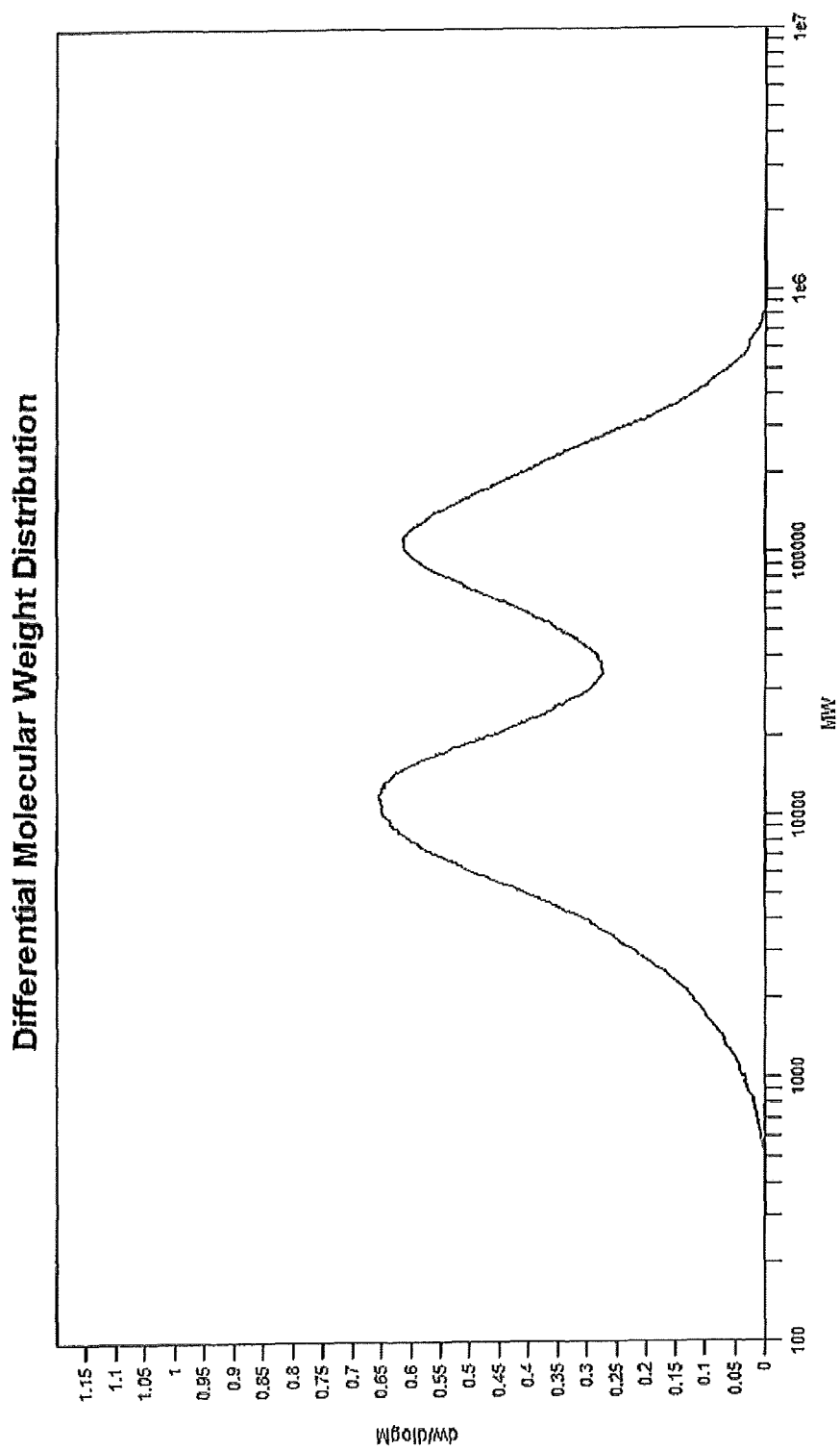
FIG. 3 shows a gel permeation chromatograph for Polyethylene Blend No. 1.
Figure 4:
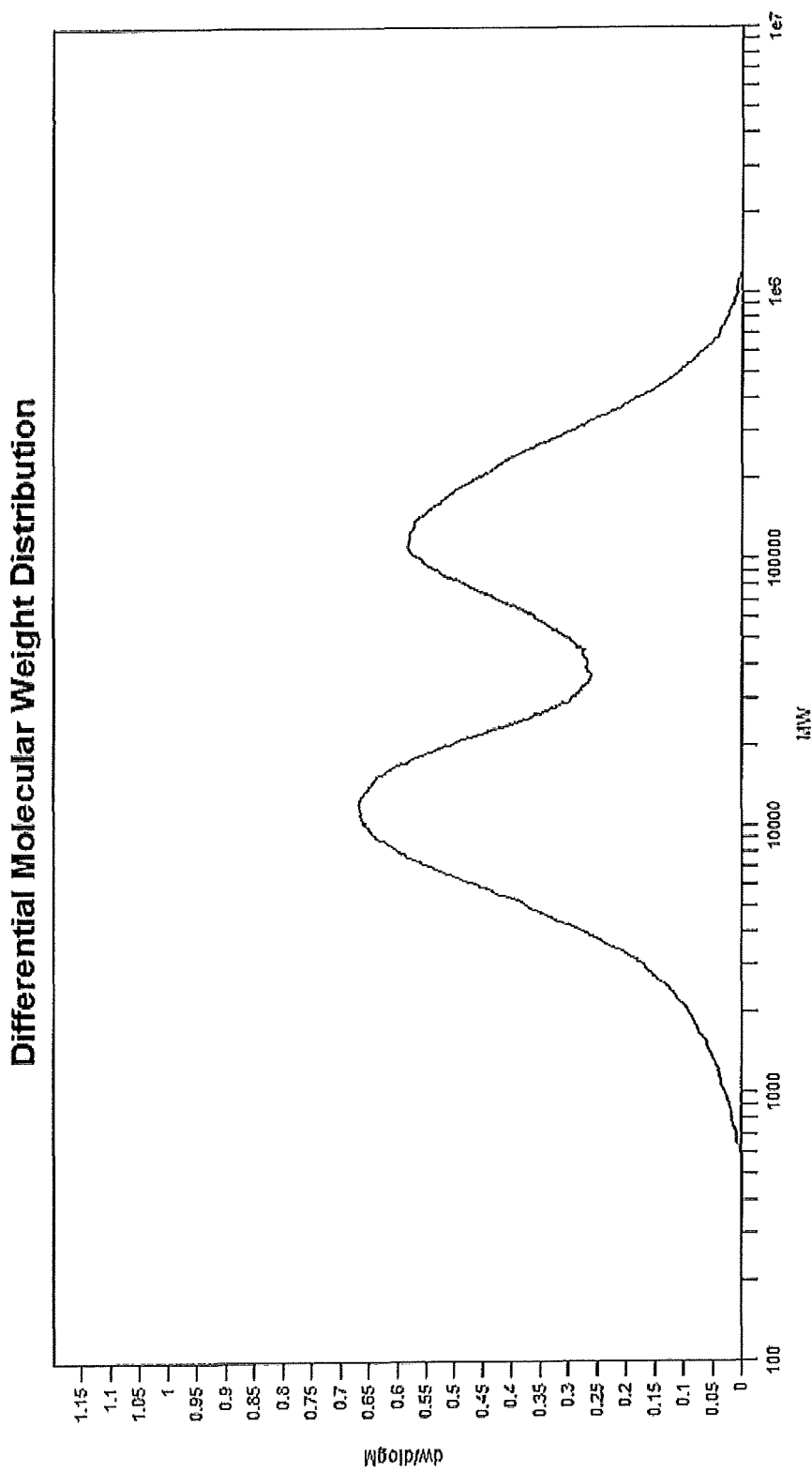
FIG. 4 shows a gel permeation chromatograph for Polyethylene Blend No. 2.
Figure 5:
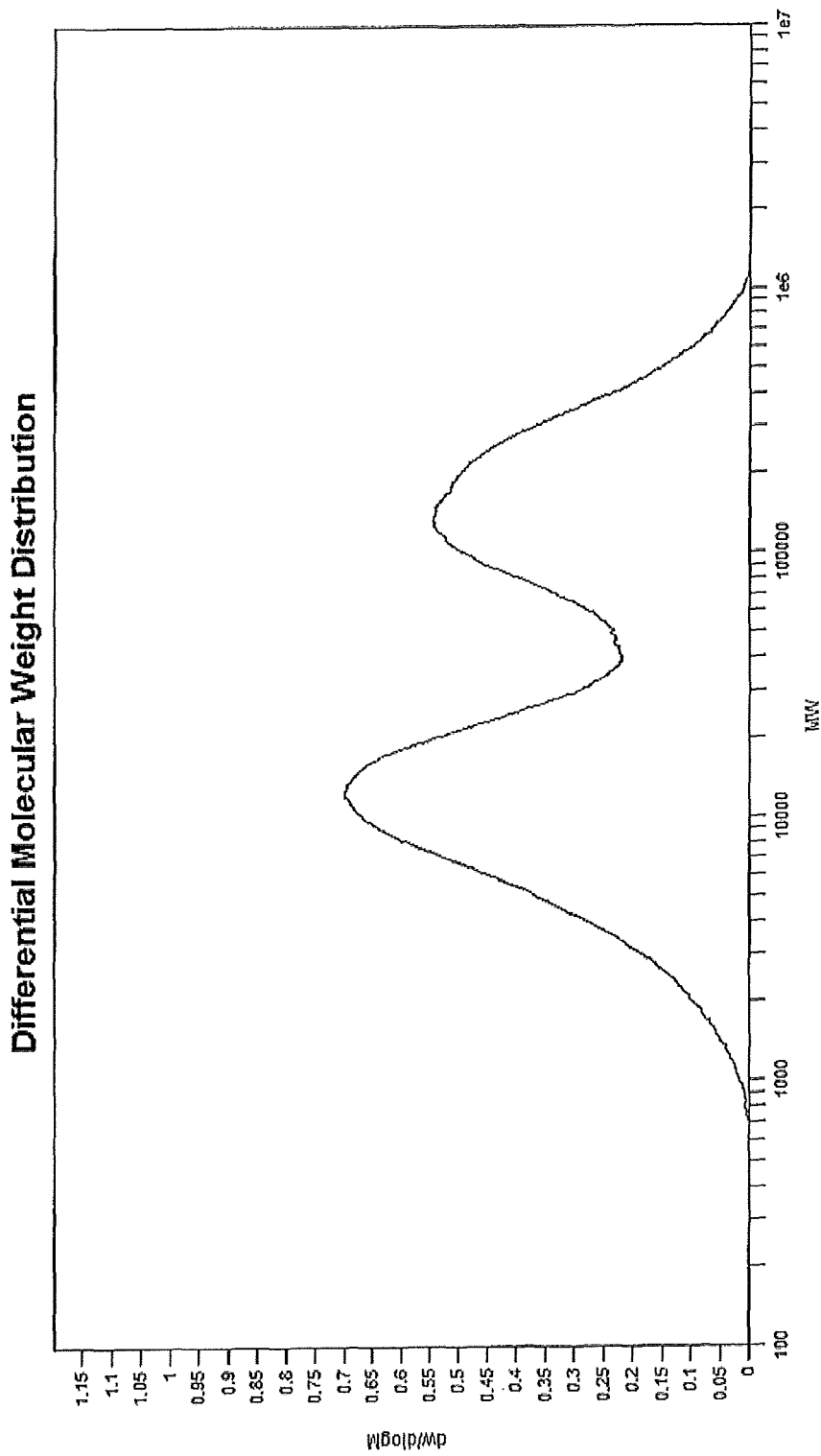
FIG. 5 shows a gel permeation chromatograph for Polyethylene Blend No. 3.

The polyethylene blends and their properties are shown in Table 1. The polyethylene blends were also made into plaques and the plaque properties are also given in Table 1. GPC profiles for Polyethylene Blends Nos. 1, 2 and 3 are shown in FIGS. 3, 4 and 5 respectively.

TABLE 1

Polymer and Plaque Data

| Example | Polyethylene Blend Component A | Polyethylene Blend Component B | Polyethylene Blend No. 1 (Inventive) | Polyethylene Blend No. 2 (Inventive) | Polyethylene Blend No. 3 (Inventive) |
| --- | --- | --- | --- | --- | --- |
| Component Weight Percent | 100% | 100% | 25% wt % A + 75 wt % B | 50 wt % A + 50 wt % B | 75 wt % A + 25 wt % B |
| Nucleating Agent | 1200 ppm HPN-20E | None | | | |
| Density (g/cm$^3$) | 0.968 | 0.953 | 0.9577 | 0.9614 | 0.9649 |
| Rheology/Flow Properties | | | | | |
| Melt Index $I_2$ (g/10 min) | 6 | 1.5 | 1.84 | 2.6 | 3.94 |
| Melt Flow Ratio ($I_{21}/I_2$) | 32.6 | 58 | 53 | 45.1 | 38.2 |
| $I_{21}$ | 191 | 77 | 94 | 122 | 151 |
| $I_5$ | 16.8 | 3.88 | 5.64 | 7.86 | 11.9 |
| $I_{21}/I_5$ | 11.37 | 19.85 | 16.67 | 15.52 | 12.69 |
| Stress Exponent | 1.27 | 1.35 | 1.36 | 1.35 | 1.32 |
| Shear Viscosity at 10$^5$ s$^{-1}$ (240° C., Pa-s) | 5.22 | 5.21 | 5.10 | 5.00 | 5.13 |
| Shear Viscosity Ratio $\eta(10\ s^{-1})/\eta\ (1000\ s^{-1})$ at 240° C. | 3.93 | 12.53 | 10.67 | 7.79 | 5.41 |
| Shear Viscosity Ratio $\eta\ (100\ s^{-1})/\eta\ (100000\ s^{-1})$ at 240° C. | 86.96 | 184.75 | 163.77 | 138.88 | 111.19 |

TABLE 1-continued

Polymer and Plaque Data

| Example | Polyethylene Blend Component A | Polyethylene Blend Component B | Polyethylene Blend No. 1 (Inventive) | Polyethylene Blend No. 2 (Inventive) | Polyethylene Blend No. 3 (Inventive) |
|---|---|---|---|---|---|
| GPC - conventional | | | | | |
| $M_n$ | 12098 | 11687 | 12488 | 12105 | 10795 |
| $M_w$ | 66127 | 95252 | 92883 | 83883 | 70820 |
| $M_z$ | 169449 | 303871 | 282898 | 251766 | 198570 |
| Polydispersity Index ($M_w/M_n$) | 5.47 | 8.15 | 7.44 | 6.93 | 6.56 |
| $M_z/M_w$ | 2.56 | 3.19 | 3.05 | 3.00 | 2.80 |
| Branch Frequency - FTIR (uncorrected for chain end - $CH_3$) | | | | | |
| Uncorrected SCB/1000 C | — | 2.6 | 2.1 | 1.7 | 1.3 |
| Uncorrected comonomer content (mol %) | — | 0.52 | 0.4 | 0.3 | 0.3 |
| Internal unsaturation (/1000 C) | 0.020 | 0.020 | 0.030 | 0.020 | 0.020 |
| Side chain unsaturation (/1000 C) | 0.000 | 0.000 | 0.000 | 0.000 | 0.000 |
| Terminal unsaturation (/1000 C) | 0.070 | 0.080 | 0.100 | 0.100 | 0.090 |
| Comonomer | None | 1-octene | 1-octene | 1-octene | 1-octene |
| DSC | | | | | |
| Primary Melting Peak (° C.) | 133.45 | 128.99 | 131.16 | 132.34 | 133.16 |
| Heat of Fusion (J/g) | 251.90 | 227.10 | 228.10 | 234.80 | 241.40 |
| Crystallinity (%) | 86.85 | 78.32 | 78.64 | 80.98 | 83.24 |
| Environmental Stress Crack Resistance | | | | | |
| ESCR Cond. B at 10% (hours) | 4 | 145 | 57 | 31 | 2 to 17 |
| Flexural Properties (Plaques) | | | | | |
| Flex Secant Mod. 1% (MPa) | 2167 | 1420 | 1706 | 1812 | 1939 |
| Flex Secant Mod. 2% (MPa) | 1755 | 1184 | 1423 | 1509 | 1613 |
| Flex strength at break (MPa) | 52.2 | 39.4 | 45.5 | 47.7 | 49.9 |
| Impact Properties (Plaques) | | | | | |
| Izod Impact (ft-lb/in) | 0.70 | 1.5 | 1.4 | 1.1 | 0.9 |
| Other properties | | | | | |
| Hexane Extractables (%) | 0.3 | 0.34 | 0.26 | 0.23 | 0.26 |
| VICAT Soft. Pt. (° C.) - Plaque | 127 | 126.2 | 126.9 | 127.3 | 127.6 |
| Heat Deflection Temp. [° C.] @ 66 PSI | 86 | 66.7 | 73.6 | 78.6 | 79.1 |

The data in Table 1 show that the present polyethylene blends have a good balance of ESCR (greater than about 30 hours for blends having at least 50 weight percent of the bimodal polyethylene copolymer), processability (the Shear Viscosity Ratio $\eta(100~s^{-1})/\eta(100000~s^{-1})$ at 240° C. is greater than about 130 for blends having at least 50 weight percent of the bimodal polyethylene copolymer), and stiffness (the 2 percent secant modulus is greater than about 1,400 MPa for each blend). A good balance of ESCR, stiffness, and processability is desirable for the manufacture of molded articles, such as articles derived from continuous compression molding or injection molding.

Closures

Generally, the mechanically sealing surfaces between a polyethylene closure and PET bottle neck finish have very complex geometries. As such, it is difficult to perform a systematic study using general experimental methods. For example, numerical simulations (e.g., Finite Element Analysis) may be useful for this purpose, but the inputs of the material properties for this type of analysis generally use those from compression-molded plaques made in a laboratory environment. Compression molded plaques however, may have very different material morphologies and properties than those of a closure manufactured with industrial injection molding or continuous compression molding processes. A methodology which can be used to obtain closure strain model parameters on closures that have been made according to commercial practices provides an alternative. One such methodology, also used in the present disclosure, was recently disclosed at an ANTEC® meeting as "*Deformation Measurement, Modeling and Morphology Study for HDPE Caps and Closures*", XiaoChuan (Alan) Wang, Mar. 23-25, 2015, Orlando, Fla., USA.

The methodology used in the present disclosure is to use the deformation (e.g. creep) of the top panel of an as-is closure to approximate that between the mechanically sealing surfaces of the plastic closure and PET bottle neck finish after a closure is put or screwed onto a PET bottle (see FIGS. 1-5 in "*Deformation Measurement, Modeling and Morphology Study for HDPE Caps and Closures*", XiaoChuan (Alan) Wang, Mar. 23-25, 2015, Orlando, Fla., USA, ANTEC meeting). The use of a closure, instead of a standardized plaque, reflects the true molded material morphology and includes the contribution of the closure design. The deformation of the top panel of the closure can be well defined for the purpose of comparing closures made from different materials. By examining the top panel of the closure, one avoids dealing with the complex geometries of the sealing surfaces.

The following measurements and modeling can be used for any "as-is" closure design, provided that the closures being compared are prepared using substantially the same method under substantially similar conditions to provide closures having substantially similar design and dimensions. By way of non-limiting example only, the following method of preparing closures, closures which can then be compared using the methods described herein, is provided.

Method of Making a Closure by Injection Molding

A Sumitomo injection molding machine and 2.15-gram PCO (plastic closure only) 1881 carbonated soft drink (CSD) closure mold was used to prepare the closures herein. A Sumitomo injection molding machine (model SE75EV C250M) having a 28 mm screw diameter was used. The 4-cavity CSD closure mold was manufactured by Z-moulds (Austria). The 2.15-gram PCO 1881 CSD closure design was developed by Universal Closures Ltd. (United Kingdom). During the closure manufacturing, four closure parameters, the diameter of the top of the cap, the bore seal diameter, the tamper band diameter and the overall cap height, were measured and ensured to be within quality-control specifications.

For red pigmented closures, resins are dry-blended with 2% slip (erucamide) master batch (Ampacet slip 101797 with the 5 wt % slip; 1000 ppm slip additive in the final resin) and 1% of red masterbatch (Ampacet PE red masterbatch LJ-206971 with 1.5 wt. % red pigment; 150 ppm red pigment in the final resin) prior to injection molding.

An International Society of Beverage Technologists (ISBT) voluntary standard test method was used to determine the closure dimensions. The test used involves the selection of a mold cavity and the measurements on at least 5 closures made from that particular cavity. At least 14 dimensional measurements were obtained from closures that were aged for at least 1 week from the date of production. The closure dimension measurements was performed using a Vision Engineering, Swift Duo dual optical and video measuring system. All measurements were taken using 10× magnification and utilizing METLOGIX® M video measuring system software (see METLOGIX $M^3$: Digital Comparator Field of View Software, User's Guide).

Closure 1 (Comparative) is a closure made from a unimodal polyethylene resin having a melt index $I_2$ of 32 g/10 min, a density of 0.951 g/cm$^3$, and a weight average molecular weight Mw/Mn of 2.88, and which is made using a Ziegler-Natta catalyst in a solution olefin polymerization process. This resin is commercially available from NOVA Chemicals Corporation as SCLAIR 2712.

Closure 2 (Comparative) is a closure made from the nucleated polyethylene homopolymer composition "Polyethylene Blend Component A" described above in Table 1.

Closure 3 (Comparative) is a closure made from the bimodal polyethylene copolymer "Polyethylene Blend Component B" described above in Table 1.

Closure 4 (Inventive) is a closure made from Polyethylene Blend No. 1 described above in Table 1.

Closure 5 (Inventive) is a closure made from Polyethylene Blend No. 2, described above in Table 1.

Closure 6 (Inventive) is a closure made from Polyethylene Blend No. 3 described above in Table 1.

The closures were formed by injection molding, and the injection-molding processing conditions are given in Table 2. Closure dimensions are provided in Table 3.

TABLE 2

Injection Molding Processing Conditions

| | Closure No. | | | | | |
|---|---|---|---|---|---|---|
| | 1 | 2 | 3 | 4 | 5 | 6 |
| Additives (Color & Formulation) | 1% red, 2% slip (1000 ppm slip) | 1% red, 2% slip (1000 ppm slip) | 1% red, 2% slip (1000 ppm slip) | 1% red, 2% slip (1000 ppm slip) | 1% red, 2% slip (1000 ppm slip) | 1% red, 2% slip (1000 ppm slip) |
| Part Weight (g) | 8.653 | 8.601 | 8.613 | 8.631 | 8.651 | 8.600 |
| Injection Speed (mm/s) | 45 | 45 | 45 | 45 | 45 | 45 |
| Cycle time (s) | 3.631 | 3.478 | 3.874 | 3.812 | 3.691 | 3.623 |
| Filling time (s) | 0.661 | 0.523 | 0.679 | 0.683 | 0.683 | 0.642 |
| Dosing time (s) | 1.788 | 1.904 | 2.152 | 2.077 | 1.959 | 1.931 |
| Minimum Cushion (mm) | 9.758 | 9.726 | 9.765 | 9.756 | 9.746 | 9.756 |
| Filling peak pressure (psi) | 8294.6 | 10959.8 | 15271.2 | 12981 | 12753.5 | 11065.5 |
| Full peak pressure (psi) | 8345 | 10978.9 | 15272.9 | 12981 | 12769.7 | 11088.1 |
| Hold end position (mm) | 12.144 | 11.134 | 12.43 | 12.437 | 12.491 | 11.305 |
| Clamp force (ton) | 17.1 | 19.5 | 19.2 | 19.5 | 19.6 | 19.6 |
| Fill start position (mm) | 39.461 | 38.41 | 40.41 | 40.41 | 40.41 | 38.60 |
| Dosing back pressure (psi) | 824.2 | 823.9 | 809.9 | 814.8 | 821.9 | 821.9 |
| Pack pressure (psi) | 8286.7 | 10964.7 | 12516.1 | 12452.4 | 12757.4 | 11077.9 |
| Filling time 1 (s) | 0.665 | 0.527 | 0.682 | 0.686 | 0.686 | 0.646 |
| Temperature zone 1 (° C.) | 180 | 180 | 180 | 180 | 180 | 180 |
| Temperature zone 2 (° C.) | 185 | 185 | 185 | 185 | 185 | 185 |

TABLE 2-continued

Injection Molding Processing Conditions

| | Closure No. | | | | | |
|---|---|---|---|---|---|---|
| | 1 | 2 | 3 | 4 | 5 | 6 |
| Temperature zone 3 (° C.) | 190 | 190 | 190 | 190 | 190 | 190 |
| Temperature zone 4 (° C.) | 200 | 200 | 200 | 200 | 200 | 200 |
| Temperature zone 5 (° C.) | 200 | 200 | 200 | 200 | 200 | 200 |
| Mold temperature stationary (° F.) | 58 | 58 | 58 | 58 | 58 | 58 |
| Mold temperature moving (° F.) | 58 | 58 | 58 | 58 | 58 | 58 |

TABLE 3

Closure Dimensions

| | Closure No. | | | | | |
|---|---|---|---|---|---|---|
| | 1 | 2 | 3 | 4 | 5 | 6 |
| Additives (Color & Formulation) | 1% red, 2% slip (1000 ppm slip) | 1% red, 2% slip (1000 ppm slip) | 1% red, 2% slip (1000 ppm slip) | 1% red, 2% slip (1000 ppm slip) | 1% red, 2% slip (1000 ppm slip) | 1% red, 2% slip (1000 ppm slip) |
| Closure height without Tamper Ring (mm) | 10.67 | 10.67 | 10.67 | 10.67 | 10.67 | 10.67 |
| Closure height with Tamper Ring (mm) | 15.44 | 15.27 | 15.34 | 15.32 | 15.28 | 15.23 |
| Outside diameter @ 4 mm (mm) | 15.44 | 29.84 | 29.53 | 29.72 | 29.82 | 29.86 |
| Thread diameter (mm) | 29.58 | 25.86 | 25.55 | 25.69 | 25.78 | 25.84 |
| Bump seal diameter (mm) | 25.54 | 24.76 | 24.45 | 24.65 | 24.71 | 24.75 |
| Bump seal thickness (mm) | 24.52 | 0.71 | 0.71 | 0.71 | 0.72 | 0.72 |
| Bump seal height to center of olive (mm) | 0.68 | 1.50 | 1.55 | 1.53 | 1.52 | 1.49 |
| Bore seal diameter (mm) | 1.52 | 22/1 | 22.38 | 22.59 | 22.65 | 22.69 |
| Bore seal thickness (mm) | 22.5 | 0.93 | 0.92 | 0.92 | 0.93 | 0.95 |
| Bore height to center of olive (mm) | 0.91 | 1.51 | 1.70 | 1.70 | 1.69 | 1.58 |
| Top panel thickness (mm) | 1.58 | 1.15 | 1.21 | 1.21 | 1.16 | 1.16 |
| Tamper band undercut diameter (mm) | 1.21 | 26.47 | 26.15 | 26.22 | 26.32 | 26.48 |
| Thread depth (mm) | 26.29 | 1.05 | 1.04 | 1.05 | 1.07 | 1.05 |
| Thread pitch (mm) | 1.06 | 2.59 | 2.67 | 2.67 | 2.69 | 2.58 |
| Thread Root @ 4 mm (mm) | 2.54 | 27.62 | 27.32 | 27.47 | 27.59 | 27.61 |
| Cap weight (g) | 27.35 | 2.155 | 2.157 | 2.164 | 2.166 | 2.155 |

Deformation Analysis of Solid-State Closures

Figure 6A:
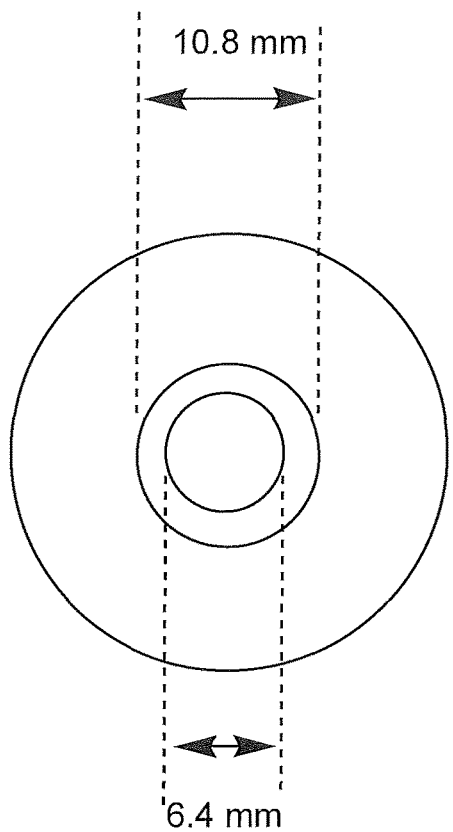
FIG. 6A shows a plan view of the probe used in the closure deformation testing. The view shows the bottom side of the probe which contacts the upper surface of the closure.
Figure 6B:
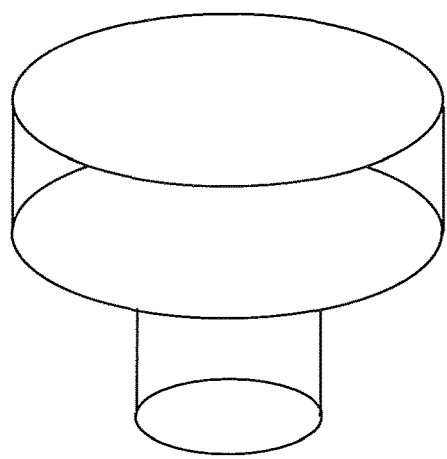
FIG. 6B shows a partially transparent perspective view of the probe used in the closure deformation testing.
Figure 7:
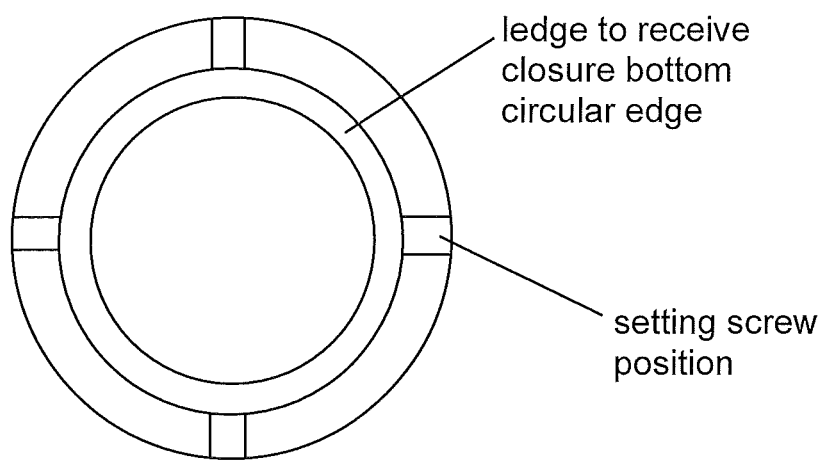
FIG. 7 shows a plan view (with screw locations indicated) of the closure holder used in deformation stress testing. The view shows the upper surface of the holder which receives the lower annular edge of the closure.

A DHR-3 rotational rheometer testing bar was modified by attaching an annular probe (see FIGS. 6A and 6B) to its end. This set up was used for the compressive deformation tests. The rheometer has a temperature chamber (oven) that allows one to measure the deformation responses at different temperatures. The annular probe made had an inner diameter of 6.4 mm and an outer diameter of 10.8 mm. The annular structure is designed to avoid contact of the probe with the center of the top panel of a closure since sometimes the gate mark (due to the nature of the injection molding process) is not completely flat (note: closures made by continuous compression molding processes will normally not have such marks at the center of the top panel of the closure). A closure holder (see FIG. 7) was also designed to hold the closure. This holder has four setting screws to fix the position of the closure inside the holder. The probe is glued to the testing bar using high temperature resistant silicone grease. The projected or contact area of the closure surface to be put under stress was 0.5944 cm$^2$. Tamper-evidence rings were removed from the closures prior to testing, so that only the deformation of the top panel at the projected area was induced. The closure without tamper-evidence ring is fixed in the stainless steel secure ring closure holder (see FIG. 7) and placed on the bottom plate of the rheometer. The point where the probe first touches the closure is set as the zero position. For the time sweep test, the sample was conditioned in the oven for 15 minutes at 93° C. before the testing started. A person skilled in the art will recognize that the present testing can be carried out at any suitable temperature for obtaining results, and especially any temperature above ambient to obtain results applicable to use of closures in hot fill or aseptic fill processes. An initial 2.5 N compression force was applied and then the time sweep was carried out with 1 rad/s frequency and 0.0001% radial strain for 300 seconds at 93° C. (which at such a low value does not affect axial responses; if higher radial strain were used, the solid samples might induce distortions in the axial force and deformation, ΔL data obtained). During this process, the instantaneous compressive force and deformation measured as ΔL vs. time were recorded. The compressive strain s (taken as a positive value for modeling purposes, see below) is calculated by taking the ratio of ΔL/thickness (in mm) of the closure top panel. The stress undergone at the contact area is calculated by using the recorded force divided by the actual contact area (i.e., 0.5944 cm$^2$). The data provided in Table 4 is an example data set obtained for each closure, and came from the modified solid-state deformation analysis carried out on each closure (Time in seconds, Axial Force in Newtons, Deformation or ΔL in mm, Temperature in ° C. and Angular Frequency, in radians per second). The data from each closure was modeled to obtain the strain model parameters (A, n and m). The data reported in Tables 4A-4F show one set of values for the raw data obtained by the above described deformation test for each closure made of a specific resin. In practice, data were collected for 4 to 6 closures made from each resin. The data from the 4-6 closures measured for each resin type was used as the basis for modeling after converting the axial force to stress and the deformation to strain. The numbers obtained with the model (on the closure/resin systems) were then averaged and are provided below in Table 5. Without wishing to be bound by theory, it is believed that the compressive deformation resistance evaluated using the current methodology also reflects the deformation resistance under any other deformation modes, such as tensile deformation; it is further believed that the deformation of the top panel of an as-is closure approximates that which occurs between the mechanically sealing surfaces of a plastic closure and a PET bottle neck finish after a closure is secured to a PET bottle.

TABLE 4A

Closure 1

| Time(s) | Force (N) | ΔL (mm) | Top panel thickness (mm) | Projected Area (cm$^2$) | Temp. (° C.) | Angular frequency (rad/s) | Strain | Stress (N/cm$^2$) |
|---|---|---|---|---|---|---|---|---|
| 0 | 0 | 0 | 1.21 | 0.5944 | 93.00 | 1 | 0 | 0 |
| 13.1815 | 0.3748 | 0.1319 | 1.21 | 0.5944 | 93.01 | 1 | 10.9% | 0.6305 |
| 27.1430 | 0.9321 | 0.1827 | 1.21 | 0.5944 | 93 | 1 | 15.1% | 1.5681 |
| 41.2604 | 1.3460 | 0.2207 | 1.21 | 0.5944 | 93 | 1 | 18.2% | 2.2644 |
| 55.0815 | 1.6385 | 0.2480 | 1.21 | 0.5944 | 93.01 | 1 | 20.5% | 2.7566 |
| 68.9493 | 1.8469 | 0.2687 | 1.21 | 0.5944 | 93.01 | 1 | 22.2% | 3.1071 |
| 83.5972 | 2.0062 | 0.2853 | 1.21 | 0.5944 | 93.01 | 1 | 23.6% | 3.3751 |
| 97.5586 | 2.1170 | 0.2974 | 1.21 | 0.5944 | 93 | 1 | 24.6% | 3.5616 |
| 111.3953 | 2.1974 | 0.3067 | 1.21 | 0.5944 | 92.99 | 1 | 25.3% | 3.6969 |
| 125.3256 | 2.2625 | 0.3141 | 1.21 | 0.5944 | 93 | 1 | 26.0% | 3.8064 |
| 139.3807 | 2.3090 | 0.3201 | 1.21 | 0.5944 | 93 | 1 | 26.5% | 3.8846 |
| 153.4513 | 2.3473 | 0.3249 | 1.21 | 0.5944 | 93 | 1 | 26.9% | 3.9490 |
| 167.3348 | 2.3736 | 0.3288 | 1.21 | 0.5944 | 92.99 | 1 | 27.2% | 3.9933 |
| 181.2494 | 2.3928 | 0.3319 | 1.21 | 0.5944 | 93 | 1 | 27.4% | 4.0256 |
| 195.1485 | 2.4085 | 0.3347 | 1.21 | 0.5944 | 92.99 | 1 | 27.7% | 4.0520 |
| 208.9384 | 2.4204 | 0.3370 | 1.21 | 0.5944 | 93 | 1 | 27.9% | 4.0720 |
| 222.9310 | 2.4293 | 0.3391 | 1.21 | 0.5944 | 93 | 1 | 28.0% | 4.0869 |
| 237.0173 | 2.4381 | 0.3409 | 1.21 | 0.5944 | 92.99 | 1 | 28.2% | 4.1018 |
| 251.0100 | 2.4449 | 0.3425 | 1.21 | 0.5944 | 93 | 1 | 28.3% | 4.1132 |
| 264.7530 | 2.4306 | 0.3425 | 1.21 | 0.5944 | 92.99 | 1 | 28.3% | 4.0891 |
| 278.3245 | 2.4216 | 0.3425 | 1.21 | 0.5944 | 93 | 1 | 28.3% | 4.0740 |
| 292.0208 | 2.4114 | 0.3425 | 1.21 | 0.5944 | 93 | 1 | 28.3% | 4.0569 |
| 305.8886 | 2.4020 | 0.3425 | 1.21 | 0.5944 | 92.99 | 1 | 28.3% | 4.0411 |

TABLE 4B

Closure 2

| Time (s) | Force (N) | ΔL (mm) | Top panel thickness (mm) | Projected Area (cm$^2$) | Temp. (° C.) | Angular frequency (rad/s) | Strain | Stress (N/cm$^2$) |
|---|---|---|---|---|---|---|---|---|
| 13.38429 | 0.686777 | 0.1299 | 1.15 | 0.5944 | 93 | 1 | 11.3% | 1.1554 |
| 27.54854 | 1.59502 | 0.1663 | 1.15 | 0.5944 | 93 | 1 | 14.5% | 2.6834 |
| 41.4632 | 2.00264 | 0.185 | 1.15 | 0.5944 | 93 | 1 | 16.1% | 3.3692 |
| 55.20628 | 2.19949 | 0.1955 | 1.15 | 0.5944 | 93 | 1 | 17.0% | 3.7004 |
| 69.24574 | 2.30861 | 0.2022 | 1.15 | 0.5944 | 93 | 1 | 17.6% | 3.8839 |
| 83.40999 | 2.37159 | 0.2065 | 1.15 | 0.5944 | 93 | 1 | 18.0% | 3.9899 |
| 97.49625 | 2.40568 | 0.2097 | 1.15 | 0.5944 | 93.01 | 1 | 18.2% | 4.0472 |
| 111.3641 | 2.4244 | 0.2119 | 1.15 | 0.5944 | 93 | 1 | 18.4% | 4.0787 |
| 125.2944 | 2.44289 | 0.2137 | 1.15 | 0.5944 | 93 | 1 | 18.6% | 4.1098 |

TABLE 4B-continued

| | | | | | | | | |
|---|---|---|---|---|---|---|---|---|
| | | | | Closure 2 | | | | |
| Time (s) | Force (N) | ΔL (mm) | Top panel thickness (mm) | Projected Area (cm$^2$) | Temp. (° C.) | Angular frequency (rad/s) | Strain | Stress (N/cm$^2$) |
| 139.0842 | 2.42023 | 0.2142 | 1.15 | 0.5944 | 93 | 1 | 18.6% | 4.0717 |
| 152.8117 | 2.4237 | 0.2151 | 1.15 | 0.5944 | 93 | 1 | 18.7% | 4.0776 |
| 166.7576 | 2.41349 | 0.2157 | 1.15 | 0.5944 | 93.01 | 1 | 18.8% | 4.0604 |
| 180.5475 | 2.42991 | 0.2169 | 1.15 | 0.5944 | 92.99 | 1 | 18.9% | 4.0880 |
| 194.0877 | 2.40654 | 0.2169 | 1.15 | 0.5944 | 93 | 1 | 18.9% | 4.0487 |
| 207.9712 | 2.426 | 0.2181 | 1.15 | 0.5944 | 92.99 | 1 | 19.0% | 4.0814 |
| 221.7923 | 2.40667 | 0.2181 | 1.15 | 0.5944 | 93 | 1 | 19.0% | 4.0489 |
| 235.473 | 2.42736 | 0.2193 | 1.15 | 0.5944 | 92.99 | 1 | 19.1% | 4.0837 |
| 249.0756 | 2.41041 | 0.2193 | 1.15 | 0.5944 | 92.99 | 1 | 19.1% | 4.0552 |
| 262.7875 | 2.43601 | 0.2206 | 1.15 | 0.5944 | 93 | 1 | 19.2% | 4.0983 |
| 276.4058 | 2.41637 | 0.2206 | 1.15 | 0.5944 | 93 | 1 | 19.2% | 4.0652 |
| 290.0552 | 2.40337 | 0.2206 | 1.15 | 0.5944 | 93 | 1 | 19.2% | 4.0434 |
| 303.6423 | 2.42764 | 0.2218 | 1.15 | 0.5944 | 93 | 1 | 19.3% | 4.0842 |

TABLE 4C

| | | | | | | | | |
|---|---|---|---|---|---|---|---|---|
| | | | | Closure 3 | | | | |
| Time (s) | Force (N) | ΔL (mm) | Top panel thickness (mm) | Projected Area (cm$^2$) | Temp. (° C.) | Angular frequency (rad/s) | Strain | Stress (N/cm$^2$) |
| 0 | 0 | 0 | 1.21 | 0.5944 | 93 | 1 | 0 | 0 |
| 13.1815 | 0.4921 | 0.1315 | 1.21 | 0.5944 | 93.01 | 1 | 10.9% | 0.8278 |
| 27.1742 | 1.1536 | 0.1767 | 1.21 | 0.5944 | 93.01 | 1 | 14.6% | 1.9407 |
| 41.2760 | 1.5791 | 0.2082 | 1.21 | 0.5944 | 93 | 1 | 17.2% | 2.6566 |
| 55.3779 | 1.9008 | 0.2291 | 1.21 | 0.5944 | 93.01 | 1 | 18.9% | 3.1979 |
| 69.5577 | 2.0914 | 0.2429 | 1.21 | 0.5944 | 93.01 | 1 | 20.1% | 3.5186 |
| 83.5348 | 2.2166 | 0.2524 | 1.21 | 0.5944 | 93.01 | 1 | 20.9% | 3.7291 |
| 97.5430 | 2.2975 | 0.259 | 1.21 | 0.5944 | 93.01 | 1 | 21.4% | 3.8653 |
| 111.5201 | 2.3472 | 0.2639 | 1.21 | 0.5944 | 93.01 | 1 | 21.8% | 3.9489 |
| 125.5596 | 2.3828 | 0.2676 | 1.21 | 0.5944 | 93 | 1 | 22.1% | 4.0088 |
| 139.5210 | 2.4106 | 0.2704 | 1.21 | 0.5944 | 93.01 | 1 | 22.3% | 4.0555 |
| 153.4045 | 2.4268 | 0.2727 | 1.21 | 0.5944 | 93 | 1 | 22.5% | 4.0827 |
| 167.3348 | 2.4385 | 0.2745 | 1.21 | 0.5944 | 92.99 | 1 | 22.7% | 4.1024 |
| 181.2650 | 2.4382 | 0.2757 | 1.21 | 0.5944 | 93 | 1 | 22.8% | 4.1019 |
| 194.8053 | 2.4159 | 0.2757 | 1.21 | 0.5944 | 93.01 | 1 | 22.8% | 4.0644 |
| 208.7368 | 2.4329 | 0.2773 | 1.21 | 0.5944 | 92.99 | 1 | 22.9% | 4.0931 |
| 222.4930 | 2.4235 | 0.2778 | 1.21 | 0.5944 | 93 | 1 | 23.0% | 4.0772 |
| 236.3453 | 2.4079 | 0.2778 | 1.21 | 0.5944 | 93 | 1 | 23.0% | 4.0509 |
| 250.1196 | 2.4340 | 0.2796 | 1.21 | 0.5944 | 92.99 | 1 | 23.1% | 4.0949 |
| 263.8626 | 2.4184 | 0.2796 | 1.21 | 0.5944 | 92.99 | 1 | 23.1% | 4.0687 |
| 277.5745 | 2.4060 | 0.2796 | 1.21 | 0.5944 | 93 | 1 | 23.1% | 4.0478 |
| 291.0992 | 2.4304 | 0.2813 | 1.21 | 0.5944 | 92.99 | 1 | 23.2% | 4.0888 |
| 304.7955 | 2.4161 | 0.2813 | 1.21 | 0.5944 | 93 | 1 | 23.2% | 4.0647 |

TABLE 4D

| | | | | | | | | |
|---|---|---|---|---|---|---|---|---|
| | | | | Closure 4 | | | | |
| Time (s) | Force (N) | ΔL (mm) | Top panel thickness (mm) | Projected Area (cm$^2$) | Temp. (° C.) | Angular frequency (rad/s) | Strain | Stress (N/cm$^2$) |
| 13.4467 | 0.5364 | 0.1323 | 1.21 | 0.5944 | 93.01 | 1 | 10.9% | 0.9025 |
| 27.5017 | 1.3919 | 0.1737 | 1.21 | 0.5944 | 93.01 | 1 | 14.4% | 2.3417 |
| 41.3540 | 1.8495 | 0.1973 | 1.21 | 0.5944 | 93 | 1 | 16.3% | 3.1116 |
| 55.3467 | 2.0926 | 0.2116 | 1.21 | 0.5944 | 93.01 | 1 | 17.5% | 3.5206 |
| 70.0569 | 2.2415 | 0.2212 | 1.21 | 0.5944 | 93.01 | 1 | 18.3% | 3.7710 |
| 83.9872 | 2.3228 | 0.2271 | 1.21 | 0.5944 | 93.01 | 1 | 18.8% | 3.9078 |
| 97.9954 | 2.3733 | 0.2313 | 1.21 | 0.5944 | 93 | 1 | 19.1% | 3.9928 |
| 112.0193 | 2.4057 | 0.2343 | 1.21 | 0.5944 | 93 | 1 | 19.4% | 4.0473 |
| 125.8716 | 2.4261 | 0.2366 | 1.21 | 0.5944 | 92.99 | 1 | 19.6% | 4.0816 |
| 139.8018 | 2.4402 | 0.2385 | 1.21 | 0.5944 | 93 | 1 | 197% | 4.1053 |
| 153.6073 | 2.4190 | 0.2388 | 1.21 | 0.5944 | 93 | 1 | 19.7% | 4.0696 |

TABLE 4D-continued

Closure 4

| Time (s) | Force (N) | ΔL (mm) | Top panel thickness (mm) | Projected Area (cm²) | Temp. (° C.) | Angular frequency (rad/s) | Strain | Stress (N/cm²) |
|---|---|---|---|---|---|---|---|---|
| 167.2568 | 2.4188 | 0.2396 | 1.21 | 0.5944 | 92.99 | 1 | 19.8% | 4.0692 |
| 181.1246 | 2.4256 | 0.2406 | 1.21 | 0.5944 | 93.01 | 1 | 19.9% | 4.0808 |
| 194.6805 | 2.4114 | 0.2407 | 1.21 | 0.5944 | 92.99 | 1 | 19.9% | 4.0569 |
| 208.4548 | 2.4492 | 0.2423 | 1.21 | 0.5944 | 93 | 1 | 20.0% | 4.1204 |
| 221.9951 | 2.4228 | 0.2423 | 1.21 | 0.5944 | 93 | 1 | 20.0% | 4.0761 |
| 235.8005 | 2.4093 | 0.2422 | 1.21 | 0.5944 | 93 | 1 | 20.0% | 4.0533 |
| 249.3564 | 2.4298 | 0.2436 | 1.21 | 0.5944 | 92.99 | 1 | 20.1% | 4.0878 |
| 263.1143 | 2.4169 | 0.2436 | 1.21 | 0.5944 | 93.01 | 1 | 20.1% | 4.0660 |
| 276.8350 | 2.4079 | 0.2436 | 1.21 | 0.5944 | 93 | 1 | 20.1% | 4.0509 |
| 290.4532 | 2.4320 | 0.245 | 1.21 | 0.5944 | 93.01 | 1 | 20.2% | 4.0916 |
| 304.4459 | 2.4180 | 0.245 | 1.21 | 0.5944 | 93 | 1 | 20.2% | 4.0680 |

TABLE 4E

Closure 5

| Time (s) | Force (N) | ΔL (mm) | Top panel thickness (mm) | Projected Area (cm²) | Temp. (° C.) | Angular frequency (rad/s) | Strain | Stress (N/cm²) |
|---|---|---|---|---|---|---|---|---|
| 13.3219 | 0.5021 | 0.1323 | 1.16 | 0.5944 | 93 | 1 | 11.4% | 0.8447 |
| 27.4549 | 1.2524 | 0.1770 | 1.16 | 0.5944 | 93 | 1 | 15.3% | 2.1071 |
| 41.5412 | 1.7709 | 0.2041 | 1.16 | 0.5944 | 93 | 1 | 17.6% | 2.9793 |
| 55.6743 | 2.0555 | 0.2200 | 1.16 | 0.5944 | 93 | 1 | 19.0% | 3.4581 |
| 69.6981 | 2.2188 | 0.2298 | 1.16 | 0.5944 | 93.01 | 1 | 19.8% | 3.7328 |
| 83.7220 | 2.3122 | 0.2363 | 1.16 | 0.5944 | 93 | 1 | 20.4% | 3.8899 |
| 97.7246 | 2.3675 | 0.2406 | 1.16 | 0.5944 | 93 | 1 | 20.7% | 3.9831 |
| 111.7641 | 2.4008 | 0.2438 | 1.16 | 0.5944 | 93 | 1 | 21.0% | 4.0390 |
| 125.5384 | 2.4242 | 0.2461 | 1.16 | 0.5944 | 93 | 1 | 21.2% | 4.0784 |
| 139.5778 | 2.4384 | 0.2480 | 1.16 | 0.5944 | 93 | 1 | 21.4% | 4.1022 |
| 153.4457 | 2.4297 | 0.2489 | 1.16 | 0.5944 | 93 | 1 | 21.5% | 4.0877 |
| 167.0172 | 2.4045 | 0.2489 | 1.16 | 0.5944 | 92.99 | 1 | 21.5% | 4.0452 |
| 180.6667 | 2.4317 | 0.2507 | 1.16 | 0.5944 | 92.99 | 1 | 21.6% | 4.0910 |
| 194.3161 | 2.4107 | 0.2507 | 1.16 | 0.5944 | 93 | 1 | 21.6% | 4.0558 |
| 207.9344 | 2.4376 | 0.2523 | 1.16 | 0.5944 | 92.99 | 1 | 21.8% | 4.1009 |
| 221.4747 | 2.4176 | 0.2523 | 1.16 | 0.5944 | 93.01 | 1 | 21.8% | 4.0673 |
| 235.2634 | 2.4036 | 0.2523 | 1.16 | 0.5944 | 93 | 1 | 21.8% | 4.0437 |
| 249.0536 | 2.4242 | 0.2537 | 1.16 | 0.5944 | 93 | 1 | 21.9% | 4.0784 |
| 262.8007 | 2.4100 | 0.2536 | 1.16 | 0.5944 | 93 | 1 | 21.9% | 4.0545 |
| 276.3098 | 2.4340 | 0.2550 | 1.16 | 0.5944 | 93 | 1 | 22.0% | 4.0949 |
| 290.0529 | 2.4178 | 0.2550 | 1.16 | 0.5944 | 93 | 1 | 22.0% | 4.0676 |
| 303.5463 | 2.4061 | 0.2550 | 1.16 | 0.5944 | 93 | 1 | 22.0% | 4.0479 |

TABLE 4F

Closure 6

| Time (s) | Force (N) | ΔL (mm) | Top panel thickness (mm) | Projected Area (cm²) | Temp. (° C.) | Angular frequency (rad/s) | Strain | Stress (N/cm²) |
|---|---|---|---|---|---|---|---|---|
| 13.3375 | 0.5936 | 0.1311 | 1.16 | 0.5944 | 93.01 | 1 | 11.3% | 0.9987 |
| 27.2522 | 1.4656 | 0.1701 | 1.16 | 0.5944 | 93.02 | 1 | 14.7% | 2.4656 |
| 41.5256 | 1.9203 | 0.1919 | 1.16 | 0.5944 | 93.01 | 1 | 16.5% | 3.2307 |
| 55.4247 | 2.1536 | 0.2043 | 1.16 | 0.5944 | 93.01 | 1 | 17.6% | 3.6231 |
| 69.3861 | 2.2722 | 0.212 | 1.16 | 0.5944 | 93 | 1 | 18.3% | 3.8227 |
| 83.3944 | 2.3501 | 0.2171 | 1.16 | 0.5944 | 92.99 | 1 | 18.7% | 3.9538 |
| 97.1219 | 2.3907 | 0.2206 | 1.16 | 0.5944 | 93 | 1 | 19.0% | 4.0220 |
| 111.1925 | 2.4180 | 0.2232 | 1.16 | 0.5944 | 93 | 1 | 19.2% | 4.0680 |
| 125.1384 | 2.4345 | 0.2253 | 1.16 | 0.5944 | 93 | 1 | 19.4% | 4.0957 |
| 139.1467 | 2.4452 | 0.2269 | 1.16 | 0.5944 | 93 | 1 | 19.6% | 4.1137 |
| 152.8897 | 2.4181 | 0.2268 | 1.16 | 0.5944 | 93 | 1 | 19.6% | 4.0681 |
| 166.7732 | 2.4184 | 0.2276 | 1.16 | 0.5944 | 93 | 1 | 19.6% | 4.0686 |
| 180.4851 | 2.4216 | 0.2286 | 1.16 | 0.5944 | 93 | 1 | 19.7% | 4.0740 |
| 194.0565 | 2.4034 | 0.2286 | 1.16 | 0.5944 | 92.99 | 1 | 19.7% | 4.0433 |

TABLE 4F-continued

Closure 6

| Time (s) | Force (N) | ΔL (mm) | Top panel thickness (mm) | Projected Area (cm$^2$) | Temp. (° C.) | Angular frequency (rad/s) | Strain | Stress (N/cm$^2$) |
|---|---|---|---|---|---|---|---|---|
| 207.7684 | 2.4239 | 0.23 | 1.16 | 0.5944 | 93 | 1 | 19.8% | 4.0780 |
| 221.5583 | 2.4039 | 0.2301 | 1.16 | 0.5944 | 93 | 1 | 19.8% | 4.0442 |
| 235.1922 | 2.4301 | 0.2315 | 1.16 | 0.5944 | 93.01 | 1 | 20.0% | 4.0884 |
| 248.9508 | 2.4122 | 0.2314 | 1.16 | 0.5944 | 93 | 1 | 19.9% | 4.0582 |
| 262.9435 | 2.4495 | 0.2329 | 1.16 | 0.5944 | 93 | 1 | 20.1% | 4.1209 |
| 276.6710 | 2.4226 | 0.2328 | 1.16 | 0.5944 | 93.01 | 1 | 20.1% | 4.0757 |
| 290.3516 | 2.4107 | 0.2328 | 1.16 | 0.5944 | 93 | 1 | 20.1% | 4.0557 |
| 303.8451 | 2.4392 | 0.2341 | 1.16 | 0.5944 | 93.01 | 1 | 20.2% | 4.1035 |

A person skilled in the art will recognize that any resin which is capable of being formed into a closure may be subjected to similar testing to provide inputs for use in the compressive strain model, so that two or more closures made of different polymeric material may be directly compared and contrasted with respect to their respective deformation behavior.

The Compressive Strain Model

Without wishing to be bound by any single theory, the responses collected for each closure reflect the characteristics of the resin used in each closure. However, since the instantaneous compressive deformation information is a function of both time and stress, which is a non-linear relationship or typical multivariate phenomenon, a model is employed to provide a better understanding of the polymer structure-closure property relationship. The model used here is a model that can adequately describe the closure deformation as a function of stress and time at a given temperature for each polymer-closure pairing.

The compressive strain data obtained as described above are modeled using a compressive strain model in order to compare the tendency of a polymer-closure system to deform under stress. Together with the compressive strain data, the model is a useful method to provide rapid and cost effective manner by which to predict polymer-closure pairing deformation properties.

The compressive strain is assumed to follow the mathematical form at a given temperature as shown below:

$$\varepsilon = A \times \sigma^n \times t^m$$

where ε is the compressive strain; σ is the stress in N/cm$^2$, t is the loading time in seconds, A is the model coefficient, n is the deformation stress exponent and m is the time exponent. Any software capable of performing non-linear regressions can be used to estimate the model parameters.

Figure 8:
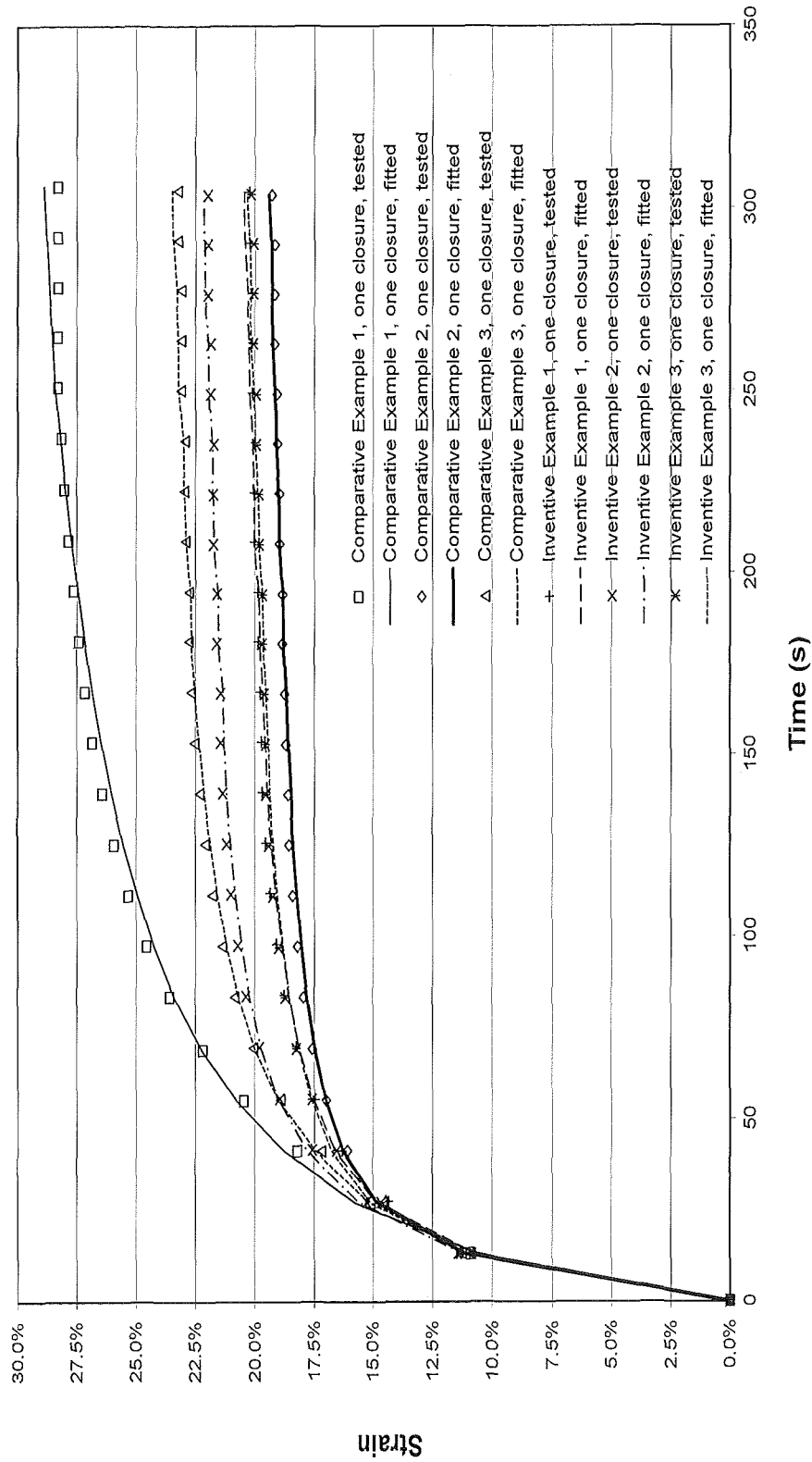
FIG. 8 shows actual and fitted compressive deformation data for closure Nos. 1-6.

FIG. 8 shows the actual and fitted compressive strains (deformations) using the compressive strain model for Closures 1-6 (one closure as an example for each case). Generally, the model fits very well with the actual deformation obtained from the closures made from the different polymer compositions. The average values of the fitted model parameters, A, n and m, are summarized in Table 5.

TABLE 5

Compressive Strain Model Parameters for Closures Made of Different Polyethylene Compositions

| | Closure No. | | | | | |
|---|---|---|---|---|---|---|
| | 1 | 2 | 3 | 4 | 5 | 6 |
| Additives (Color & Slip by Masterbatch, MB) | 1% red, 2% slip MB (1000 ppm slip) | 1% red, 2% slip MB (1000 ppm slip) | 1% red, 2% slip MB (1000 ppm slip) | 1% red, 2% slip MB (1000 ppm slip) | 1% red, 2% slip MB (1000 ppm slip) | 1% red, 2% slip MB (1000 ppm slip) |
| Model Coefficient, A | 0.093679 | 0.095093 | 0.092886 | 0.093111 | 0.096984 | 0.095183 |
| Deformation stress exponent, n | 0.348888 | 0.290515 | 0.335115 | 0.296043 | 0.322615 | 0.283423 |
| Time Exponent, m | 0.115313 | 0.062369 | 0.078648 | 0.067976 | 0.058401 | 0.063844 |
| Predicted creep strain at 93° C., 4 N/cm$^2$, 305 seconds; the stress is constant and creep is the deformation vs time | 29.4% | 20.3% | 23.2% | 20.7% | 21.2% | 20.3% |

Predicted creep strain (also shown in Table 5) is the deformation of a material at a specific time under a constant stress. Since the model described above for compressive strain fits the actual raw data very well, the model may be further used to predict the deformations under different conditions, such as increased stress levels, or predicting compressive strain at various stress values at a constant loading time.

Preparation of a Liquid Containing 4.2 Volume % CO$_2$ Sealed in a PET Container with a Closure To prepare 4.2 vol % of carbon dioxide, CO$_2$ (4.2 Gas Volume or "GV") in purified water, 10.13 grams of sodium bicarbonate (NaHCO$_3$) and 7.72 grams of citric acid (C$_6$H$_8$O$_7$) were packed into two water-soluble EVOH (ethylene vinyl alcohol) bags. Next, 600 mL of purified water was added to a PET bottle filling the bottle. Each bottle had a PCO 1881 neck finish. The bag with sodium bicarbonate and the bag with citric acid were then added to the PET bottle filled with purified water. A closure was immediately placed on the PET bottle with manual force and turned at an application angle 360°. Next the bottle-closure system was placed in a Steinfurth torque measuring machine with a proper chuck to further turn the closure at an application angle of 380° at a speed of 0.8 rpm/min. The bottle was then shaken to ensure complete dissolution of the chemicals in water.

Elevated Temperature Cycle Test (ETCT)

This is an International Society of Beverage Technologists (ISBT) voluntary standard test. As closures may experience wide temperature swings in hot weather markets, it is expected that the closure remain on the neck finish during these temperature swings and throughout the shelf life of the product. The elevated temperature cycle test evaluates such closure performance.

After filling and capping a PET bottle with 4.2 GV of $CO_2$ as described above, the PET bottle-closure system was placed in a temperature controlled chamber. The bottle-closure system was then exposed to the following temperature program: Cycle 1; A) hold at 60° C. for 6 hours, then B) at 32° C. for 18 hours; Cycle 2; C) hold at 60° C. for six 6 hours, then D) at 32° C. for 18 hours; Cycle 3; E) hold at 60° C. for 6 hours, then F) at 32° C. for 18 hours. After each cycle component, the PET bottle-closure samples were observed for closure releases, cocked and deformed closures and leakers. A total of 24 bottle-closure systems were tested in each example. The results are shown in Table 6.

TABLE 6[1,2]

Elevated Temperature Cycle Test of a PET bottle - PE closure System (closure has additives for color, 1% red, and slip, 1000 ppm by way of 2% masterbatch)

| Closure No. | Cycle | Cycle Half | No. of Failures | Visual Inspection Notes | % Pass (no issue) |
|---|---|---|---|---|---|
| 1 | 1 | A | No failure | | 33.3% |
|  |  | B | No failure | | |
|  | 2 | C | 2 | Nos. 10 and 24 had | |
|  |  | D | 4 | visual flaws | |
|  | 3 | E | 3 | Nos. 4, 6, 7, and 21 had visual flaws | |
|  |  | F | 7 | Nos. 12 and 20 had visual flaws; No. 11 vented gas Nos. 2 and 3 had visual flaws; Nos. 5, 14, 17, 22, and 23 vented gas | |
| 2 | 1 | A | 24 | All failed | 0% |
|  |  | B |  |  |  |
|  | 2 | C |  |  |  |
|  |  | D |  |  |  |
|  | 3 | E |  |  |  |
|  |  | F |  |  |  |
| 3 | 1 | A | 0 | No failures | 100% |
|  |  | B | 0 | No failures |  |
|  | 2 | C | 0 | No failures |  |
|  |  | D | 0 | No failures |  |
|  | 3 | E | 0 | No failures |  |
|  |  | F | 0 | No failures |  |
| 4 | 1 | A | 0 | No leaks or failures | 95.8% |
|  | 1 | B | 0 | No leaks or failures |  |
|  | 2 | C | 0 | No leaks or failures |  |
|  | 2 | D | 0 | No leaks or failures |  |
|  | 3 | E | 0 | No leaks or failures |  |
|  | 3 | F | 1 | No. 22 failed; Tamper Evidence Band (TEB) separated |  |
| 5 | 1 | A |  |  | 41.7% |
|  | 1 | B |  |  |  |
|  | 2 | C |  |  |  |
|  | 2 | D |  |  |  |
|  | 3 | E |  |  |  |
|  | 3 | F |  |  |  |
| 6 | 1 | A | 14 | Nos. 5, 6, 10, 12, 13, 15, 17, 19, 20, 24 etc. TEB Separated | 0% |
|  | 1 | B | 0 | No leaks or failures |  |
|  | 2 | C | 9 | Nos. 1, 2, 4, 7, 8, 11, 14, 16, 18 |  |
|  | 2 | D | 0 | TEB Separated |  |
|  | 3 | E | 1 |  |  |
|  | 3 | F | 0 | No. 3 failed |  |

Notes:
[1]PET bottle used: CSD, PCO 1881 neck finish, 591 ml.
[2]No. of specimens: 24

Examination of the data in Table 6, shows that Closure Nos. 4, 5 and 6 which are made using polyethylene blends have better performance than Closure No. 2 made from blend component A alone. Closure No. 4 which is made from a 25:75 blend of blend components A and B respectively, retains almost all the performance of the closure made from blend component B. Also, closure 5 which comprises a 50:50 wt % A:B blend has a better pass rates than Closure No. 1 which is made using a unimodal resin, Closure No. 2 which is made from blend component A alone, or Closure No. 6 which is made using a 75:25 wt % A:B blend.

Secure Seal Test (SST)

As PET (or glass) is more rigid than polyethylene, the deformation at the mechanically sealing surfaces of a bottle and closure package likely occurs more with the plastic closure than the bottle. Hence, it is important that the plastic closure has an appropriate deformation. Without wishing to be bound by theory, it is expected that an excessive deformation of the closure at the mechanically sealing surfaces may lead to the loss of the intimate engagement of the sealing surfaces at some point. Insufficient deformation of the closure at the mechanically sealing surfaces may not provide sufficient conformability to the shapes of the sealing surfaces on the rigid PET bottle neck finish. Appropriate deformation at the mechanically sealing surfaces can provide the intimate engagement between the sealing surfaces of the bottle (neck finish) and closure. Hence, a closure exhibiting excessive compressive strain or excessive deformation may lead to poorer sealing properties (e.g. decreased tightness) when the closure is fitted to a PET container, bottle and the like; alternatively, a closure exhibiting appropriate compressive strain or deformation may lead to improved sealing properties (e.g. improved tightness) when the closure is fitted to a PET container, bottle and the like.

The SST is an International Society of Beverage Technologists (ISBT) voluntary standard test. This test is to determine the plastic closure seal and thread integrity while under an internal pressure. A detailed description of the test follows. After filling and capping a PET bottle with 4.2 GV of $CO_2$ as described above, the PET bottle-closure system was conditioned at room temperature (22° C.+/−1° C.) for 24 hours. Next, the PET bottle neck finish including the closure, was cut out using a Secure-Pak™ neck finish cutting tool. The combined neck finish/closure system was attached in a sealed fit with a pressure tubing and gas pressure was introduced. The PET neck finish/closure system was placed into a testing fixture and the entire assembly was placed into a water tank of a Secure Seal Tester, model SST, manufactured by Secure Pak (Maumee, Ohio). The test was carried out in water at room temperature (22° C.). The pressure was slowly applied to the interior of the closure to 100 psi and held for a period of 1 minute. The PET bottle neck finish-closure sample was observed for signs of air bubbles. A failure is indicated when a steady stream of bubbles emitting from the closure can be observed. In a next step, the pressure was increased to 175 psi and held for one 1 minute to again look for evidence of air bubbles. In a final step, the pressure was increased to 200 psi and held for 1 minute, and evidence of air bubbles was looked for. The pressures at which observable air leakage events occurred were recorded as well as the percentage of air passage.

A total of twenty Secure Seal tests were carried out for each of Closures 1-6 and the results are provided in Table 7.

TABLE 7

Secure Seal Test (SST) of a PET bottle—PE closure System (closure has additives for color, 1% red, and slip, 1000 ppm by way of 2% masterbatch)

| Closure No. | Specimen No. | P1 Leakage @ 100 psi, No. of failures | Maximum Pressure attained in psi with elapsed time before failure (seconds) | Specimen No. | P1 Leakage @ 100 psi, No. of failures | Maximum Pressure attained in psi with elapsed time before failure (seconds) |
|---|---|---|---|---|---|---|
| 1 | 1 | 0 | 175 (10 sec) | 11 | 0 | 175 (12 sec) |
|   | 2 | 0 | 155 | 12 | 0 | 200 |
|   | 3 | 0 | 175 (55 sec) | 13 | 0 | 175 (37 sec) |
|   | 4 | 0 | 135 | 14 | 0 | 175 (10 sec) |
|   | 5 | 0 | 175 (45 sec) | 15 | 0 | 175 (8 sec) |
|   | 6 | 0 | 175 (0 sec) | 16 | 0 | 175 (4 sec) |
|   | 7 | 0 | 180 | 17 | 0 | 165 |
|   | 8 | 0 | 160 | 18 | 0 | 150 |
|   | 9 | 0 | 175 (8 sec) | 19 | 0 | 160 |
|   | 10 | 0 | 175 (42 sec) | 20 | 0 | 175 (9 sec) |
|   | No. of specimens not lasting 175 psi for 1 minute = 18; % Pass > 175 psi for 1 minute = 10% | | | | | |
| 2 | 1 | 0 | 0 | 11 | 0 | 200 |
|   | 2 | 0 | 0 | 12 | 0 | 200 |
|   | 3 | 0 | 175 | 13 | 0 | 175 |
|   | 4 | 0 | 0 | 14 | 0 | 200 |
|   | 5 | 0 | 0 | 15 | 0 | 200 |
|   | 6 | 0 | 0 | 16 | 0 | 200 |
|   | 7 | 0 | 175 | 17 | 0 | 175 |
|   | 8 | 0 | 0 | 18 | 0 | 200 |
|   | 9 | 0 | 0 | 19 | 0 | 200 |
|   | 10 | 0 | 0 | 20 | 0 | 200 |
|   | # of specimens not lasting 175 psi for 1 minute = 8; % Pass > 175 psi = 60% | | | | | |
| 3 | 1 | 0 | 200 | 11 | 0 | 200 |
|   | 2 | 0 | 200 | 12 | 0 | 200 |
|   | 3 | 0 | 200 | 13 | 0 | 200 |
|   | 4 | 0 | 200 | 14 | 0 | 200 |
|   | 5 | 0 | 200 | 15 | 0 | 200 |
|   | 6 | 0 | 200 | 16 | 0 | 200 |
|   | 7 | 0 | 200 | 17 | 0 | 200 |
|   | 8 | 0 | 200 | 18 | 0 | 200 |
|   | 9 | 0 | 200 | 19 | 0 | 200 |
|   | 10 | 0 | 200 | 20 | 0 | 200 |
|   | No. of specimens not lasting 175 psi for 1 minute = 0; % Pass > 175 psi for 1 minute = 100% | | | | | |
| 4 | 1 | 0 | 0 | 11 | 0 | 200 |
|   | 2 | 0 | 0 | 12 | 0 | 200 |
|   | 3 | 0 | 0 | 13 | 0 | 200 |
|   | 4 | 0 | 0 | 14 | 0 | 200 |
|   | 5 | 0 | 0 | 15 | 0 | 200 |
|   | 6 | 0 | 0 | 16 | 0 | 200 |
|   | 7 | 0 | 0 | 17 | 0 | 200 |
|   | 8 | 0 | 0 | 18 | 0 | 200 |
|   | 9 | 0 | 0 | 19 | 0 | 200 |
|   | 10 | 0 | 0 | 20 | 0 | 200 |
|   | No. of specimens not lasting 175 psi for 1 minute = 0; % Pass > 175 psi = 100% | | | | | |
| 5 | 1 | 0 | 0 | 11 | 0 | 200 |
|   | 2 | 0 | 0 | 12 | 0 | 200 |
|   | 3 | 0 | 0 | 13 | 0 | 200 |
|   | 4 | 0 | 175 | 14 | 0 | 175 |
|   | 5 | 0 | 0 | 15 | 0 | 200 |
|   | 6 | 0 | 0 | 16 | 0 | 200 |

TABLE 7-continued

Secure Seal Test (SST) of a PET bottle—PE closure System (closure has additives for color, 1% red, and slip, 1000 ppm by way of 2% masterbatch)

| Closure No. | Specimen No. | P1 Leakage @ 100 psi, No. of failures | Maximum Pressure attained in psi with elapsed time before failure (seconds) | Specimen No. | P1 Leakage @ 100 psi, No. of failures | Maximum Pressure attained in psi with elapsed time before failure (seconds) |
|---|---|---|---|---|---|---|
| | 7 | 0 | 0 | 200 | 17 | 0 |
| | 8 | 0 | 0 | 200 | 18 | 0 |
| | 9 | 0 | 0 | 200 | 19 | 0 |
| | 10 | 0 | 0 | 200 | 20 | 0 |
| | # of specimens not lasting 175 psi for 1 minute = 3; % Pass > 175 psi = 85% | | | | | |
| 6 | 1 | 0 | 0 | 200 | 11 | 0 |
| | 2 | 0 | 0 | 200 | 12 | 0 |
| | 3 | 0 | 0 | 200 | 13 | 0 |
| | 4 | 0 | 0 | 200 | 14 | 0 |
| | 5 | 0 | 0 | 200 | 15 | 0 |
| | 6 | 0 | 0 | 200 | 16 | 0 |
| | 7 | 0 | 0 | 200 | 17 | 0 |
| | 8 | 0 | 0 | 200 | 18 | 0 |
| | 9 | 0 | 0 | 200 | 19 | 0 |
| | 10 | 0 | 0 | 200 | 20 | 0 |
| | # of specimens not lasting 175 psi for 1 minute = 1; % Pass > 175 psi = 95% | | | | | |

Examination of the data shows that Closures 4-6 which are made from the polyethylene blends have superior sealing properties when compared to Closure No 2, which is made from Blend Component A and Closure No 1 which is made from a unimodal resin. A closure made from a 25:75 blend of blend components A and B has similar performance to Closure No. 3 (100% pass rate at 175 psi for 1 min), which is made from Blend Component B, while polyethylene blends of 50:50 and 75:25 wt % of A and B give closures with performance nearly as good at 85% and 95% pass rates respectively (at 175 psi for 1 min).

Removal Torque Test

This is an International Society of Beverage Technologists (ISBT) voluntary standard test. It is used to determine the torque required to remove a closure from a container.

After filling and capping a PET bottle with 4.2 GV of $CO_2$ as described above, the bottle was conditioned for 24 hours at room temperature (22° C.+/−1° C.) prior to conducting the removal torque test. The total application angle used for testing was 740°. The maximum removal torque was tested using a Steinfurth automated torque measuring machine with a proper chuck at the speed of 0.8 rpm/minute. A total of twelve tests were carried out for each of Closure Nos. 1 to 6 and the average results are provided in Table 8.

TABLE 8[1]

Removal Torque of a PET bottle - PE closure System (closure has additives for color, 1% red, and slip, 1000 ppm by way of 2% masterbatch)

| Closure No. | Average (in-lb) | Std. Dev. (in-lb) | Minimum (in-lb) | Maximum (in-lb) |
|---|---|---|---|---|
| 1 | 12.6 | 0.88 | 11.7 | 14.4 |
| 2 | 9.8 | 0.43 | 9.1 | 10.6 |
| 3 | 15.4 | 1.23 | 13.4 | 17.6 |
| 4 | 11.5 | 0.61 | 10.7 | 12.7 |
| 5 | 10.5 | 0.81 | 9.1 | 11.7 |
| 6 | 9.3 | 0.50 | 8.6 | 10.1 |

Note:
[1]PET bottle used: CSD, PCO 1881 neck finish, 591 ml.

The data in Table 8, shows that the polyethylene blends give closures with desirable intermediate torque values. If the torque value is too high, the closure may be difficult to remove from a bottle neck. If the torque value is too low, the closure may not form a good enough seal with the bottle neck.

Ball Impact Test

This is an International Society of Beverage Technologists (ISBT) voluntary standard test. During transportation and use by the consumer, a beverage closure can experience impact forces. The ball impact test evaluates the tendency of the closure to remain on a container opening without release. The test was carried out as follows. After filling and capping a PET bottle-closure system with 4.2 GV of $CO_2$ as described above, the bottle-closure system was conditioned for 24 hours in a temperature controlled chamber at 4° C. Ball impact testing was conducted using Steinfurth Ball impact tester which holds the bottle-closure system against movement with the bottle-closure system held in a desired orientation. A steel ball (286.7 g, 41.27 mm in diameter) was used as the impacting object. The steel ball was dropped from a height of 762 mm (30 inches) at four different orientations; at 0° to the top center of the closure, at 90° to the top edge of the closure, at 45° to top edge of the closure, and at 90° to the sidewall edge of the closure. After the impact test, the bottle-closure system was removed from the impact tester and the closure was checked for damage and/or leakage. A total of ten ball impact tests were carried out at each angle for each of Closures 1-6 and the results are provided in Table 9.

TABLE 9[1]

Ball Impact Test of PET bottle - PE closure System (closure has additives for color, 1% red, and slip, 1000 ppm by way of 2% masterbatch)

| Closure No. | 0° to top center of closure No. of failure (% of pass) | 90° to top edge of closure No. of failure (% of pass) | 45° angle to top edge of closure No. of failure (% of pass) | 90° to sidewall edge of closure No. of failure (% of pass) | Total No. of failures % of pass |
|---|---|---|---|---|---|
| 1 | 0 (100%) | 7 (30%) | 1 (90%) | 4 (60%) | 12 (70%) |
| 2 | 0 (100%) | 0 (100%) | 10 (0%) | 10 (0%) | 20 (50%) |
| 3 | 0 (100%) | 5 (50%) | 2 (80%) | 0 (100%) | 7 (82.5%) |
| 4 | 0 100% | 0 100% | 0 100% | 0 100% | 0 100% |
| 5 | 0 100% | 0 100% | 10 0% | 3 70% | 13 67.5% |
| 6 | 0 100% | 0 100% | 10 0% | 8 20% | 18 53% |

Note:
[1]PET bottle used: CSD, PCO 1881 neck finish, 591 ml.

The data in Table 9 show that closure No. 4 which is made of a polyethylene blend comprising a 25:75 wt % blend of blend components A and B has a 100% total pass rate, which is better than a closure made using only blend component A or B. Closures No. 5 and 6 made from a polyethylene blend comprising a 50:50 wt % and 75:25 wt % of blend components A and B respectively have total pass rates of 67.5% and 53% respectively which is better than the pass rate for a closure made using only blend component A.

Oxygen Transmission Rate (OTR)

To measure the oxygen transmission rate through a closure ASTM D3985 (Standard Test Method for Oxygen Gas Transmission Rate Through Plastic Film and Sheeting Using a Coulometric Sensor) was adapted as follows.

First the closure's tamper evident band removed. Next, the bottom edge of the closure was lightly roughed with sandpaper (for better adhesion to the epoxy) and then the closure was epoxied (using DEVCON® 2 part epoxy) to a testing plate so as to cover an outlet tube (for sweep gas) and inlet tube for $N_2$ introduction. The epoxy was allowed to dry overnight. One of the two gas tubes protruding into the closure interior carries inlet nitrogen gas flowing into the closure interior (nitrogen feed line), while the other one carries sweep gas (e.g. nitrogen plus permeates from the atmosphere surrounding the closure) out of the closure interior and into a detector. If any oxygen present in the atmosphere is permeating the closure walls it is detected as a component within the $N_2$ exiting the closure interior as sweep gas. The plate/closure/tubing apparatus is connected to an Oxtran low range instrument (Permatran-C® Model 2/21 MD) with the testing plate placed in an environmental chamber controlled at a temperature of 23° C. A baseline measurement for the detection of atmospheric oxygen is also taken by using an impermeable aluminum foil (in parallel with the closure) for a side by side comparison of permeability. The oxygen permeability rate is reported in $cm^3$/closure/day. The results of the OTR testing are provided in Table 10.

TABLE 10

| Closure No. | OTR Average ($cm^3$/closure/day) | Test Gas |
|---|---|---|
| 2 | 0.0017 | ambient air (20.9% oxygen) |
| 3 | 0.0034 | ambient air (20.9% oxygen) |
| 4 | 0.0019 | ambient air (20.9% oxygen) |

TABLE 10-continued

| Closure No. | OTR Average ($cm^3$/closure/day) | Test Gas |
|---|---|---|
| 5 | 0.0018 | ambient air (20.9% oxygen) |
| 6 | 0.0029 | ambient air (20.9% oxygen) |

As can been seen from the data in Table 10, the closures made from a 25:75 weight percent blend of blend component A and B respectively shows a synergistic effect with regard to OTR. While the expected OTR based on the blended components and their respective individual OTRs was about 0.0030, the observed OTR was substantially improved at 0.0019 (in some embodiments, a lower OTR is preferred). A similar synergistic effect was observed for the closure made from a 50:50 weight percent blend of blend components A and B. Here the expected OTR was about 0.0026, but the observed OTR was significantly better at only 0.0018.

Non-limiting embodiments of the present disclosure include the following:

Embodiment A

A polyethylene blend comprising from 5 to 95 weight percent of a polyethylene homopolymer composition, and from 95 to 5 weight percent of a bimodal polyethylene copolymer; wherein the polyethylene homopolymer composition comprises a nucleating agent.

Embodiment B

The polyethylene blend of Embodiment A, wherein the bimodal polyethylene homopolymer comprises (I) 5 to 70 weight % of a first ethylene homopolymer having a density of from 0.950 to 0.975 $g/cm^3$; and (II) 95 to 30 weight % of a second ethylene homopolymer having a density of from 0.950 to 0.975 $g/cm^3$, wherein the ratio of the melt index $I_2$ of the second ethylene homopolymer to the melt index $I_2$ of the first ethylene homopolymer is at least 10.

Embodiment C

The polyethylene blend of Embodiment B, wherein the bimodal polyethylene copolymer comprises (III) 10 to 70 weight % of a first ethylene copolymer having a melt index, $I_2$, of less than 0.4 g/10 min and a density of from 0.925 to 0.950 g/cm³; and (IV) 90 to 30 weight % of a second ethylene copolymer having a melt index $I_2$, of from 100 to 20,000 g/10 min and a density higher than the density of the first ethylene copolymer, but less than 0.967 g/cm³;

wherein the density of the second ethylene copolymer is less than 0.037 g/cm³ higher than the density of the first ethylene copolymer; and the ratio (SCB1/SCB2) of the number of short chain branches per thousand carbon atoms in the first ethylene copolymer (SCB1) to the number of short chain branches per thousand carbon atoms in the second ethylene copolymer (SCB2) is greater than 0.5.

Embodiment D

The polyethylene blend of Embodiment A, B or C wherein the polyethylene blend has a bimodal profile in a gel permeation chromatograph.

Embodiment E

The polyethylene blend of Embodiment A, B, C or D wherein the polyethylene blend has a density of from 0.951 to 0.971 g/cm³.

Embodiment F

The polyethylene blend of Embodiment A, B, C, D or E wherein the polyethylene blend has a melt index, $I_2$ of from 1.0 to 10.0 g/10 min.

Embodiment G

The polyethylene blend of Embodiment A, B, C, D, E or F wherein the polyethylene blend has a molecular weight distribution $M_w/M_n$ of from 3.0 to 13.0.

Embodiment H

The polyethylene blend of Embodiment A, B, C, D, E, F or G, wherein the polyethylene blend comprises from 20 to 80 weight percent of the polyethylene homopolymer composition, and from 80 to 20 weight percent of the bimodal polyethylene copolymer.

Embodiment I

The polyethylene blend of Embodiment A, B, C, D, E, F or G, wherein the polyethylene blend comprises from about 10 to 60 weight percent of the polyethylene homopolymer composition and from 90 to 40 weight percent of the bimodal polyethylene copolymer.

Embodiment J

The polyethylene blend of Embodiment A, B, C, D, E, F, G, H or I wherein the nucleating agent is a salt of a dicarboxylic acid.

Embodiment K

The polyethylene blend of A, B, C, D, E, F, G, H, I or J wherein the ethylene homopolymer composition comprises from 100 to 3000 ppm of the nucleating agent.

Embodiment L

A compression molded article comprising the polyethylene blend of Embodiment A, B, C, D, E, F, G, H, I, J or K.

Embodiment M

An injection molded article comprising the polyethylene blend of Embodiment A, B, C, D, E, F, G, H, I, J or K.

Embodiment N

A closure comprising the polyethylene blend of Embodiment A, B, C, D, E, F, G, H, I, J or K.

Embodiment O

A film comprising the polyethylene blend of Embodiment A, B, C, D, E, F, G, H, I, J or K.

What is claimed is:

1. A polyethylene blend comprising from 5 to 95 weight percent of a polyethylene homopolymer composition, and from 95 to 5 weight percent of a bimodal polyethylene copolymer; wherein the polyethylene homopolymer composition comprises a nucleating agent or mixture of nucleating agents; and wherein the polyethylene homopolymer composition comprises (I) 5 to 70 weight percent of a first ethylene homopolymer having a density of from 0.950 to 0.975 g/cm³; and (II) 95 to 30 weight percent of a second ethylene homopolymer having a density of from 0.950 to 0.975 g/cm³, wherein the ratio of the melt index $I_2$ of the second ethylene homopolymer to the melt index $I_2$ of the first ethylene homopolymer is at least 10.

2. The polyethylene blend of claim 1, wherein the bimodal polyethylene copolymer comprises (III) 10 to 70 weight percent of a first ethylene copolymer having a melt index, 12, of less than 0.4 g/10 min and a density of from 0.925 to 0.950 g/cm³; and (IV) 90 to 30 weight percent of a second ethylene copolymer having a melt index $I_2$, of from 100 to 20,000 g/10 min and a density higher than the density of the first ethylene copolymer, but less than 0.967 g/cm³;

wherein the density of the second ethylene copolymer is less than 0.037 g/cm³ higher than the density of the first ethylene copolymer; and the ratio (SCB1/SCB2) of the number of short chain branches per thousand carbon atoms in the first ethylene copolymer (SCB1) to the number of short chain branches per thousand carbon atoms in the second ethylene copolymer (SCB2) is greater than 0.5.

3. The polyethylene blend of claim 2, wherein the polyethylene blend has a bimodal profile in a gel permeation chromatograph.

4. The polyethylene blend of claim 2, wherein the polyethylene blend has a density of from 0.951 to 0.971 g/cm³.

5. The polyethylene blend of claim 2, wherein the polyethylene blend has a melt index, $I_2$ of from 1.0 to 10.0 g/10 min.

6. The polyethylene blend of claim 2, wherein the polyethylene blend has a molecular weight distribution $M_w/M_N$ of from 3.0 to 13.0.

7. The polyethylene blend of claim 2, wherein the polyethylene blend comprises from 20 to 80 weight percent of the polyethylene homopolymer composition, and from 80 to 20 weight percent of a bimodal polyethylene copolymer.

8. The polyethylene blend of claim 2, wherein the polyethylene blend comprises from about 10 to 60 weight percent of the polyethylene homopolymer composition and from 90 to 40 weight percent of the bimodal polyethylene copolymer.

9. The polyethylene blend of claim 2, wherein the nucleating agent or mixture of nucleating agents comprises a salt of a dicarboxylic acid.

10. The polyethylene blend of claim 2, wherein the ethylene homopolymer composition comprises from 100 to 3,000 ppm of the nucleating agent or mixture of nucleating agents.

11. A compression molded article comprising the polyethylene blend of claim 1.

12. A compression molded article comprising the polyethylene blend of claim 2.

13. An injection molded article comprising the polyethylene blend of claim 1.

14. An injection molded article comprising the polyethylene blend of claim 2.

15. A closure comprising the polyethylene blend of claim 1.

16. A closure comprising the polyethylene blend of claim 2.

17. A film comprising the polyethylene blend of claim 1.

18. A film comprising the polyethylene blend of claim 2.

* * * * *